United States Patent
Wu et al.

(10) Patent No.: US 11,757,944 B2
(45) Date of Patent: *Sep. 12, 2023

(54) NETWORK INTERMEDIARY WITH NETWORK REQUEST-RESPONSE MECHANISM

(71) Applicant: Netskope, Inc., Santa Clara, CA (US)

(72) Inventors: David Tze-Si Wu, Fremont, CA (US); Prasenna Ravi, Thanjavur (IN)

(73) Assignee: Netskope, Inc., Santa Clara, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/527,125

(22) Filed: Nov. 15, 2021

(65) Prior Publication Data
US 2022/0345492 A1 Oct. 27, 2022

Related U.S. Application Data

(63) Continuation of application No. 17/237,964, filed on Apr. 22, 2021, now Pat. No. 11,178,188.

(51) Int. Cl.
*H04L 9/40* (2022.01)
*G06F 9/54* (2006.01)

(52) U.S. Cl.
CPC .............. *H04L 63/20* (2013.01); *G06F 9/547* (2013.01); *H04L 63/0853* (2013.01)

(58) Field of Classification Search
CPC . H04L 63/20; H04L 63/0853; H04L 63/0807; G06F 9/547; G06F 21/6218; G06F 21/64
USPC .......................................................... 726/1
See application file for complete search history.

(56) References Cited

U.S. PATENT DOCUMENTS

| | | | |
|---|---|---|---|
| 7,240,100 B1 | 7/2007 | Wein et al. | |
| 7,600,230 B2 | 10/2009 | Desai et al. | |
| 7,739,301 B2 | 6/2010 | Bojinov et al. | |
| 7,822,837 B1 * | 10/2010 | Urban | H04L 43/00 709/223 |
| 8,161,082 B2 | 4/2012 | Israel et al. | |
| 8,255,984 B1 | 8/2012 | Ghostine et al. | |
| 8,543,667 B2 | 9/2013 | Hluchyj et al. | |
| 8,826,443 B1 | 9/2014 | Raman et al. | |
| 8,856,869 B1 | 10/2014 | Brinskelle | |
| 9,031,918 B2 | 5/2015 | Venkatrao et al. | |
| 9,075,990 B1 | 7/2015 | Yang | |

(Continued)

FOREIGN PATENT DOCUMENTS

| | | | | |
|---|---|---|---|---|
| EP | 3648431 A1 * | 5/2020 | | G06F 16/95 |
| EP | 3699766 A1 | 8/2020 | | |

(Continued)

OTHER PUBLICATIONS

JP-5695002-B2 English Translation.

(Continued)

*Primary Examiner* — Mahendra R Patel

(57) ABSTRACT

The technology disclosed describes a system. The system comprises a network security system interposed between clients and cloud applications. The network security system is configured to generate a synthetic request, and inject the synthetic request into an application session to transmit the synthetic request to a cloud application and receive a response to the synthetic request from the cloud application.

25 Claims, 20 Drawing Sheets

(56) References Cited

U.S. PATENT DOCUMENTS

| | | | |
|---|---|---|---|
| 9,197,673 B1 | 11/2015 | Gaddy et al. | |
| 9,270,765 B2 | 2/2016 | Narayanaswamy et al. | |
| 9,294,442 B1* | 3/2016 | Lian | H04L 63/0263 |
| 9,374,374 B2 | 6/2016 | Steinberg et al. | |
| 9,398,102 B2 | 7/2016 | Narayanaswamy et al. | |
| 9,613,190 B2* | 4/2017 | Ford | H04L 63/083 |
| 9,762,604 B2 | 9/2017 | Zaw | |
| 9,912,718 B1 | 3/2018 | Lepeska et al. | |
| 9,928,377 B2 | 3/2018 | Narayanaswamy et al. | |
| 10,264,071 B2 | 4/2019 | Vincent | |
| 10,445,167 B1 | 10/2019 | Young | |
| 10,452,453 B1 | 10/2019 | Kumar et al. | |
| 10,592,386 B2* | 3/2020 | Walters | G06F 16/215 |
| 10,728,117 B1 | 7/2020 | Sharma et al. | |
| 10,892,964 B2 | 1/2021 | Sharma et al. | |
| 10,938,686 B2 | 3/2021 | Sharma et al. | |
| 10,979,458 B2 | 4/2021 | Narayanaswamy et al. | |
| 10,983,986 B2 | 4/2021 | Kumar | |
| 10,992,512 B2 | 4/2021 | He et al. | |
| 11,140,178 B1 | 10/2021 | Yona et al. | |
| 11,178,188 B1 | 11/2021 | Wu et al. | |
| 11,184,403 B1 | 11/2021 | Wu et al. | |
| 11,190,550 B1 | 11/2021 | Wu et al. | |
| 11,271,972 B1 | 3/2022 | Ravi et al. | |
| 11,271,973 B1 | 3/2022 | Ravi et al. | |
| 11,303,647 B1 | 4/2022 | Wu et al. | |
| 11,366,723 B2* | 6/2022 | Bansod | G06F 11/1451 |
| 11,461,184 B2* | 10/2022 | Ramohalli Gopala Rao | H04L 69/04 |
| 11,500,669 B2* | 11/2022 | Kumar | G06F 3/0665 |
| 2001/0023442 A1 | 9/2001 | Masters | |
| 2002/0040432 A1 | 4/2002 | Gao | |
| 2004/0215746 A1 | 10/2004 | McCanne et al. | |
| 2004/0243703 A1 | 12/2004 | Demmer et al. | |
| 2005/0160161 A1* | 7/2005 | Barrett | H04L 63/0281 709/223 |
| 2005/0210072 A1 | 9/2005 | Bojinov et al. | |
| 2006/0015728 A1 | 1/2006 | Ballinger et al. | |
| 2007/0150568 A1 | 6/2007 | Ruiz | |
| 2008/0320151 A1 | 12/2008 | McCanne et al. | |
| 2008/0320154 A1 | 12/2008 | Demmer et al. | |
| 2009/0193126 A1 | 7/2009 | Agarwal et al. | |
| 2009/0193129 A1 | 7/2009 | Agarwal et al. | |
| 2009/0199285 A1 | 8/2009 | Agarwal et al. | |
| 2009/0300604 A1* | 12/2009 | Barringer | G06F 11/3664 717/178 |
| 2009/0327401 A1 | 12/2009 | Gage | |
| 2010/0325357 A1 | 12/2010 | Reddy et al. | |
| 2011/0231921 A1 | 9/2011 | Narayanan et al. | |
| 2011/0296036 A1 | 12/2011 | Canning et al. | |
| 2012/0136928 A1 | 5/2012 | Dillon | |
| 2012/0188940 A1 | 7/2012 | Agrawal et al. | |
| 2012/0203932 A1 | 8/2012 | da Costa et al. | |
| 2012/0304275 A1 | 11/2012 | Ji et al. | |
| 2013/0007854 A1 | 1/2013 | Sorenson et al. | |
| 2013/0046794 A1 | 2/2013 | De Magalhaes | |
| 2013/0047195 A1 | 2/2013 | Radhakrishnan | |
| 2013/0047253 A1 | 2/2013 | Radhakrishnan et al. | |
| 2013/0080714 A1 | 3/2013 | Kegel et al. | |
| 2013/0219456 A1* | 8/2013 | Sharma | H04L 9/0894 726/1 |
| 2013/0238785 A1* | 9/2013 | Hawk | G06F 9/5077 709/224 |
| 2013/0276142 A1* | 10/2013 | Peddada | H04L 63/102 726/28 |
| 2014/0032758 A1* | 1/2014 | Barton | H04L 41/00 709/225 |
| 2014/0280889 A1 | 9/2014 | Nispel et al. | |
| 2014/0282843 A1 | 9/2014 | Buruganahalli et al. | |
| 2014/0337614 A1 | 11/2014 | Kelson et al. | |
| 2015/0074056 A1 | 3/2015 | Kellner et al. | |
| 2015/0100664 A1 | 4/2015 | Flack et al. | |
| 2015/0121059 A1 | 4/2015 | Davis | |
| 2015/0128103 A1 | 5/2015 | Stratton et al. | |
| 2015/0135302 A1* | 5/2015 | Cohen | G06F 21/128 726/12 |
| 2015/0280959 A1 | 10/2015 | Vincent | |
| 2016/0072800 A1* | 3/2016 | Soon-Shiong | G16B 50/00 726/7 |
| 2016/0072847 A1 | 3/2016 | Bremen et al. | |
| 2016/0127379 A1 | 5/2016 | Nayshtut et al. | |
| 2016/0134616 A1 | 5/2016 | Koushik et al. | |
| 2016/0149956 A1 | 5/2016 | Birnbaum et al. | |
| 2016/0212602 A1 | 7/2016 | Libonate et al. | |
| 2016/0248841 A1 | 8/2016 | Barajas Gonzalez et al. | |
| 2016/0259936 A1 | 9/2016 | Mukherjee et al. | |
| 2016/0277368 A1 | 9/2016 | Narayanaswamy et al. | |
| 2016/0323318 A1 | 11/2016 | Terrill et al. | |
| 2016/0344700 A1 | 11/2016 | Gaddy et al. | |
| 2016/0381000 A1 | 12/2016 | Mathew et al. | |
| 2017/0012838 A1 | 1/2017 | Kashtan et al. | |
| 2017/0034201 A1 | 2/2017 | Zaw | |
| 2017/0093700 A1 | 3/2017 | Gilley et al. | |
| 2017/0249393 A1 | 8/2017 | Nair et al. | |
| 2017/0264619 A1 | 9/2017 | Narayanaswamy et al. | |
| 2017/0264640 A1 | 9/2017 | Narayanaswamy et al. | |
| 2017/0324749 A1 | 11/2017 | Bhargava et al. | |
| 2017/0331870 A1 | 11/2017 | Giger | |
| 2018/0115547 A1 | 4/2018 | Peterson et al. | |
| 2018/0191701 A1 | 7/2018 | Kong et al. | |
| 2018/0278584 A1 | 9/2018 | Kuperman et al. | |
| 2018/0278651 A1 | 9/2018 | Narayanaswamy et al. | |
| 2018/0307859 A1* | 10/2018 | LaFever | H04L 63/20 |
| 2018/0332053 A1* | 11/2018 | Weis | H04L 63/20 |
| 2018/0343236 A1 | 11/2018 | Pillay-Esnault et al. | |
| 2018/0367575 A1 | 12/2018 | Narayanaswamy et al. | |
| 2018/0375863 A1 | 12/2018 | Fan | |
| 2019/0035027 A1 | 1/2019 | Ng et al. | |
| 2019/0058714 A1 | 2/2019 | Joshi et al. | |
| 2019/0075115 A1* | 3/2019 | Anderson | H04L 63/083 |
| 2019/0097965 A1 | 3/2019 | Linari et al. | |
| 2019/0129976 A1 | 5/2019 | Cha et al. | |
| 2019/0166194 A1 | 5/2019 | Garza et al. | |
| 2019/0222479 A1 | 7/2019 | Nasser et al. | |
| 2019/0253431 A1* | 8/2019 | Atanda | G06F 21/62 |
| 2019/0288902 A1 | 9/2019 | He et al. | |
| 2019/0289011 A1 | 9/2019 | Kamiya et al. | |
| 2019/0297079 A1 | 9/2019 | Delcourt et al. | |
| 2019/0318102 A1 | 10/2019 | Araya et al. | |
| 2019/0325074 A1 | 10/2019 | Ghezzi et al. | |
| 2019/0349405 A1 | 11/2019 | Bengtson | |
| 2020/0044912 A1 | 2/2020 | Chakra et al. | |
| 2020/0067935 A1 | 2/2020 | Carnes, III et al. | |
| 2020/0074092 A1 | 3/2020 | Fliam et al. | |
| 2020/0186501 A1 | 6/2020 | Neystadt et al. | |
| 2020/0210383 A1 | 7/2020 | Demaris et al. | |
| 2020/0220875 A1 | 7/2020 | Harguindeguy et al. | |
| 2020/0274782 A1* | 8/2020 | Balaiah | H04L 41/40 |
| 2020/0274784 A1* | 8/2020 | Sharma | H04L 43/0805 |
| 2020/0296169 A1 | 9/2020 | Jeuk et al. | |
| 2020/0314121 A1 | 10/2020 | Mittermaier et al. | |
| 2020/0336484 A1* | 10/2020 | Mahajan | H04L 69/04 |
| 2020/0344264 A1* | 10/2020 | Wolfson | H04L 63/1491 |
| 2020/0351091 A1 | 11/2020 | Gardner | |
| 2020/0358822 A1 | 11/2020 | Erickson et al. | |
| 2020/0389486 A1* | 12/2020 | Jeyakumar | H04L 63/20 |
| 2020/0396254 A1* | 12/2020 | Crabtree | G06F 16/2477 |
| 2020/0403976 A1* | 12/2020 | Lewin | H04L 67/562 |
| 2021/0029089 A1 | 1/2021 | Lewin et al. | |
| 2021/0029119 A1* | 1/2021 | Raman | G06F 3/0665 |
| 2021/0036991 A1 | 2/2021 | Owens et al. | |
| 2021/0051179 A1* | 2/2021 | Hulick, Jr. | G06F 11/1451 |
| 2021/0073265 A1 | 3/2021 | Thakkar et al. | |
| 2021/0075790 A1 | 3/2021 | Hebert et al. | |
| 2021/0103580 A1 | 4/2021 | Schierz et al. | |
| 2021/0136115 A1 | 5/2021 | Andrews et al. | |
| 2021/0182126 A1* | 6/2021 | Walters | H04N 21/8153 |
| 2021/0192027 A1 | 6/2021 | Malton et al. | |
| 2021/0192535 A1 | 6/2021 | Lee et al. | |
| 2021/0234860 A1* | 7/2021 | Bansal | H04W 12/37 |
| 2021/0234919 A1 | 7/2021 | Paralikar et al. | |
| 2021/0250341 A1 | 8/2021 | Senftleber et al. | |
| 2021/0255907 A1 | 8/2021 | Walters et al. | |

(56) References Cited

U.S. PATENT DOCUMENTS

| | | | |
|---|---|---|---|
| 2021/0281567 A1 | 9/2021 | Arai | |
| 2021/0306371 A1 | 9/2021 | Majkowski et al. | |
| 2022/0247768 A1* | 8/2022 | Datar | .................. H04L 63/1425 |

FOREIGN PATENT DOCUMENTS

| | | | | |
|---|---|---|---|---|
| JP | 5695002 B2 | 4/2015 | | |
| KR | 10-2013-0086380 A | 8/2013 | | |
| KR | 10-2017-0094863 A | 8/2017 | | |
| WO | WO-2010144735 A2 * | 12/2010 | .......... | G06F 11/1451 |
| WO | WO-2016028779 A1 * | 2/2016 | .......... | G06F 11/1451 |
| WO | WO-2021061932 A1 * | 4/2021 | ............. | G06F 16/95 |

OTHER PUBLICATIONS

"Set proxy settings and properties for scripted monitors New Relic Documentation", [retrieved on Apr. 7, 2021], Retrieved from the Internet <https://docs.newrelic.com/docs/synthetics/synthetic-monitoring/scripting-monitors/set-proxy-settings-properties-scripted-monitors>, 2 pages.

"Set up a proxy for private synthetic monitoring—Dynatrace Help", [retrieved on Apr. 7, 2021]. Retrieved from the Internet <https://www.dynatrace.com/support/help/how-to-use-dynatrace/synthetic-monitoring/private-synthetic-ocations/setting-up-proxy-for-private-synthetic/>, 6 pages.

"Write synthetic API tests New Relic Documentation", [retrieved on Apr. 7, 2021], Retrieved from the Internet <https://docs.newrelic.com/docs/synthetics/synthetic-monitoring/scripting-monitors/write-synthetic-api-tests/>, 4 pages.

J. Reschke et, al, "Out-Of-Band' Content Coding for HTTP", Jun. 24, 2017, 17 pages, [retrieved on Apr. 7, 2021], Retrieved from the Internet <https://tools.ietf.org/id/draft-reschke-http-oob-encoding-12.html>.

"Out-of-band resource load (HTTP)—PortSwigger", 2 pages, [retrieved on Apr. 7, 2021], Retrieved from the Internet <https://portswigger.net/kb/issues/00100a00_out-of-band-resource-load-http>.

"Problems in Generating Synthetic HTTP requests", 1 page, [retrieved on Apr. 7, 2021]. Retrieved from the Internet <https://www.usenix.org/legacy/publications/library/proceedings/usits97/full_papers/banga/banga_html/node4.html>.

Kearn, M., "Synthetic Request Injection to Generate Metadata for Cloud Policy Enforcement Report—Addendum 2B", Apr. 7, 2021, 2 pages.

Kearn, M., "Synthetic Request Injection to Generate Metadata for Cloud Policy Enforcement Report", Apr. 7, 2021, 2 pages.

U.S. Appl. No. 17/238,579—Office Action dated Jun. 24, 2021, 15 pages.

U.S. Appl. No. 17/237,783—Office Action dated Jul. 22, 2021, 14 pages.

U.S. Appl. No. 17/238,545—Notice of Allowance dated Jul. 14, 2021, 32 pages.

U.S. Appl. No. 17/237,863—Notice of Allowance dated Jun. 23, 2021, 17 pages.

U.S. Appl. No. 17/237,964—Notice of Allowance, dated Jun. 30, 2021, 41 pages.

U.S. Appl. No. 17/238,563 First Office Action, dated Jun. 30, 2021, 29 pages.

U.S. Appl. No. 17/237,748 First Office Action, dated Jun. 25, 2021, 31 pages.

Anonymous, Post Office Protocol—Version 3—RFC 1939, retrieved on Apr. 6, 2022, 23 pages. Retrieved from the Internet [URL: https://tools.ietf.org/html/rfc1939].

U.S. Appl. No. 17/237,783—Response to Office Action dated Jul. 22, 2021 and Restriction Requirement, filed Oct. 21, 2021, 9 pages.

U.S. Appl. No. 17/237,877—Response to Final Office Action dated Jan. 4, 2022, filed Apr. 4, 2022, 11 pages.

U.S. Appl. No. 17/237,877—Office Action dated Sep. 1, 2021, 53 pages.

U.S. Appl. No. 17/237,748—Final Office Action dated Oct. 21, 2021, 46 pages.

U.S. Appl. No. 17/238,563—Notice of Allowance dated Oct. 28, 2021, 34 pages.

U.S. Appl. No. 17/238,579—Notice of Allowance, dated Oct. 26, 2021, 20 pages.

U.S. Appl. No. 17/237,783—Notice of Allowance, dated Nov. 17, 2021, 14 pages.

U.S. Appl. No. 17/238,563—Response to Office Action dated Jun. 30, 2021, filed Sep. 30, 2021, 13 pages.

U.S. Appl. No. 17/238,579—Response to Office Action dated Jun. 24, 2021, filed Sep. 24, 2021, 11 pages.

U.S. Appl. No. 17/237,877—Response to Office Action dated Sep. 1, 2021, filed Dec. 1, 2021, 13 pages.

U.S. Appl. No. 17/237,748—Response to Office Action dated Jun. 25, 2021, filed Sep. 27, 2021, 15 pages.

U.S. Appl. No. 17/237,877 Final Office Action, dated Jan. 4, 2022, 47 pages.

U.S. Appl. No. 17/237,748 Notice of Allowance, dated Jan. 10, 2022, 17 pages.

Cheng et al., "Cloud Security For Dummies, Netskope Special Edition," John Wiley & Sons, Inc., dated 2015, 53 pages.

"Netskope Introspection," netSkope, Inc., 2015, 3 pgs.

Netskope, "Data Loss Prevention and Monitoring in the Cloud", Nov. 2014, 18 pages.

"Cloud Data Loss Prevention Reference Architecture", Netskope, Sep. 2015, WP-88-1, 2 pages.

"The Netskope Active Platform Enabling Safe Migration to the Cloud", Apr. 2015, DS-1-8, Netskope, Inc., 6 pages.

"The Netskope Advantage: Three "Must-Have" Requirements for Cloud Access Security Brokers", Jul. 2015, WP-12-2, 4 pages.

"Netskope The 15 Critical CASB Use Cases", Netskope Inc., EB-141-1, dated 2015, 19 pages.

"Repave the Cloud-Data Breach Collision Course," netskope, Inc., 2014, 6 pgs.

Netskope, "The 5 Steps to Cloud Confidence," netskope Inc., 2014, 11 pgs.

"Netskope Cloud Confidence Index," netskope, Inc., 2015, 4 pgs.

Netskope, Netskope Active Cloud DLP, dated 2015, 4 pages.

Anonymous, Lightweight Directory Access Protocol, Wikipedia, retrieved on Feb. 17, 2022, 13 pages. Retrieved from the internet [URL: https://en.wikipedia.org/wiki/Lightweight_Directory_Access_Protocol].

Anonymous, Real Time Streaming Protocol, Wikipedia, retrieved on Feb. 17, 2022, 10 pages. Retrieved from the Internet [URL: https://en.wikipedia.org/wiki/Real_Time_Streaming_Protocol].

Anonymous, Real-Time Messaging Protocol, Wikipedia, retrieved on Feb. 17, 2022,10 pages. Retrieved from the nternet [URL: https://en.wikipedia.org/wiki/Real-Time_Messaging_Protocol].

Anonymous, Comparison of instant messaging protocols, Wikipedia, retrieved on Feb. 17, 2022,2 pages. Retrieved from the internet [URL: https://en.wikipedia.org/w/index.php?title=Comparison_of_instant_messaging_protocols&oldid=1013553466].

Curl, The Art of Scripting HTTP Requests Using Curl, Curl Documentation, retrieved on Feb. 17, 2022, 11 pages. Retrieved from the internet [URL: https://curl.se/docs/httpscripting.html].

Anonymous, cURL, Wikipedia, retrieved on Feb. 17, 2022, 4 pages. Retrieved from the internet [URL: https://en.wikipedia.org/w/index.php?title=CURL&oldid=1002535730].

U.S. Appl. No. 17/237,748 Supplemental Notice of Allowability, dated Jan. 18, 2022, 4 pages.

Anonymous, Hypertext Transfer Protocol, Wikipedia, retrieved on Apr. 6, 2022, 15 pages. Retrieved from the internet [URL: https://en.wikipedia.org/w/index.php?title=Hypertext_Transfer_Protocol&oldid=1012415417].

Anonymous, List of HTTP header fields, Wikipedia, retrieved on Apr. 6, 2022, 10 pages. Retrieved from the internet [URL—https://en.wikipedia.org/w/index.php?title=List_of_HTTP_header_fields&oldid=1012071227].

Anonymous, List of FTP commands, Wikipedia, retrieved on Apr. 6, 2022, 5 pages. Retrieved from the internet [URL https://en.wikipedia.org/wiki/List_of_FTP_commands].

(56) References Cited

OTHER PUBLICATIONS

Documentation, tftp or utftp Command, IBM, retrieved on Apr. 6, 2022, 15 pages. Retrieved from the internet [URL https://www.ibm.com/support/knowledgecenter/ssw_aix_72/t_commands/tftp.html].
Anonymous, Simple Mail Transfer Protocol (SMTP) Commands—RFC 2821, retrieved on Apr. 6, 2022, 79 pages. Retrieved from the internet [URL—https://tools.ietf.org/html/rfc2821].
Anonymous, Internet Message Protocol (IMAP) Commands—RFC 3501, retrieved on Apr. 6, 2022, 108 pages. Retrieved from the internet [URL: https://tools.ietf.org/html/rfc3501for].
International Search Report and Written Opinion issued in PCT application No. PCT/US2022/025781 dated Jul. 29, 2022, 11 pages.
International Search Report and Written Opinion issued in Application No. PCT/US2022/025787 dated Aug. 1, 2022, 10 pages.
International Search Report and Written Opinion issued in PCT application No. PCT/US2022/025765 dated Aug. 4, 2022, 12 pages.
International Search Report and Written Opinion issued in PCT application No. PCT/US2022/025769 dated Aug. 4, 2022, 13 pages.
U.S. Appl. No. 17/237,877—Notice of Allowance dated Dec. 27, 2022, 13 pages.
U.S. Appl. No. 17/688,826 Non-Final Office Action dated Feb. 16, 2023, 13 pages.
Michael Pleshakov, 'Deploying NGINX Plus as a Cloud Load Balancer for OpenStack', NGINX, F5, Oct. 19, 2016 [Retrieved on Jun. 22, 2022], Retrieved from the Internet: <URL:https://www.nginx.com/blog/nginx-plus-cloud-load-balancer-openstack></URL:https:>, Oct. 19, 2016.

* cited by examiner

```
401 App-Expected Response 532

"response": {
  "status_code": 401,
  "status_msg": "Unauthorized",
  "close_connection": false,
  "add_contentlength": true,
  "response_hdrs": [ {
    "name": "Content-Type",
    "value": "application/json; charset=UTF-8"
  },
  {
    "name": "XContent-Type-Options",
    "value": "nosniff"
  },
  {
    "name": "Server",
    "value": "GSE"
  }
  ],
  "response_body": "{\"error\":{\"errors\":[{\"domain\":\"global\",\"reason\":\"authError\",\"message\":\"Invalid Credentials\",\"locationType\":\"header\",\"location\":\"Authorization\"}],\"code\":401,\"message\":\"Invalid Credentials\"}}"
}
```

Figure 6

People Token Request 546

```
"request": {
      "method": "POST",
      "url": "https://oauthaccountmanager.googleapis.com/v1/issuetoken",
      "fixedhdrs": [ "User-Agent" ],
      "dynamichdrs": [{
            "name": "Accept",
            "value": "*/*"
      },
      {
      "name": "Host",
      "value": "oauthaccountmanager.googleapis.com"
      },
      {
      "name": "Accept-Language",
      "value": "en-us"
      },
      {
      "name": "Accept-Encoding",
      "value": "br,
      gzip, deflate"
      },
      {
      "name": "Content-Type",
      "value": "application/x-www-form-urlencoded"
      },
      {
      "name": "Authorization",
      "value": "Bearer {{master_token}}"
      }
      ],
      "request_body":
      "client_id=936475272427.apps.googleusercontent.com&device_id=
      {{device_id}}&hl=en-IN&lib_ver=3.
      3&passcode_present=YES&response_type=token&scope=https%3A%2F%
      2Fwww.googleapis.com%2Fauth%2Fpeopleapi.readonly"
      }
      }
```

Figure 7

Synthetic Request 568

```
"request": {
    "method": "GET",
    "url": "https://people-pa.
googleapis.com/v2/people?person_id=me&request_mask.
include_container=ACCOUNT&request_mask.
include_container=PROFILE&request_mask.
include_container=DOMAIN_PROFILE&request_mask.include_field.
paths=person.cover_photo&request_mask.include_field.paths=person.
email&request_mask.include_field.paths=person.photo&request_mask.
include_field.paths=person.metadata&request_mask.include_field.
paths=person.name&request_mask.include_field.paths=person.
read_only_profile_info&request_mask.include_field.paths=person.
read_only_profile_info.customer_info",
    "fixedhdrs": [ "User-Agent" ],
    "dynamichdrs": [{
        "name": "Accept",
        "value": "*/*"
    },
    {
        "name": "Host",
        "value": "people-pa.googleapis.com"
    },
    {
        "name": "Accept-Language",
        "value": "en-us"
    },
    {
        "name": "Accept-Encoding",
        "value": "br, gzip, deflate"
    },
    {
        "name": "Authorization",
        "value": "Bearer {people_token}"
    }
```

Figure 8

NETWORK INTERMEDIARY WITH NETWORK REQUEST-RESPONSE MECHANISM

PRIORITY APPLICATION

This application is a continuation of co-pending U.S. Non-provisional patent application Ser. No. 17/237,964, filed Apr. 22, 2021, entitled "Synthetic Request Injection to Generate Metadata for Cloud Policy Enforcement".

FIELD OF THE TECHNOLOGY DISCLOSED

The technology disclosed relates to configuring a network intermediary or security middleware (e.g., CASBs, SWGs, firewalls) with a network request-response mechanism and methods to achieve a target network security objective. The request-response mechanism and methods can be implemented in various network protocols for inter-process communications like FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY, and TFTP.

RELATED APPLICATIONS

This application is related to U.S. patent application Ser. No. 17/238,545, filed Apr. 23, 2021, titled "SYNTHETIC REQUEST INJECTION TO GENERATE METADATA AT POINTS OF PRESENCE FOR CLOUD SECURITY ENFORCEMENT", filed contemporaneously. The related application is hereby incorporated by reference for all purposes.

This application is related to U.S. patent application Ser. No. 17/238,563, filed Apr. 23, 2021, titled "DATA FLOW LOGIC FOR SYNTHETIC REQUEST INJECTION FOR CLOUD SECURITY ENFORCEMENT", filed contemporaneously. The related application is hereby incorporated by reference for all purposes.

This application is related to U.S. patent application Ser. No. 17/238,579, filed Apr. 23, 2021, titled "SYNTHETIC REQUEST INJECTION TO RETRIEVE OBJECT METADATA FOR CLOUD POLICY ENFORCEMENT", filed contemporaneously. The related application is hereby incorporated by reference for all purposes.

This application is related to U.S. patent application Ser. No. 17/237,877, filed Apr. 22, 2021, titled "SYNTHETIC REQUEST INJECTION TO RETRIEVE EXPIRED METADATA FOR CLOUD POLICY ENFORCEMENT", filed contemporaneously. The related application is hereby incorporated by reference for all purposes.

This application is related to U.S. patent application Ser. No. 17/237,863, filed Apr. 22, 2021, titled "SYNTHETIC REQUEST INJECTION TO IMPROVE OBJECT SECURITY POSTURE FOR CLOUD SECURITY ENFORCEMENT", filed contemporaneously. The related application is hereby incorporated by reference for all purposes.

This application is related to U.S. patent application Ser. No. 17/237,783, filed Apr. 22, 2021, titled "SYNTHETIC REQUEST INJECTION TO DISAMBIGUATE BYPASSED LOGIN EVENTS FOR CLOUD POLICY ENFORCEMENT", filed contemporaneously. The related application is hereby incorporated by reference for all purposes.

This application is related to U.S. patent application Ser. No. 17/237,748, filed Apr. 22, 2021, titled "SYNTHETIC REQUEST INJECTION FOR CLOUD POLICY ENFORCEMENT", filed contemporaneously. The related application is hereby incorporated by reference for all purposes.

INCORPORATIONS

The following are incorporated by reference for all purposes as if fully set forth herein:

U.S. patent application Ser. No. 14/198,499, filed Mar. 5, 2014, titled "SECURITY FOR NETWORK DELIVERED SERVICES,";

U.S. patent application Ser. No. 14/198,508, filed Mar. 5, 2014, titled "SECURITY FOR NETWORK DELIVERED SERVICES,";

U.S. patent application Ser. No. 14/835,640, filed Aug. 25, 2015, titled "SYSTEMS AND METHODS OF MONITORING AND CONTROLLING ENTERPRISE INFORMATION STORED ON A CLOUD COMPUTING SERVICE (CCS),";

U.S. patent application Ser. No. 14/835,632, filed Aug. 25, 2015, titled "SYSTEMS AND METHODS OF PER-DOCUMENT ENCRYPTION OF ENTERPRISE INFORMATION STORED ON A CLOUD COMPUTING SERVICE (CCS),";

U.S. patent application Ser. No. 15/368,240, filed Dec. 2, 2016, titled "SYSTEMS AND METHODS OF ENFORCING MULTI-PART POLICIES ON DATA-DEFICIENT TRANSACTIONS OF CLOUD COMPUTING SERVICES,";

U.S. patent application Ser. No. 15/368,246, filed Dec. 2, 2016, titled "MIDDLE WARE SECURITY LAYER FOR CLOUD COMPUTING SERVICES";

U.S. patent application Ser. No. 15/256,483, filed Sep. 2, 2016, titled "MACHINE LEARNING BASED ANOMALY DETECTION,";

U.S. patent application Ser. No. 15/628,547, filed Jun. 20, 2017, titled "SYSTEMS AND METHODS OF DETECTING AND RESPONDING TO A DATA ATTACK ON A FILE SYSTEM,";

U.S. patent application Ser. No. 15/628,551, filed Jun. 20, 2017, titled "SYSTEMS AND METHODS OF DETECTING AND RESPONDING TO MALWARE ON A FILE SYSTEM,";

U.S. patent application Ser. No. 15/795,957, filed Oct. 27, 2017, titled "NON-INTRUSIVE SECURITY ENFORCEMENT FOR FEDERATED SINGLE SIGN-ON (SSO),";

U.S. patent application Ser. No. 15/958,672, filed Apr. 20, 2018, titled "REDUCING LATENCY IN SECURITY ENFORCEMENT BY A NETWORK SECURITY SYSTEM (NSS),";

U.S. patent application Ser. No. 15/958,637, filed Apr. 20, 2018, titled "REDUCING ERROR IN SECURITY ENFORCEMENT BY A NETWORK SECURITY SYSTEM (NSS),";

U.S. patent application Ser. No. 16/044,326, filed Jul. 24, 2018, titled "COMPACT LOGGING OF NETWORK TRAFFIC EVENTS,";

U.S. patent application Ser. No. 16/016,430, filed Jun. 22, 2018, titled "AGGREGATE NETWORK TRAFFIC MONITORING,";

U.S. patent application Ser. No. 15/986,732, filed May 22, 2018, titled "DATA LOSS PREVENTION USING CATEGORY-DIRECTED PARSERS,";

U.S. patent application Ser. No. 15/911,034, filed Mar. 2, 2018, titled "SIMULATION AND VISUALIZATION OF MALWARE SPREAD IN A CLOUD-BASED COLLABORATION ENVIRONMENT,";
U.S. patent application Ser. No. 16/556,168, filed Aug. 29, 2019, titled "METHODS AND SYSTEMS FOR SECURING AND RETRIEVING SENSITIVE DATA USING INDEXABLE DATABASES,";
U.S. patent application Ser. No. 16/118,278, filed Aug. 30, 2018, titled "ENRICHING DOCUMENT METADATA WITH CONTEXTUAL INFORMATION,";
U.S. patent application Ser. No. 16/408,215, filed May 9, 2019, titled "SMALL-FOOTPRINT ENDPOINT DATA LOSS PREVENTION (DLP),";
U.S. patent application Ser. No. 16/257,027, filed Jan. 24, 2019, titled "INCIDENT-DRIVEN INTROSPECTION FOR DATA LOSS PREVENTION,";
U.S. patent application Ser. No. 16/226,394, filed Dec. 19, 2018, titled "MULTI-LABEL CLASSIFICATION OF TEXT DOCUMENTS,";
U.S. patent application Ser. No. 16/361,023, filed Mar. 21, 2019, titled "SYSTEMS AND METHODS FOR ALERT PRIORITIZATION USING SECURITY EVENTS GRAPH,";
U.S. patent application Ser. No. 16/361,039, filed Mar. 21, 2019, titled "SYSTEM AND METHODS TO SHOW DETAILED STRUCTURE IN A SECURITY EVENTS GRAPH,";
U.S. patent application Ser. No. 16/807,128, filed Mar. 2, 2020, titled "LOAD BALANCING IN A DYNAMIC SCALABLE SERVICES MESH,";
U.S. patent application Ser. No. 16/807,132, filed Mar. 2, 2020, titled "RECOVERY FROM FAILURE IN A DYNAMIC SCALABLE SERVICES MESH,"
U.S. patent application Ser. No. 17/157,947, filed Jan. 25, 2021, titled "METADATA-BASED DETECTION AND PREVENTION OF PHISHING ATTACKS,";
U.S. patent application Ser. No. 16/411,039, filed May 13, 2019, titled "METADATA-BASED DATA LOSS PREVENTION (DLP) FOR CLOUD RESOURCES,";
U.S. patent application Ser. No. 16/556,183, filed Aug. 29, 2019, titled "EFFICIENT SCANNING FOR THREAT DETECTION USING IN-DOC MARKERS,";
U.S. patent application Ser. No. 16/891,647, filed Jun. 3, 2020, titled "DETECTING IMAGE-BORNE IDENTIFICATION DOCUMENTS FOR PROTECTING SENSITIVE INFORMATION,";
U.S. patent application Ser. No. 16/891,678, filed Jun. 3, 2020, titled "DETECTING SCREENSHOT IMAGES FOR PROTECTING AGAINST LOSS OF SENSITIVE SCREENSHOT-BORNE DATA,";
U.S. patent application Ser. No. 16/891,698, filed Jun. 3, 2020, titled "DETECTING ORGANIZATION IMAGE-BORNE SENSITIVE DOCUMENTS AND PROTECTING AGAINST LOSS OF THE SENSITIVE DOCUMENTS,";
U.S. patent application Ser. No. 17/163,408, filed Jan. 30, 2021, titled "UNIFIED POLICY ENFORCEMENT MANAGEMENT IN THE CLOUD,";
U.S. patent application Ser. No. 17/163,285, filed Jan. 29, 2021, titled "DYNAMIC POWER USER IDENTIFICATION AND ISOLATION FOR MANAGING SLA GUARANTEES,";
U.S. patent application Ser. No. 17/154,978, filed Jan. 21, 2021, titled "PREVENTING PHISHING ATTACKS VIA DOCUMENT SHARING,";
U.S. patent application Ser. No. 17/184,478, filed Feb. 24, 2021, titled "SIGNATURELESS DETECTION OF MALICIOUS MS OFFICE DOCUMENTS CONTAINING ADVANCED THREATS IN MACROS,";
U.S. patent application Ser. No. 17/184,502, filed Feb. 24, 2021, titled "SIGNATURELESS DETECTION OF MALICIOUS MS OFFICE DOCUMENTS CONTAINING EMBEDDED OLE OBJECTS,";
U.S. patent application Ser. No. 17/163,411, filed Jan. 30, 2021, titled "DYNAMIC DISTRIBUTION OF UNIFIED SECURITY POLICIES IN A CLOUD-BASED SECURITY SYSTEM,";
U.S. patent application Ser. No. 17/163,415, filed Jan. 30, 2021, titled "DYNAMIC ROUTING OF ACCESS REQUEST STREAMS IN A UNIFIED POLICY ENFORCEMENT SYSTEM,"; and
U.S. patent application Ser. No. 17/163,416, filed Jan. 30, 2021, titled "UNIFIED SYSTEM FOR DETECTING POLICY ENFORCEMENT ISSUES IN A CLOUD-BASED ENVIRONMENT,".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Data loss prevention, often shortened to DLP, is a set of processes and tools used to ensure that sensitive data is not lost, misused, or accessed by unauthorized persons. The term sensitive data often refers to personal data, which is defined by the European Union as any information relating to an identified or identifiable individual. However, sensitive data can also refer to any data of which the compromise with respect to confidentiality, integrity, or availability could have an adverse material effect on the interests of involved parties.

Data loss is a real problem faced by business, gaining importance with the increasing proliferation of information systems. The need of businesses to protect their sensitive data stems not only from financial factors, but also from the need to comply with laws and regulations of their respective countries and moral obligations. For example, Treaty No. 108 of the Council of Europe strictly mandates that appropriate security measures are taken for the protection of personal data stored in automated data files against accidental or unauthorized destruction or accidental loss as well as against unauthorized access, alteration, or dissemination. The failure to comply with such regulations can be punished by harsh penalties. For example, penalties stated in the General Data Protection Regulation (also known as GDPR) have recently garnered wide attention and have become a major concern for many companies.

Public cloud-based applications, especially software as a service, are a special case with regard to data loss prevention. These applications deviate from the older on-premises DLP paradigm by storing and manipulating sensitive data outside the total control of the organization. The systems are hosted outside the premises of the companies and are managed by the cloud provider with limited options for configuration, management, and extensibility by the customer. This severely hinders the capabilities of traditional DLP systems focusing on on-premises infrastructure, as data is heavily manipulated remotely through web applications, is not always stored on endpoints and network shares that can be searched by traditional crawlers and is expected to be allowed to breach the on-premises barrier when communicating with the cloud.

A class of security solutions that focus on protecting data manipulated in cloud-based applications are cloud access security brokers, commonly shortened to CASBs. CASBs provide multiple types of security policy enforcement. These include authenticated access, single sign-on, authorization, credential mapping, DLP, IP restriction, device restriction, device profiling, geographical restriction, time zone restriction, encryption, tokenization, logging, altering, and malware detection and prevention.

CASBs are specialized security solutions developed by third parties to address security gaps in organizations' usage of cloud services. They provide protection concurrently across multiple cloud services and offer visibility into user activities and their granular control. The primary focus is on back-office and productivity applications delivered in the software as a service model. They operate inline between the client and the cloud server, intercepting traffic as a forward or reverse proxy. They can also function in an out-of-band fashion, by interfacing with the cloud service with an application programming interface (API) to perform their operations directly in the cloud environment.

There are two main types of architectural approaches used in proxy-based CASB systems. In the forward proxy model, the solution operates by leveraging a network gateway that intercepts all communication to the cloud services. Some solutions may even complement this by deploying endpoint agents or by other methods. This method can be fairly intrusive with regard to the infrastructure, as it requires all traffic from clients to the cloud servers to be forcibly routed through the gateway. An advantage of this approach is having more visibility into the usage of unsanctioned cloud services, as all traffic to them passes through the broker, and enforcement of real-time policy actions. The main disadvantage lies in the difficulty of addressing unmanaged devices and bring your own device (BYOD) scenarios.

In the reverse proxy model, the network nodes hidden behind the proxy are not the clients, but the cloud servers instead. The broker can be deployed either on-premises or cloud-based, using the software as a service model. This can be achieved by redirecting the authentication mechanism of the cloud service to the CASB by which it inserts itself between the endpoint users and the cloud service. The users can then use the cloud services in the same fashion as before but with rewritten uniform resource locators (URLs). An advantage of this model is easy support for the BYOD scenarios, as there are little to no configuration changes needed on endpoint devices. With regard to data loss prevention, systems that employ these inline protection methods are mainly focused on data in motion. The methods by which they protect sensitive data are very similar to those offered by on-premises DLP systems. They can utilize most of the previously described methods for data classification, as well as handle leakage incidents by blocking, quarantining, encryption, or tokenization before the data is passed to the cloud service.

A significantly different model to the proxy-based approach is used by API-based CASB systems. These solutions provide their functionality by interfacing with API exposed by the cloud service providers themselves, rather than intercepting traffic as a middleman. The point of difference in data loss prevention capabilities, compared to the proxy-based systems, is that these systems are better suited for protection of data at rest. They are capable of accessing the cloud file storage by themselves by leveraging the API to download and inspect the files for data classification. The data can then be protected by CASB-native methods or by leveraging native capabilities of the cloud services themselves to protect the data with access controls or encryption, for example with Salesforce Shield or Azure Information Protection. Systems utilizing this model can also increase their auditing capabilities by consuming audit and user activity logs collected by the services themselves. The logs from different services can then be consolidated into a single stream. As with other features derived from this approach, this assumes the cloud service providers expose an API for log consumption.

The assignee, Netskope, Inc., offers CASB solutions that use metadata for context-based policy enforcement. However, accessing metadata is a non-trivial challenge because cloud service providers require these CASB solutions to intermediate within an exacting sequence of traffic inspection. When the metadata is not available in a transaction stream, these CASB solutions have limited ability to garner the missing metadata and therefore unable to enforce appropriate policies.

An opportunity arises to make these CASB solutions self-sufficient to independently retrieve the missing metadata while adhering to the demanding intermediation protocols of the cloud service providers. Improved security posture and reduced risk of data loss, exposure, and exfiltration across multi-cloud, web, and email environment may result.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 6 shows one example of a 401 App-Expected Response issued as a synthetic request to clients running native apps.

FIG. 7 shows one example of a people token request issued as a synthetic request to cloud applications.

FIG. 8 shows another example of a synthetic request.

DETAILED DESCRIPTION

Figure 1:
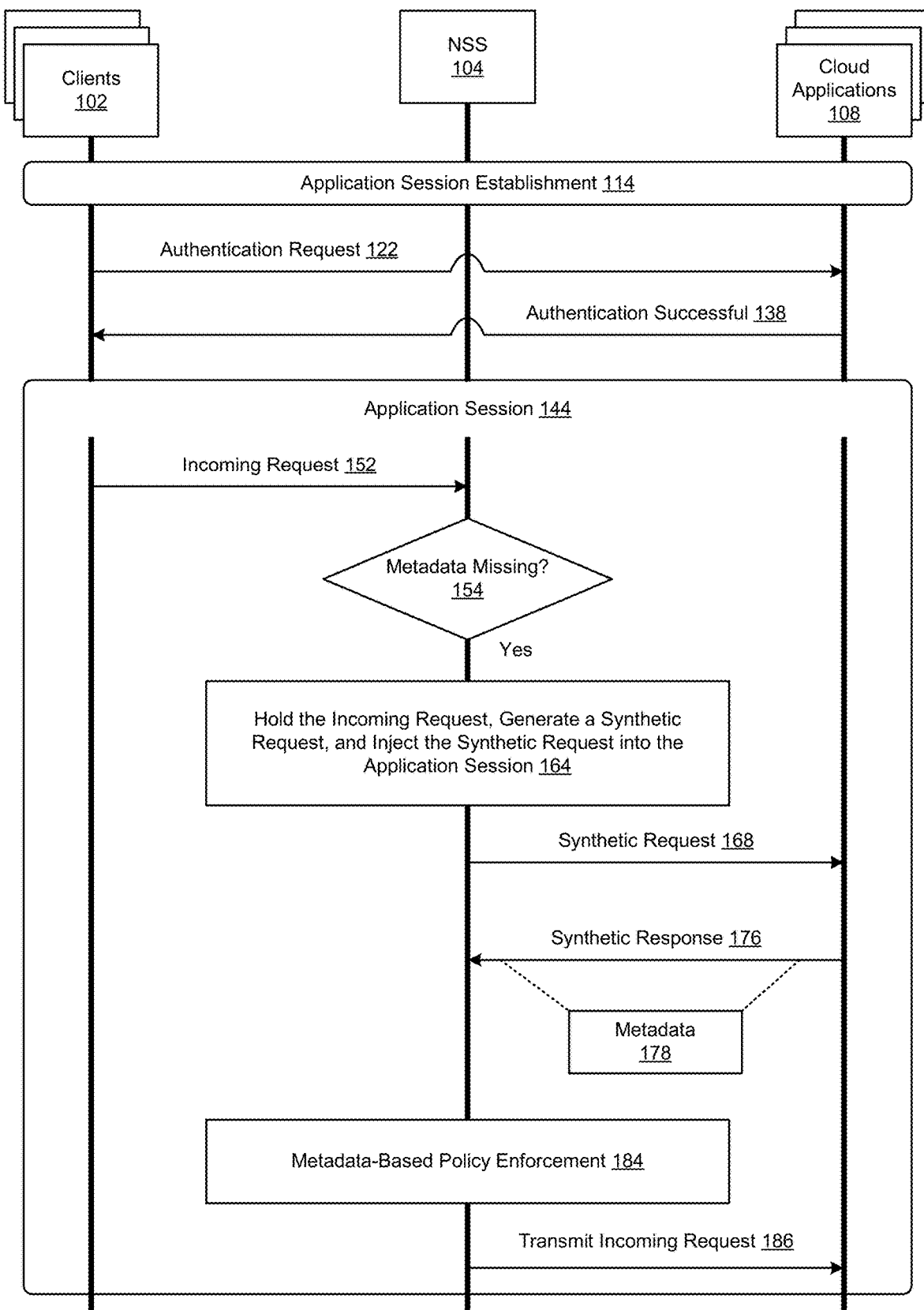
FIG. 1 shows one implementation of a network security system issuing a synthetic request during an application session of a cloud application to retrieve metadata that is otherwise missing from the application session.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Cloud Applications

Cloud applications 108 are network services that can be web-based (e.g., accessed via a uniform resource locator (URL)) or native, such as sync clients. The cloud applications 108 can be cloud storage applications, cloud computing applications, hosted services, news websites, blogs, video streaming websites, social media websites, collaboration and messaging platforms, and customer relationship management (CRM) platforms. The cloud applications 108 can be provided as software-as-a-service (SaaS) offerings, platform-as-a-service (PaaS) offerings, and infrastructure-as-a-service (IaaS) offerings, as well as internal enterprise applications that are exposed via URLs.

Examples of common cloud applications today include Box™, Dropbox™, Google Drive™, Amazon AWS™, Google Cloud Platform (GCP)™, Microsoft Azure™, Microsoft Office 365™, Google Workspace™, Workday™, Oracle on Demand™, Taleo™, Jive™, Concur™ YouTube™, Facebook™, Twitter™, Google™, LinkedIn™, Wikipedia™, Yahoo™, Baidu™ Amazon™, MSN™, Pinterest™, Taobao™, Instagram™, Tumblr™, eBay™, Hotmail™, Reddit™ IMDb™, Netflix™, PayPal™, Imgur™, Snapchat™, Yammer™, Skype™, Slack™, HipChat™, Confluence™, TeamDrive™, Taskworld™, Chatter™, Zoho™, ProsperWorks™, Gmail™, and Salesforce.com™.

The cloud applications 108 provide functionality to users that is implemented in the cloud and that is the target of policies, e.g., logging in, editing documents, downloading bulk data, reading customer contact information, entering payables, deleting documents, in addition to the offerings of a simple website and ecommerce sites. Note that some consumer facing websites, e.g., Facebook™ and Twitter™, which offer social networks, are the type of cloud applications considered here. Some cloud applications, e.g., Gmail™, can be a hybrid with some free users using the application generally while other corporations use it as an enterprise subscription. Note that a cloud application can be supported by both web browser clients and application clients that use URL-based APIs (application programming interfaces). Thus, using Dropbox™ as an example, user activity on the Dropbox™ website, as well as activity of the Dropbox™ client on the computer could be monitored.

The cloud applications 108 often publish their APIs to allow a third party to communicate with them and utilize their underlying data. An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code-based application intended to be used as an interface by software components to communicate with each other. An API can include applications for routines, data structures, object classes, and variables. Basically, an API provides an interface for developers and programmers to access the underlying data, platform capabilities, and features of web services. Implementations of the technology disclosed use different types of APIs, non-exclusive examples of which include remote invocation of services to return data, web service APIs such as HTTP or HTTPs based APIs like SOAP, WSDL, Bulk, XML-RPC and JSON-RPC and REST APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs like Java API and Android API (e.g., Google Maps™ Android API, MSDN Class Library for .NET Framework, Twilio™ APIs for Java and C#), OS functions and routines like access to file system and access to user interface, object remoting APIs like CORBA and .NET Remoting, and hardware APIs like video acceleration, hard disk drives, and PCI buses. Other examples of APIs used by the technology disclosed include Amazon EC2 API™, Box Content API™, Box Events API™, Microsoft Graph™, Dropbox API™, Dropbox API v2™, Dropbox Core API™, Dropbox Core API v2™, Facebook Graph API™, Foursquare API™, Geonames API™ Force.com API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, and aggregated-single API like CloudRail™ API.

Network Security System

A network security system (NSS) 104, also referred to herein as a policy enforcement system, intermediates network traffic that pass between clients 102 and the cloud applications 108. The network security system 104 consolidates multiple types of security enforcements. Examples of the security enforcements include authentication, federated single sign-on (SSO), authorization, credential mapping, device profiling, encryption, tokenization, data leakage prevention (DLP), logging, alerting, and malware detection and prevention.

Examples of the clients 102 include browsers, web apps, native apps, and hybrid apps. Examples of the network security system 104 include cloud access security brokers (CASBs), secure web gateways (SWGs), network firewalls, application firewalls, routing systems, load balancing systems, filtering systems, data planes, management planes, data loss prevention (DLP) systems, intrusion prevention systems (IPSs), zero trust network access (ZTNA), and secure access service edge (SASE). The network security system 104 can also be a network security stack that includes different security systems like the CASBs, the SWGs, the network firewalls, the application firewalls, the routing systems, the load balancing systems, the filtering systems, the data planes, the management planes, the DLP systems, and the IP systems. The network security system 104 can be implemented on-premises or can be cloud-based. Also, multiple geographically distributed points of presence of the network security system 104 can be implemented in a secure access service edge (SASE) network.

Employees now rely on the cloud applications 108 to perform business-critical functions and routinely upload sensitive and regulated data to the web. The network security system 104 intercepts network traffic in real-time to prevent loss of sensitive data by inspecting data en route to or from the cloud applications 108 and data resident in the cloud applications 108. The network security system 104 analyzes application layer traffic using APIs to deeply inspect cloud application transactions in real-time. The network security system 104 uses a combination of deep application programming interface inspection (DAPII), deep packet inspection (DPI), and log inspection to monitor user activity and perform data loss prevention (DLP). The network security system 104 uses DAPII to detect web transactions in real-time, including calls made to the cloud applications 108. The cloud transactions are decomposed to identify the activity being performed and its associated parameters. In one implementation, the cloud transactions are represented as JSON (JavaScript Object Notation) objects, which identify a structure and format that allows the network security system 104 to both interpret what actions a user is performing in the web service as it is happening. So, for example, the network security system 104 can detect for an organization that "Joe from Investment Banking, currently in Japan, shared his M&A directory with an investor at a hedge fund at 10 PM." The network security system 104 achieves DLP by subjecting data packets to content inspection techniques like language-aware data identifier inspection, document fingerprinting, file type detection, keyword search, pattern matching, proximity search, regular expression lookup, exact data matching, metadata extraction, and language-agnostic double-byte character inspection. The network security system 104 inspects data that is encoded in network packets and/or higher order encodings of the network packets such as secure sockets layer (SSL) and/or transport layer security (TLS) handshakes and Hypertext Transfer Protocol (HTTP) transactions.

In some implementations, the network security system 104 can run on server-side as a cloud resource. In other implementations, the network security system 104 can run on client-side as an endpoint agent. The network security system 104 is also referred to herein as a "proxy."

For additional information about the network security system 104, reference can be made to, for example, commonly owned U.S. patent application Ser. Nos. 14/198,499; 14/198,508; 14/835,640; 14/835,632; and 62/307,305; Cheng, Ithal, Narayanaswamy, and Malmskog. Cloud Security For Dummies, Netskope Special Edition. John Wiley & Sons, Inc. 2015; "Netskope Introspection" by Netskope, Inc.; "Data Loss Prevention and Monitoring in the Cloud" by Netskope, Inc.; "Cloud Data Loss Prevention Reference Architecture" by Netskope, Inc.; "The 5 Steps to Cloud Confidence" by Netskope, Inc.; "The Netskope Active Platform" by Netskope, Inc.; "The Netskope Advantage: Three "Must-Have" Requirements for Cloud Access Security Brokers" by Netskope, Inc.; "The 15 Critical CASB Use Cases" by Netskope, Inc.; "Netskope Active Cloud DLP" by Netskope, Inc.; "Repave the Cloud-Data Breach Collision Course" by Netskope, Inc.; and "Netskope Cloud Confidence Index™" by Netskope, Inc., which are incorporated by reference for all purposes as if fully set forth herein.

Application Session

An "application session" refers to a series of related client requests that emanate from a same client during a certain time period (e.g., fifteen minutes) and are directed towards a same cloud application. A sequence of events occurs in the context of an application session. The main events of note are: (a) login—provide user credentials to a cloud application to authenticate the user; (b) application transactions—execute a set of application level transactions, e.g., upload documents, download documents, add leads, define new campaigns, etc.; and (c) log-out—this event terminates the application session with an application server of the cloud application. In this context, the application session connects these interactions for the network security system 104. Deep packet inspection logic of the network security system 104 can identify these events and link policy evaluations to each transaction boundary enabling actions to be taken. Most commonly, the application session is identified by a session cookie in the HTTP header and assigned an application session identifier. The network security system 104 can use the session cookie or a URL parameter to define the application session.

In contrast, a "connection" refers to a high-level non-network construct (e.g., not a TCP/IP connection) but rather a series of multiple related networks requests and responses. Thus, a series of requests and responses over the course of a day could be a single connection within an application, e.g., all use of Salesforce.com within a period without logging off. One definition of a connection is to look at the application session identifier, e.g., cookie or URL parameter, used by the cloud application so that each connection corresponds to a single session identifier. A connection can include a sequence of application sessions within the boundary of a login event and a log-out event, such that application sessions in the sequence of application sessions are partitioned by time-out events.

Synthetic Request

A "synthetic request" is a request generated by the network security system 104 during an application session and independent of client requests generated by a client during the application session. The synthetic requests can be generated by the network security system 104, for example, on an ad hoc basis. That is, the synthetic requests can be dynamically constructed and issued "on-the-fly" to get information when need arises. The synthetic requests may also be referred to as "synthetic URL requests."

Web transactions are typically accompanied with access tokens (e.g., embedded as request parameters or cookies). By extracting an access token for a given transaction, the network security system 104 can synthetically issue new requests (or transactions) to the cloud applications 108. The synthetic requests can be, for example, API calls that explicitly request the metadata-of-interest. Alternatively, the synthetic requests can trigger page requests that contain the metadata-of-interest. The synthetic requests can be configured to retrieve the metadata-of-interest from the cloud applications 108 or from another independent metadata store.

Client requests, referred to herein as "incoming requests," emanate from the clients 102 and directed towards the cloud applications 108 but are intercepted by the network security system 104 for policy enforcement. The synthetic requests are issued by the network security system 104, directed towards the cloud applications 108, and not subjected to policy enforcement by the network security system 104.

The synthetic requests are issued by the network security system 104 as network transactions of communications protocols (e.g., FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY and TFTP) that, for example, HTTP/HTTPS transactions specify a unified resource identifier (URI) or URL of a resource on the cloud applications 108. The synthetic requests can include different configurations of a request line, request header fields and values therefor, and request methods defined by the applicable communications protocols to indicate the desired action to be performed for a given resource.

Examples of request headers such as HTTP and HTTPS headers and header fields that can be used by the network security system 104 to construct the synthetic requests include cache-control, connection, content-encoding, content-length, content-type, date, pragma, trailer, transfer-encoding, upgrade, via, warning, accept, accept-charset, accept-encoding, accept-language, authorization, cookie, expect, from, host, if-match, if-modified-since, if-none-match, if-range, if-unmodified-since, max-forwards, proxy-authorization, range, referrer, TE, and user-agent. Additional examples and information about the request header fields can be found, e.g., at List of HTTP header fields, https://en.wikipedia.org/w/index.php?title=List_of_HTTP_header_fields&oldid=1012071227 (last visited Mar. 16, 2021), which is incorporated by reference for all purposes as if fully set forth herein.

One example of request methods, HTTP and HTTPS request methods that can be used by the network security system 104 to transmit the synthetic requests include GET, HEAD, POST, PUT, DELETE, CONNECT, OPTIONS, TRACE, and PATCH. Additional information about the HTTP/HTTPS request methods can be found at Hypertext Transfer Protocol, https://en.wikipedia.org/w/index.php?title=Hypertext_Transfer_Protocol&oldid=1012415417 (last visited Mar. 16, 2021), which is incorporated by reference for all purposes as if fully set forth herein.

The intended purpose of the synthetic requests can vary from use case-to-use case. However, opposite to the malicious intent of out-of-band requests triggered by middlemen who hijack application sessions, the synthetic requests are configured to enforce security policies, and thereby thwart data exfiltration and malicious attacks. For example, the synthetic requests can be configured to cause the cloud applications 108 to provide metadata to the network security system 104. In another example, the synthetic requests can be configured to update a security posture of resources (e.g., files) stored at the cloud applications 108. More examples follow.

In the context of this application, injecting a synthetic request in an application session refers to the network security system 104 generating the synthetic request during an already established application session and transmitting the synthetic request to the cloud applications 108 within the context of the already established application session. The synthetic request injection can also include receiving a synthetic response to the synthetic request within the already established application session. Within an application session, multiple synthetic requests can be injected, in parallel or in sequence. The notion of synthetic request injection analogously applies to connections, such that synthetic requests can be injected in an already established connection across multiple application sessions.

In some implementations, a synthetic request is constructed using fields, variables, events, and parameters that are part of the original client request (or incoming request). Examples of such fields, variables, events, and parameters include cookie data, fixed headers, custom headers, and other request header fields of the original client request.

Synthetic Response

A "synthetic response" is an answer that satisfies a corresponding synthetic request issued by the network security system 104. In preferred implementations, a synthetic request is sent by the network security system 104 to the cloud applications 108, and therefore the corresponding synthetic response is transmitted by the cloud applications 108 and received by the network security system 104. Unlike typical server responses, synthetic responses are not subjected to policy enforcement by the network security system 104. The synthetic responses are generated by the cloud applications 108 and received by the network security system 104 independently of the server responses that answer the client requests. Since the synthetic requests are network requests generated by the network security system 104 over a network protocol (e.g., HTTP, HTTPS), the synthetic responses can also be constructed in the like network protocols. Like a typical server response, a synthetic response can include different configurations of a status line, response header fields and values thereof, and content body.

Examples of response header fields such as HTTP/HTTPS response header fields that can be found in the synthetic responses include cache-control, connection, accept-ranges, age, ETag, location, proxy-authenticate, retry-after, server, set-cookie, vary, WWW-authenticate, allow, content-deposition, content-encoding, content-language, content-length, content-location, content-MD5, content-range, content-type, expires, IM, link, pragma, preference-applied, public-key-pins, trailer, transfer-encoding, Tk, strict-transport-security, upgrade, X-frame-options, via, warning, and last-modified. Additional examples and information about the response header fields can be found at, e.g., List of HTTP header fields, https://en.wikipedia.org/w/index.php?title=List_of_HTTP_header_fields&oldid=1012071227 (last visited Mar. 16, 2021), which is incorporated by reference for all purposes as if fully set forth herein.
Examples of Applicable Communication Protocols The disclosed synthetic request-response mechanism can be implemented using a variety of communication protocols. Communications protocols define the basic patterns of dialogue over computer network in proper descriptions of digital and/or analog message formats as well as rules. The Synthetic Request and Synthetic Response can be implemented in the communication protocols capable of constructing request-response messaging patterns, for example, the HTTP and HTTPS protocols. The HTTP (Hypertext Transfer Protocol), HTTPS (HTTP secure) and subsequent revisions such as HTTP/2 and HTTP/3 are the common communication protocols which function as a request-response protocol in the client-server computing model.

Protocols alternative to the HTTP and the variants include the GOPHER protocol which was an earlier content delivery protocol but was displaced by HTTP in 1990s. Another HTTP alternative is the SPDY protocol which was developed by Google and superseded by HTTP/2. Other communication protocols which may support applications incorporating the use of the disclosed synthetic request-response mechanism include but not be limited to, e.g., FTP, FTPS, IMAP, IMAPS, LDAP, LDAPS, POP3, POP3S, RTMP, RTMPS, RTSP, SCP, SFTP, SMTP, SMTPS, and TFTP.

The communication protocols used to exchange files between computers on the Internet or a private network and implementable by the disclosed synthetic request-response mechanism include the FTP (File Transfer Protocol), FTPS (File Transfer Protocol Secure) and SFTP (SSH File Transfer Protocol). FTPS is also known as FTP-SSL. FTP Secure is an extension to the commonly used FTP that adds support for the TLS (Transport Layer Security), and formerly the SSL (Secure Socket Layer). The SSH File Transfer Protocol (i.e., SFTP, also Secure File Transfer Protocol) is an extension of the secure shell (SSH) protocol that provides secure file transfer capabilities and is implementable by the disclosed synthetic request-response mechanism.

Another file transfer protocol, secure copy protocol (SCP) is a means of securely transferring electronic files between a local host and a remote host or between remote hosts and is implementable by the disclosed synthetic request-response mechanism. A client can send (upload) file to a server, optionally including their basic attributes (e.g., permissions, timestamps). A client can also request files or directories from a server (download). Like SFTP, SCP is also based on the Secure Shell (SSH) protocol that the application server has already authenticated the client and the identity of the client user is available to the protocol. SCP is however outdated and inflexible such that the more modern protocol like SFTP is recommended for file transfer and is implementable by the disclosed synthetic request-response mechanism.

The FTP and the like provide commands which, similar to the HTTP request methods, can be used by the network security system 104 to transmit the synthetic requests include ACCT, ADAT, AUTH, CSID, DELE, EPRT, HOST, OPTS, QUIT, REST, SITE, XSEM. Additional information about the FTP Commands can be found, e.g., at List of FTP commands, https://en.wikipedia.org/wiki/List_of_FTP_commands (last visited Mar. 24, 2021), which is incorporated by reference for all purposes as if fully set forth herein.

A simple and lightweight file transfer protocol, Trivial File Transfer Protocol (TFTP) allows clients to get a file from or put a file onto a remote host which is typically embedded device retrieving firmware, configuration, or a system image during a boot process for a tftp server. In TFTP, a transfer is initiated by issuing a client (tftp) which issues a request to read or write a file on the server. The client request can optionally include a set of parameters proposed by the client to negotiate the transfer. The tftp client supports some commands that vary by the platforms. A list of tftp commands similar to HTTP request methods such as CONNECT, GET, PUT, QUIT, TRACE can be found at https://www.ibm.com/support/knowledgecenter/ssw_aix_72/t_commands/tftp.html, which is incorporated by reference for all purposes as if fully set forth herein.

The communication protocols used for retrieving email (i.e., electronic mail) messages from a mail server include the IMAP (Internet Message Access Protocol), IMAPS (secure IMAP over the TLS or former SSL to cryptographically protect IMAP connections) as well as the earlier POP3 (Post Office Protocol) and the secure variant POP3S. In addition to IMAP and POP3 which are the prevalent standard protocols for retrieving messages, other email protocols implemented for proprietary servers include the SMTP (Simple Mail Transfer Protocol). Like HTTP and FTP protocols, email protocols such as IMAP, POP3 and SMTP are based on the client-server model over a reliable data stream channel, typically a TCP connection. An email retrieval session such as a SMTP session including 0 or more SMTP transactions consists of commands originated by a SMTP client and corresponding responses from the SMTP server, so that the session is opened, and parameters are exchanged.

Like file transfer protocols, email protocols provide commands which, similar to the HTTP request methods, can be used by the network security system 104 to transmit the synthetic requests. Examples of the text-based commands include HELO, MAIL, RCPT, DATA, NOOP, RSET, SEND, VRFY and QUIT for SMTP protocol, and commonly used commands like USER, PASS, STAT, LIST RETR, DELE, RSET, TOP and QUIT for POP3 protocol. Additional information about email protocol commands can be found at Request for Comments (RFC Standard Track publications from the Internet Society, Internet Engineering Task Force (IETF)), e.g., RFC 2821 https://tools.ietforg/html/rfc2821 for SMTP Commands; RFC 3501 https://tools.ietforg/html/rfc3501 for IMAP Commands; RFC 1939 https://tools.ietf.org/html/rfc1939 for POP3 (last visited Mar. 24, 2021), which are incorporated by reference for all purposes as if fully set forth herein.

Another communication protocol which may support synthetic request-response paradigm is the Lightweight Directory Access Protocol (LDAP) and its secure variant LDAPS (i.e., LDAP over SSL). This communication protocol is an open, vendor neutral, industry standard application protocol for accessing and maintaining distributed directory information services over Internet network. A client starts an LDAP session by connecting to a LDAP server over a TCP/IP connection. The client then sends an operation request to the server which in turn sends a response in return. Analogous to HTTP request methods and FTP commands, a LDAP client may request from server the following operations: Bind, Search, Compare, Add, Delete, Modify, Modify DN, Unbind, Abandon, and Extended. Additional information about the LDAP protocol can be found at https://en.wikipedia.org/wiki/Lightweight_Directory_Access_Protocol, which is incorporated by reference for all purposes as if fully set forth herein.

Real-Time Streaming Protocol (RTSP), Real-Time Messaging Protocol (RTMP) and its secure variant RTMPS (RTMP over TLS/SSL) are some proprietary protocols for real-time streaming audio, video and data over the Internet network that are implementable by the disclosed synthetic request-response mechanism. For example, the RTSP protocol is used for establishing and controlling media sessions between two endpoints. Similar in some ways to HTTP, RSTP defines control sequences (referred as commands, requests or protocol directives) useful in controlling multimedia playback. Clients of media server issue RTMP requests, such as PLAY, RECORD and PAUSE to facilitate real-time control of streaming from a client to a server (Voice Recording), while some commands travel from a server to a client (Video on Demand). Some typical HTTP requests, e.g., the OPTIONS request, are also available in RSTP and are implementable by the disclosed synthetic request-response mechanism. Additional information about the RTSP and its commands can be found at https://en.wikipedia.org/wiki/Real_Time_Streaming_Protocol; additional information about the RTMP/RTMPS can be found at https://en.wikipedia.org/wiki/Real-Time_Messaging_Protocol, which are incorporated by reference for all purposes as if fully set forth herein.

In other implementations, the disclosed synthetic request-response mechanism can be implemented in real-time chat/instant messaging (IM) protocols like XMPP (Jabber), YMSG, Skype, and so on. Some applications like Slack start out as HTTP/S and then fall into a web socket mode where they treat the connection as a TCP connection and use a non-HTTP/S protocol for communication. The disclosed synthetic request-response mechanism can be implemented using such instant messaging protocols. Additional information about such instant messaging protocols can be found at Comparison of instant messaging protocols, https://en.wikipedia.org/w/index.php?title=Comparison_of_instant_messaging_protocols&oldid=1013553466 (last visited Apr. 8, 2021), which is incorporated by reference for all purposes as if fully set forth herein.

Overcoming Metadata Deficiency

Portions of the specification may refer to "metadata-deficient transactions," "metadata-deficient requests," "metadata-deficient application sessions," and "metadata-deficient connections." Metadata deficiency in a transaction/request/application session/connection is characterized by the absence of target metadata required to make a policy determination, and thereby to enforce a policy. Consider, for example, a policy that requires that only corporate user credentials be used to access the cloud applications 108 and not private user credentials. When metadata (e.g., request header fields) that typically specify user credentials are missing from the transaction/request/application session/connection, then there exists a metadata deficiency that can be overcome by the disclosed synthetic request injection.

The metadata deficiency may result for different reasons under different circumstances. Typically, CASB and SWG proxies operate in a passive mode—monitoring network traffic that pass through the proxies to extract metadata and annotate client requests that are proxied (i.e., rerouted, or intercepted). For example, some cloud applications support multiple login instances, for example, a corporate instance to access Google Drive™ like "joeuser@companyxyz.com" and a private instance to access Google Drive™ like "joeuser@gmail.com." In such cases, the proxies may want to annotate the client transactions, e.g., HTTP/HTTPS transactions, to Google Drive™ with a user instance ID used to initiate the client transactions. The proxies may be configured to persist the user instance ID for reporting purposes or to apply policies.

In order to determine the user instance ID, the proxies need to process a login transaction that contains the user instance ID. If such a login transaction does not bypass the proxies and is intercepted, the proxies then need to persist the state of the login transaction, i.e., store the user instance ID extracted from the login transaction and build a mapping from the cookie and URL parameters set for that login with the instance information.

Circumstances arise when metadata like the user instance ID is not accessible to the proxies. For example, the proxies may have missed the login transaction that establishes the metadata mapping. This happens, for example, when the clients 102 are already logged into the cloud applications 108 prior to rerouting of an application session to the proxies. As a result, the proxies do not capture the login transaction. Subsequent transactions, which follow the login transaction and are captured by the proxies, are not useful because they do not contain the required metadata. In another circumstance, some cloud applications, such as native mobile applications, the transaction that establishes the metadata mapping is sent once or very infrequently, and therefore sometimes missed by the proxies.

The disclosed synthetic request injection enables the proxies to independently retrieve the otherwise missing metadata directly from the cloud applications 108 on an ad hoc basis. The proxies no longer need to be dependent on the metadata mapping transactions as the sole source of metadata. This makes the proxies self-sufficient and greatly expands their policy enforcement horizon.

Reducing Redundant Metadata Synchronization in a SASE Network

In a secure access service edge (SASE) network, the proxies are deployed as geographically distributed points of presence. This requires that metadata mappings be periodically distributed to each proxy in the SASE network. The metadata mapping synchronization cycles can become a significant computation burden and can take valuable compute resources away from the core security engines of the SASE network like DLP systems.

The disclosed synthetic request injection makes the metadata mapping synchronization unnecessary because a proxy in the SASE network that needs the metadata mappings can issue the synthetic requests on an ad hoc basis and receive the metadata mapping directly from the cloud applications 108, without having to rely on and coordinate with any other proxy in the SASE network. This way the compute resources of the proxies and the SASE network can be dedicated to the core security flows and not wasted on redundant checkpointing and data distribution.

Reducing Metadata Storage Footprint and Building Reliable Metadata

The huge volume of the metadata mappings also makes them a significant storage burden. Ad hoc generation of the metadata mappings using the disclosed synthetic request injection obviates the need to persist each and every metadata mapping, thereby reducing the storage burden of the proxies and the SASE network. Stale or expired metadata mappings can be refreshed by issuing ad hoc synthetic requests as well, thereby building more reliable and up-to-date metadata mappings.

Actions

Beyond obtaining metadata information, the disclosed synthetic request injection can also execute actions on the cloud applications 108, for example, on an ad hoc basis. For example, the synthetic requests can be used by the proxies to perform actions against the cloud applications 108 using the original transaction's authority. In the case of inline CASBs, this can be used to implement real-time enforcement of actions without a prior authorization or a prior access grant, as required with out-of-band API CASBs. This also allows the inline CASBs to inject policy actions for unsanctioned applications for which the CASBs lack API connectors.

The disclosed synthetic request injection can also execute actions on resources (e.g., objects) of the cloud applications 108. For example, the synthetic requests can retrieve objects from the cloud applications 108. The synthetic requests can change security configuration of the objects on the cloud applications 108 and modify security posture of the objects. The synthetic requests can be used to modify the security posture of the objects, i.e., change the security configuration of the objects, either after uploading the objects to the cloud applications 108, or after downloading the objects from the cloud applications 108. For example, the synthetic requests can change the share settings of an object from "sharing allowed" to "sharing not allowed," or from "sharing allowed externally" to "sharing allowed only internally." The synthetic requests can move an object from one location to another location in the cloud applications 108, or from one cloud application to another cloud application, for example, when there is an active session with another cloud application.

The information generated/retrieved by the synthetic requests can be used to block transmission of the objects to and from the cloud applications 108. The synthetic requests can encrypt the objects before or after the objects arrive at the cloud applications 108. The synthetic requests can quarantine the objects before or after the objects arrive at the cloud applications 108. The synthetic requests can extract metadata from another request or transaction, for example, to determine the activity being performed, to determine the user instance ID being used, and to determine the sensitivity tag of an object. The synthetic requests can also run inline DLP checks on the objects to determine their sensitivity in real-time, and responsively execute security actions like blocking, allowing, encrypting, quarantining, coaching, and seeking justification based on the determined sensitivity.

In some implementations, transmission (or flow) of objects to or from cloud applications can be controlled/modulated (e.g., blocked) when the synthetic request/s is/are used to determine that the object being manipulated (e.g., being uploaded or downloaded) is sensitive based on the retrieved sensitivity metadata and that the account-type from which the manipulation was initiated or attempted is an uncontrolled or private account (e.g., non-corporation instance) based on the retrieved login metadata. This way, a combination of login metadata and sensitivity metadata retrieved by use of one or more synthetic requests can be used for policy enforcement. Generally speaking, metadata of different types/formats/creation dates/creation sources/storage origins, retrieved by one or more synthetic requests or retrieved from one or more sources by one or more synthetic requests, can be analyzed in the aggregate or as a combination to make a policy enforcement decision on one or more objects.

The disclosed synthetic request injection can also in turn cause the cloud applications 108 to execute actions. For example, the synthetic requests can cause the cloud applications 108 to crawl objects residing in the cloud applications 108 and generate an inventory of the objects and associated metadata (e.g., an audit of share settings, collaboration networks, user assignments, and sensitivity statuses of the objects). The inventory can then be provided to the network security system 104 by the corresponding synthetic response. The network security system 104 can then use the inventory for policy enforcement.

Consider, for example, the Box™ storage cloud application which provides an administrative API called the Box Content API™ to provide visibility into an organization's accounts of its users. The synthetic requests can poll the administrative API to discover any changes made to any of the accounts. Alternatively, the synthetic requests can register with the administrative API to inform the network security system 104 of any significant events. For example, the synthetic requests can use Microsoft Office365 Webhooks API™ to learn when a file has been shared externally. In other implementations, the disclosed synthetic request-response mechanism can interface with user APIs, in addition to/instead of administrative APIs.

Retrieving metadata and executing actions are some examples of target network security objectives that can be achieved using the disclosed synthetic request injection. A person skilled in the art will appreciate that the application of the disclosed concept of configuring a network intermediary or middleware like the network security system 104 with network request-response (or request-reply) mechanism and methods to self-generate requests to satisfy a cloud security requirement may vary from use case-to-use case, architecture-to-architecture, and domain-to-domain. The request-response mechanism and methods can be implemented in various network protocols for inter-process communications like FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY and TFTP.

For example, in some implementations, the synthetic requests may not be targeted towards the cloud applications 108 and instead may be directed at other sources. In one example, the synthetic requests may be used for commutation between different security systems of the network security stack, in which case, the synthetic requests could be aimed at other CASBs and SWGs in the SASE network. In another example, particularly in the case of native apps, the synthetic requests can be sent to the clients 102 or to the cloud applications 108 as responses, for example, sending a 401 App-Expected Response as a synthetic request to retrieve a master token from the native apps running on the clients 102. In yet another example, the synthetic requests can be sent to the clients 102 or to the cloud applications 108 to retrieve tokens, for example, to retrieve a people token from the cloud applications 108.

In yet another example, the synthetic requests can be sent to the clients 102 to convey (e.g., across a GUI) that the transaction is completed. For example, after an object is uploaded to the cloud applications 108, a synthetic request can generate a GUI notification at the clients 102 indicating that the object is uploaded.

Endpoint Devices

An "unmanaged device" is referred to as a Bring Your Own Device (BYOD) and/or an off-network device whose traffic is not being tunneled through the network security system 104. The network security system 104 analyzes the incoming traffic to determine whether the cloud application transactions are made within the confines of a corporate network and/or from a device with a security agent or security profile installed. A device can be classified as an unmanaged device or as a managed device based on certain device characteristics collected by an endpoint routing agent (ERC). Depending on the type of device, the ERC can be a virtual private network (VPN) such as VPN on demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. The ERC can also be an agent that is downloaded using e-mail or silently installed using mass deployment tools like ConfigMgr™, Altris™, and Jamf™.

The ERC collects device information such as registry key, active directory (AD) membership, presence of a process, operating system type, presence of a file, AD domain, encryption check, OPSWAT check, media access control (MAC) address, IMEI number, and device serial number. Based on the collected device information, the ERC classifies the device as unmanaged or managed. Additional or different categories can be used to classify a device such as a semi-managed device category or an unknown device category.

For additional information regarding how the network security system 104 determines whether the incoming traffic is routed from a managed device or an unmanaged device, reference can be made to, for example, commonly owned U.S. patent application Ser. Nos. 14/198,499; 14/198,508; 14/835,640; 14/835,632; and 62/307,305, which are incorporated by reference for all purposes as if fully set forth herein.

Portions of the specification may make distinctions between two types of endpoint devices used by users to access the cloud applications 108. The primary distinction is between the mechanisms for coupling the endpoint devices to the network security system 104. In relation to endpoint devices, the term "computer" will refer to more open systems where the network security system 104 can more directly install software and modify the networking stack. Similarly, in relation to endpoint devices, the terms "mobile" or "tablet" will refer to more closed systems where the network security system options for modifying the network stack are more limited. This terminology mirrors the situation today where computer-endpoint devices running Mac OS X, Windows desktop versions, Android, and/or Linux can be more easily modified than mobile or tablet devices running iOS, and/or Windows Mobile. Thus, the terminology refers to how third-party operating system vendor limitations are addressed to provide access to the network security system as opposed to a fundamental technical difference between the types of endpoint devices. Further, if mobile OS vendors open their systems further, it is likely that the distinction could be eliminated with more classes of endpoint devices. Additionally, it can be the case that certain server computers and other computing devices within an organization can have the client installed to cover machine-to-machine communications.

A closely related point is that some clients interface with the network security system 104 differently. The browser add-on clients or PAC (proxy auto-configuration) files, for example, redirect the browsers to an explicit proxy. Only the traffic needed to apply the policy to is rerouted and it is done so within the application. The traffic arriving at the network security system 104 can have the user identity embedded in the data or within the secure tunnel headers, e.g., additional headers or SSL client side certificates. Other clients redirect select network traffic through transparent proxies. For these connections, some traffic beyond exactly those requests needed by the policy can be routed to the network security system 104. Further, the user identity information is generally not within the data itself, but rather established by the client in setting up a secure tunnel to the network security system 104.

The interconnection between the clients 102, the network security system 104, and the cloud applications 108 will now be described. A public network couples the clients 102, the network security system 104, and the cloud applications 108, all in communication with each other. The actual communication path can be point-to-point over public and/or private networks. Some items, such as the ERC, might be delivered indirectly, e.g., via an application store. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

Policy

The term "policy," sometimes also referred to as a policy definition or policy data or content policy refers to a machine-readable representation of flow control and content control requirements for the cloud applications 108. Typically, a policy is defined by one or more administrators at a corporation, or other entity, and is enforced upon users within that corporation, or entity. It is possible for individuals to define policies for their own usage that are enforced upon them; however, corporate usage is the more common case. It is also possible for a policy to be enforced on visitors or customers of a cloud application, e.g., where a corporation hosts or subscribes to a cloud application and requires visiting customers, users, or employees to adhere to the policy for use. Of particular note is that the policies considered herein are capable of being sensitive to the semantics of a cloud application, which is to say a policy can differentiate between logging in to a cloud application from, say, editing documents on the cloud application.

Context is important for understanding usage; for an entity, the collection of dozens or hundreds of individual policies (e.g., log bulk downloads, prohibit editing documents on the service, only allow bulk downloads for users who are in the "Vice President" group) is referred to singularly as one policy or one policy definition. Thus, a system supporting multiple entities will generally have one policy per entity, each made up of dozens or hundreds of individual flow control and content control policies. Similarly, the policy that is transferred to individual computers can be a subset of a full corporate policy, e.g., solely a machine-readable representation of the URLs of interest, as opposed to the full policy specification for each URL describing the flow control and/or content manipulations.

A "multi-part policy" refers to a policy that specifies triggering of at least one security action when at least one condition about the transaction is met. A multi-part policy applies to a single transaction, but at least one policy condition of the multi-part policy requires evaluation of data or metadata not available in the single transaction. Also, a multi-part policy applies to a single transaction, but at least one policy condition of the multi-part policy requires evaluation of data or metadata available in an external data or metadata store. Further, a multi-part policy applies to a single transaction, but at least one policy condition of the multi-part policy requires evaluation of data or metadata generated by an external engine. A multi-part policy applies in real-time during active analysis, but at least one policy condition of the multi-part policy requires evaluation of data or metadata collected in deferred time or during non-real-time inspection. Examples of multi-part policies include "prevent user form uploading/downloading, if user is at risk as indicated by anomaly detection," "prevent sharing of a file, if file is sensitive," "prevent download of a file to a device, if the device is at risk as indicated by a malware detection engine," "prevent deletion of a virtual machine, if the virtual machine is a critical server," and others.

Metadata Retrieval

FIG. 1 shows one implementation of the network security system 104 issuing a synthetic request during an application session of a cloud application to retrieve metadata that is otherwise missing from the application session. In FIG. 1, a client issues an authentication request 122 to log into a cloud application. The authentication request 122 provides a metadata mapping. The metadata mapping specifies a login instance (e.g., an email identified by "from-user" or "instance-id" information) used by the client to access the cloud application. The authentication request 122 also includes an authentication token that the client uses to access the cloud application. Successful authentication 138 results in the establishment 114 of an application session 144.

As illustrated in FIG. 1, the authentication request 122 bypasses the network security system 104. The bypass can be due to a variety of reasons, some of which are discussed above. More importantly, the bypass results in the network security system 104 not able to capture the metadata mapping. This presents itself as a technical problem because certain security policies are based on the "from-user" or "instance-id" information.

Eventually though, the client is rerouted to the network security system 104, for example, by an endpoint routing client (ERC), such as a browser add-in or an agent running on the client. When this happens, from there onwards, the application session 144 is intermediated by the network security system 104 and subsequent requests from the client are intercepted by the network security system 104. In other implementations, the application session 144 comes under the ambit of the network security system 104 when an incoming request 152 is sent by the client towards the cloud application and rerouted to the network security system 104 for policy enforcement. Most commonly, the incoming request 152 is a client request of a communication protocol, e.g., HTTP/HTTPS client request that attempts to execute an application activity transaction on the cloud application. The communication protocols such as HTTP, HTTPS, FTP, IMAP, SNMP and SNTP define the basic patterns of dialogue which support request-response messaging patterns and commonly operate in an application layer.

Upon receiving the incoming request 152 during the application session 144, the network security system 104 determines 154 whether it has access to metadata required to enforce a security policy on the incoming request 152. In one implementation, this determination is made by inspecting a transaction header (e.g., HTTP and HTTPS headers) of the incoming request 152 and probing whether certain fields and variables supply the required metadata. In another implementation, this determination is made by looking up a metadata mapping store (e.g., a Redis in-memory cache) and inquiring whether there already exists a metadata mapping associated with an application session identifier ("app-session-ID") of the application session 144. In the scenario illustrated in FIG. 1, both these evaluations would reveal that the required metadata is missing because the authentication request 122 that provided the metadata mapping was never captured by the network security system 104.

Accordingly, when the network security system 104 determines that it does not have access to the required metadata, it holds 164 the incoming request 152 and does not transmit it to the cloud application. Then, the network security system 104 generates a synthetic request 168 and injects the synthetic request 168 into the application session 144 to transmit the synthetic request 168 to the cloud application. The synthetic request 168 is configured to retrieve the missing metadata from the cloud application by inducing an application server of the cloud application to generate a response that includes the missing metadata. The network security system 104 configures the synthetic request 168 with the authentication token supplied by the incoming request 152 so that the synthetic request 168 can access the cloud application.

The network security system 104 then receives a synthetic response 176 to the synthetic request 168 from the cloud application. The synthetic response 176 supplies the missing metadata 178 to the network security system 104. The network security system 104 then uses the metadata 178 for metadata-based policy enforcement 184. For example, if the metadata 178 specifies that the login instance was from a controlled account (e.g., a corporate email), then the network security system 104 releases the incoming request 152 and transmits 186 it to the cloud application. In contrast, if the metadata 178 specifies that the login instance was from an uncontrolled account (e.g., a private email), then the network security system 104 blocks the incoming request 152 and does not transmit it to the cloud application, or, in other implementations, alters the end user that a policy enforcement has prevented the activity from being completed.

The discussion now turns to some example implementations of how, in different scenarios, the network security system 104 constructs the synthetic requests and retrieves metadata from the synthetic responses. A person skilled in the art will appreciate that the disclosed synthetic request injection is not limited to these example implementations. There may exist, now and in future, other ways of implementing the disclosed synthetic request injection. This disclosure may not explicitly enumerate these other ways. Still, these other ways are within the scope of this disclosure because the intended purpose of the disclosed synthetic request injection is to enforce and improve network security. Variants of this intended purpose may be realized in different ways in different network architectures without deviating from the disclosed concept of configuring a network intermediary or middleware like the network security system 104 with network request/response (request-reply) mechanism and methods to self-generate requests to achieve a variety of network security objectives.

Synthetic Listener Mode

Figure 2:
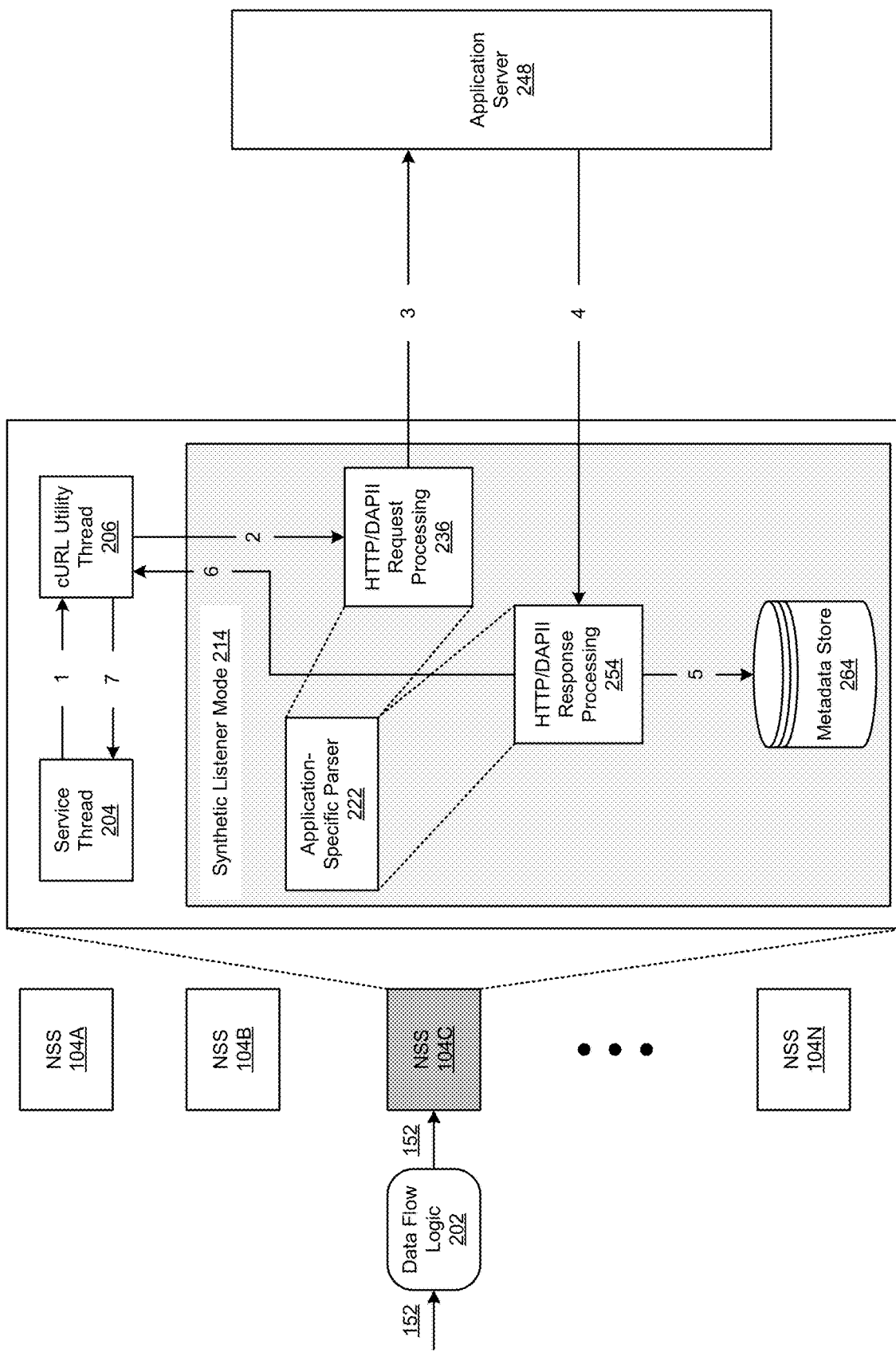
FIG. 2 depicts a synthetic listener mode of injecting a synthetic request in an application session of a cloud application and extracting metadata from a corresponding synthetic response in accordance with one implementation of the technology disclosed.

FIG. 2 depicts a synthetic listener mode of injecting a synthetic request in an application session of a cloud application and extracting metadata from a corresponding synthetic response in accordance with one implementation of the technology disclosed. In some implementations of the synthetic listener mode, the network security system 104 uses application-specific parsers (or connectors) and synthetic templates to construct the synthetic requests and extract the metadata-of-interest from the synthetic responses.

FIG. 2 shows many instances 104A-N of the network security system 104. A data flow logic 202, running to the network security system 104, injects the incoming request 152 to a processing path of a particular instance 104C of the network security system 104. In one implementation, the particular instance 104C of the network security system 104 passes the incoming request 152 to a service thread 204. The service thread 204 holds the incoming request 152 and instructs a client URL (cURL) utility thread 206 to initiate a cURL request (operation 1). Additional information about the cURL requests can be found at, e.g., The Art Of Scripting HTTP Requests Using Curl, https://curl.se/docs/httpscripting.html (last visited Mar. 17, 2021) and CURL, https://en.wikipedia.org/w/index.php?title=CURL&oldid=1002535730 (last visited Mar. 18, 2021), which are incorporated by reference for all purposes as if fully set forth herein.

The cURL utility thread 206 injects the cURL request into a synthetic listener mode 214 (operation 2). The synthetic listener mode 214 selects an application-specific parser 222 that is specific to the cloud application targeted by the incoming request 152 (e.g., by identifying the cloud application as a resource from a URL parameter or an HTTP request header field of the incoming request 152). The application-specific parser 222 specifies match conditions that are specific to request and response syntaxes defined for a particular application programming interface (API) of the cloud application.

The application-specific parser 222 implements a DAPII (Deep Application Programming Interface Inspection), e.g., HTTP/DAPII request processing 236, which uses a synthetic template to determine whether the metadata-of-interest is missing from the application session 144. When the metadata-of-interest is found to be missing, the synthetic template constructs a synthetic request using headers, fields, values, and parameters defined with syntax that elicits the metadata-of-interest from an application server 248 of the cloud application. At operation 3, the constructed synthetic request is sent to the application server 248.

At operation 4, a synthetic response from the application server 248 is routed to the synthetic listener mode 214. In some implementations, the synthetic response is processed by a service thread (not shown). The application-specific parser 222 implements an HTTP/DAPII response processing 254 to extract the metadata-of-interest from the synthetic response. The extracted metadata (e.g., the "from-user" or "instance-id" information) is stored in a metadata store 264 (at operation 5) for use in policy enforcement. At operation 6, a cURL response is sent back to the cURL utility thread 206, which in turn sends back a response to the service thread 204 (at operation 7). The service thread 204 then releases the held incoming request 152.

Synthetic Templates

As discussed above, the synthetic requests are constructed by synthetic templates of application-specific parsers, according to one implementation of the technology disclosed. A particular application-specific parser of a cloud application can have a set of synthetic templates. Respective synthetic templates in the set of synthetic templates can correspond to respective activities, for example, one synthetic template for upload activities, synthetic template for download activities, and yet another synthetic template for share activities. The set of synthetic templates can include a default synthetic template for generic activities (e.g., logins, log-outs). The set of synthetic templates can also include a specialized synthetic template for native apps running on endpoints (e.g., mobiles, computers).

Figure 3:
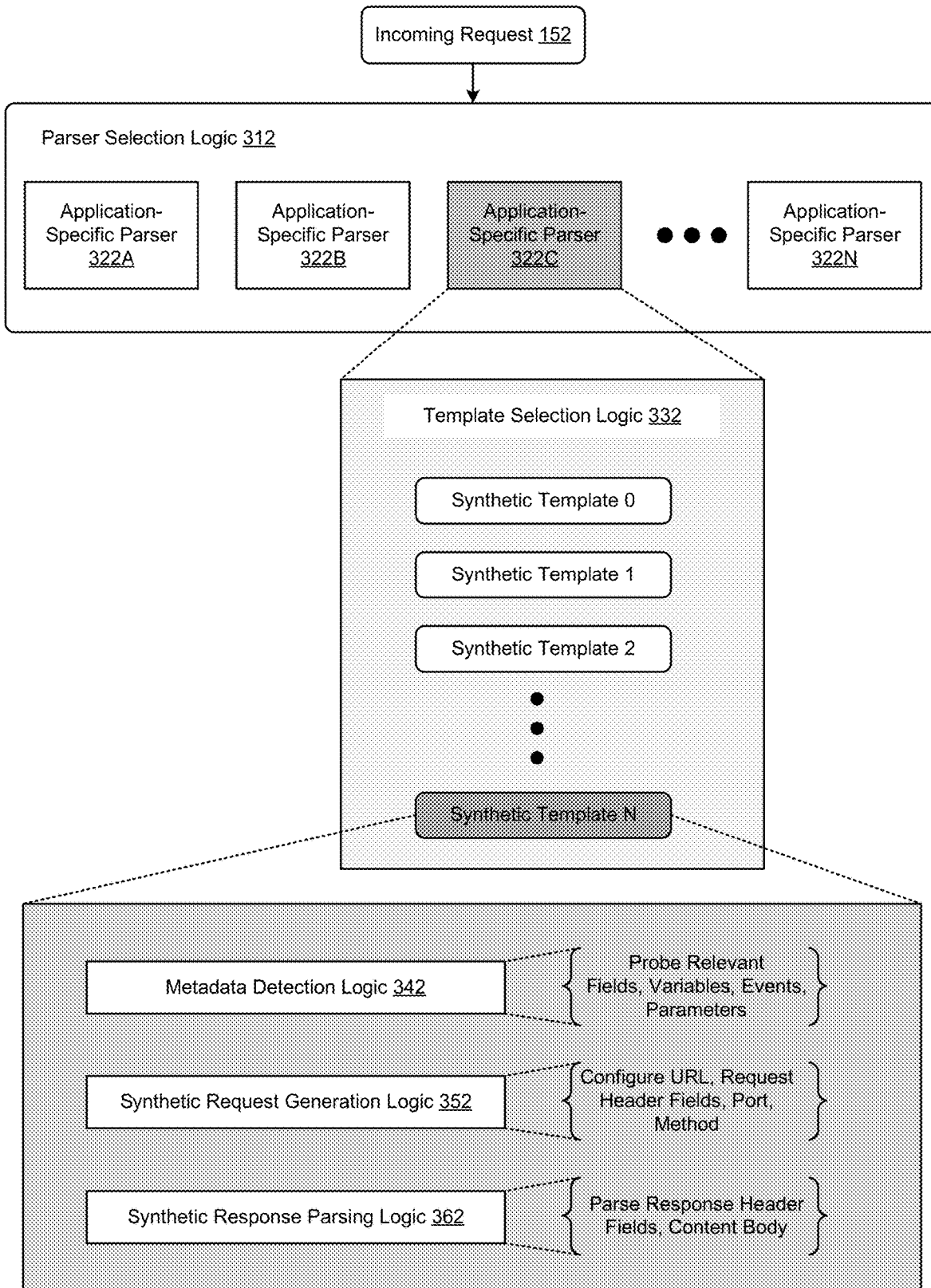
FIG. 3 shows one implementation of a processing path that generates synthetic requests using application-specific parsers and synthetic templates.

FIG. 3 shows one implementation of a processing path that generates synthetic requests using application-specific parsers and synthetic templates. In FIG. 3, a parser selection logic 312 selects a particular application-specific parser 322C from a plurality of application-specific parsers 322A-N. The particular application-specific parser 322C is specific to the cloud application targeted by the incoming request 152. The parser selection logic 312 determines that the incoming request 152 is directed to the cloud application because a resource of the cloud application is specified by a URL parameter or a request header field of the incoming request 152 of a communication protocol (e.g., FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY and TFTP). The parser selection logic 312 then invokes the particular application-specific parser 322C. In some implementations, when no application-specific parser is available for a given cloud application, the parser selection logic 312 can select a universal parser that, for example, applies to an entire category of cloud applications (e.g., social media sites, messenger apps, blogs).

A template selection logic 332 selects a particular synthetic template from a set of synthetic templates 0-N of the particular application-specific parser 322C. In one implementation, the template selection logic 332 uses if-then-else rules and match conditions to select the particular synthetic template. For example, if the metadata-of-interest is available, then the synthetic listener mode is exited and normal processing of the incoming request 152 resumed. If the metadata-of-interest is missing and the activity is a generic activity (e.g., a login event), then a default synthetic template is used to construct the synthetic request. If the metadata-of-interest is missing and the activity is a particular activity (e.g., an upload event), then a specialized synthetic template that is specific to the particular activity is used to construct the synthetic request. If the metadata-of-interest is missing and the cloud application is a native app, then a specialized synthetic template that is specific to native apps is used to construct the synthetic request. Also, in some implementations, the synthetic templates are defined as JSON files.

Once the particular synthetic template of the particular application-specific parser 322C is selected, a metadata detection logic 342 of the particular synthetic template can determine whether relevant fields, variables, events, or parameters of the incoming request 152 or a metadata-mapping store contain the metadata-of-interest. If not, a synthetic request generation logic 352 of the particular synthetic template can construct the synthetic request by configuring those request header fields that elicit a response from the application server of the cloud application which supplies the metadata-of-interest. In some implementations, the synthetic request generation logic 352 uses some of the fields, variables, events, or parameters that are part of the incoming request 152 to construct the synthetic request.

A synthetic response parsing logic 362 of the particular synthetic template can parse response header fields and content body of the synthetic response to extract the metadata-of-interest. Alternatively, the metadata extraction can be done directly by the particular application-specific parser 322C, without using the particular synthetic template.

Processing Flow

Figure 4:
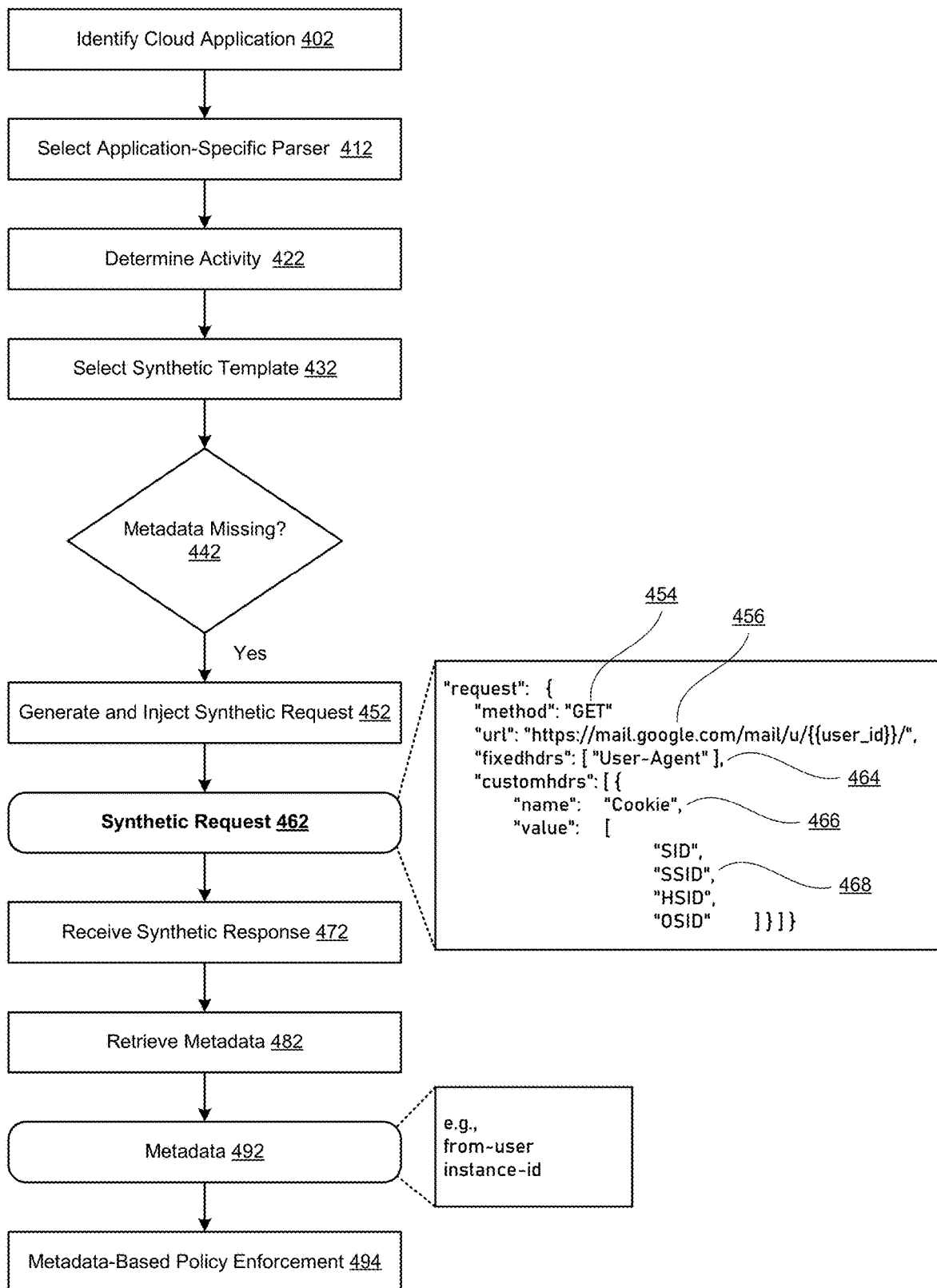
FIG. 4 shows one implementation of a processing flow that generates an example synthetic request.

FIG. 4 shows one implementation of a processing flow that generates an example synthetic request. The steps illustrated in FIG. 4 can be executed on server-side or client-side. At step 402, a client transaction requesting interaction with a cloud application is intercepted. At step 412, an application-specific parser specific to the cloud application is invoked. At step 422, the application-specific parser processes the client transaction and determines an activity being performed by the client transaction.

At step 432, a particular synthetic template is selected that is specific to the cloud application and the determined activity. At step 442, the particular synthetic template determines that the metadata-of-interest required to process the client transaction is missing. At step 452, the particular synthetic template is used to generate and inject a synthetic request 462. The synthetic request 462 uses a method, e.g., HTTP GET method 454, has a URL 456, has a fixed header 464 like user-agent, and has a custom header 466 with cookie data 468 like SID, SSID, HSID, and OSID.

At step 472, a synthetic response is received to the synthetic request 462. At step 482, the metadata-of-interest 492 is retrieved from the synthetic response. At step 494, the retrieved metadata 492 is used for policy enforcement on the client transaction.

Native Apps

Figure 5:
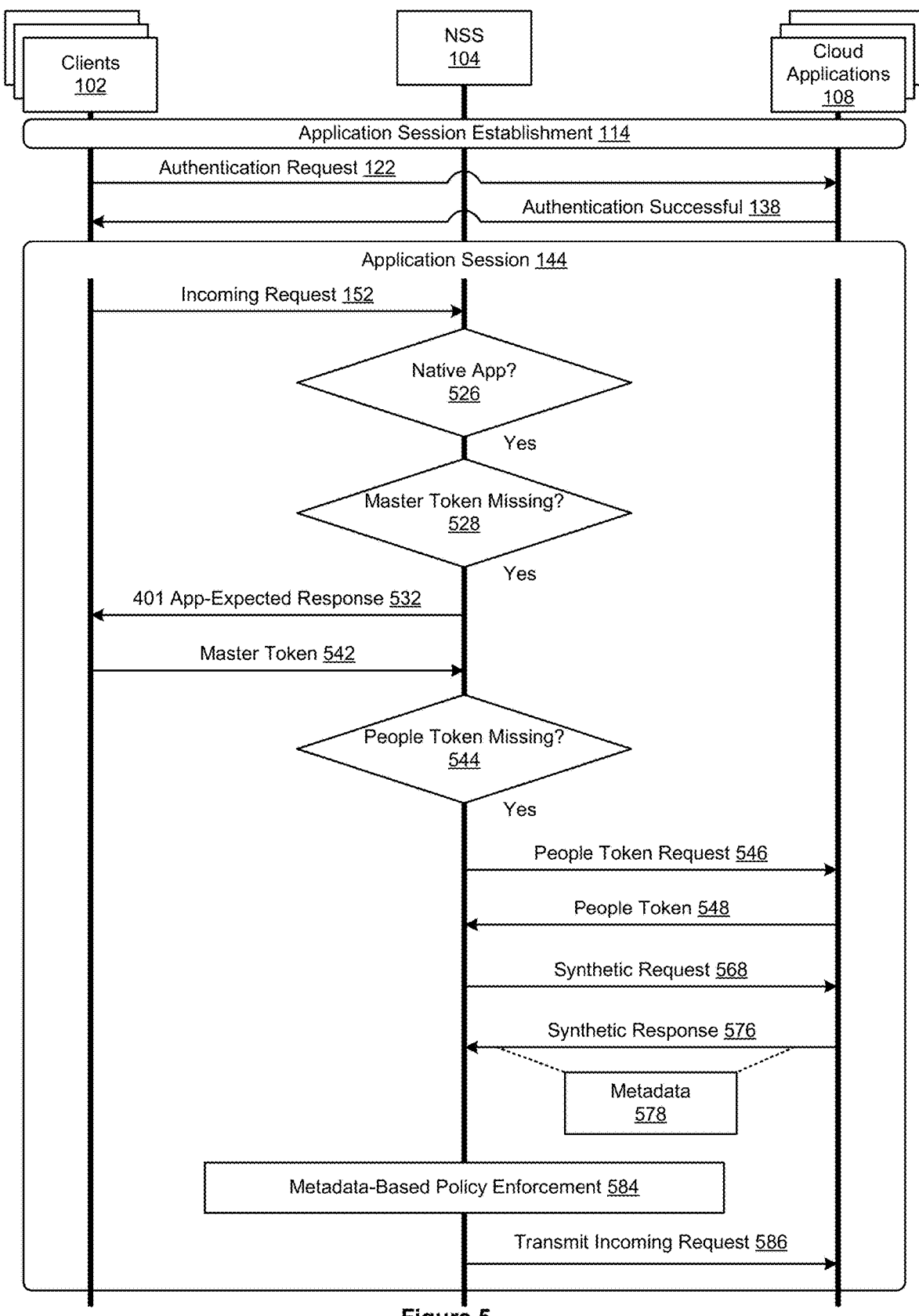
FIG. 5 shows one implementation of using bi-directional synthetic requests for native apps.

FIG. 5 shows one implementation of using bi-directional synthetic requests for native apps. When the network security system 104 determines 526 that the cloud application is a native app, the network security system 104 first determines 528 whether a master token is missing from the transaction. If so, the network security system 104 issues a first synthetic request to the client in the form of a 401 App-Expected Response 532. In response, the client provides a master token 542 to the network security system 104. FIG. 6 shows example details of the 401 App-Expected Response 532.

The network security system 104 then determines 544 whether a people token is missing from the transaction. If so, the network security system 104 issues a second synthetic request to the cloud application in the form of a people token request 546. In response, the cloud application provides a people token 548 to the network security system 104. FIG. 7 shows example details of the people token request 546.

The network security system 104 then uses the people token 548 to issue a third synthetic request 568 to the cloud application. FIG. 8 shows example details of the third synthetic request 568. The network security system 104 then receives the synthetic response 576 that supplies the metadata 578. The network security system 104 then uses the supplied metadata 578 for the policy enforcement 584. Then, the network security system 104 releases the flow 586 to transmit the incoming request 152 to the cloud application.

In some implementations, when the master token 542 is not missing, the network security system 104 does not issue the 401 App-Expected Response 532 to the client, and instead directly issues the people token request 546 to the cloud application. Similarly, when both the master token 542 and the people token 548 are not missing, the network security system 104 directly issues the synthetic request 568 to the cloud application.

Side Car Service

Figure 9:
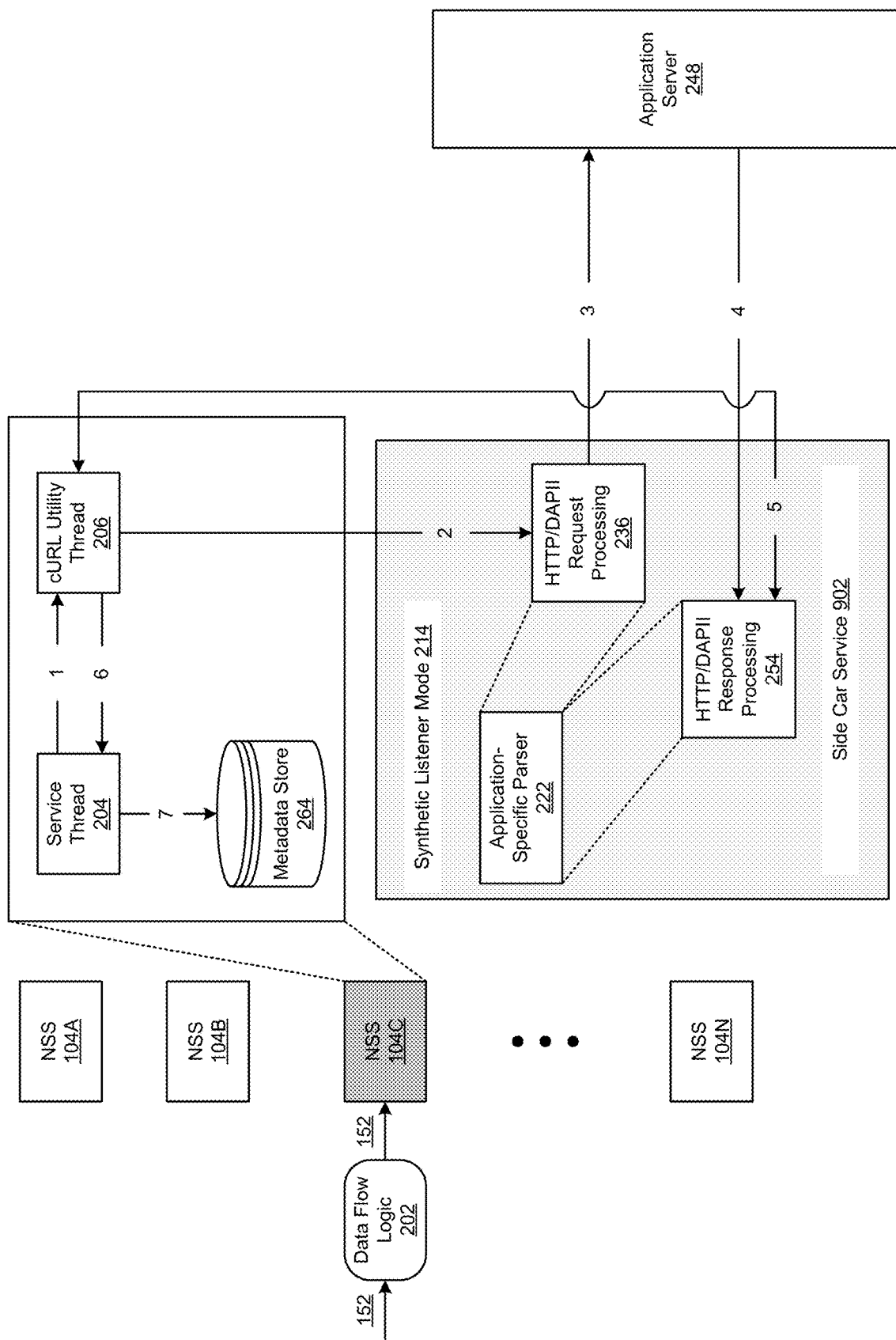
FIG. 9 shows one implementation of a side car service that is shared by multiple instances of a network security system to generate synthetic requests.

FIG. 9 shows one implementation of a side car service 902 that is shared by the multiple instances 104A-N of the network security system 104 to implement the synthetic listener mode 214 and generate the synthetic requests. The side car service 902 can be considered a hypervisor (or a separate container) that runs in a data center as a containerized service servicing the multiple instances 104A-N of the network security system 104. Multiple instances of the side car service 902 can service the multiple instances 104A-N of the network security system 104 too.

Proxy Handoff in SASE Network

Figure 10:
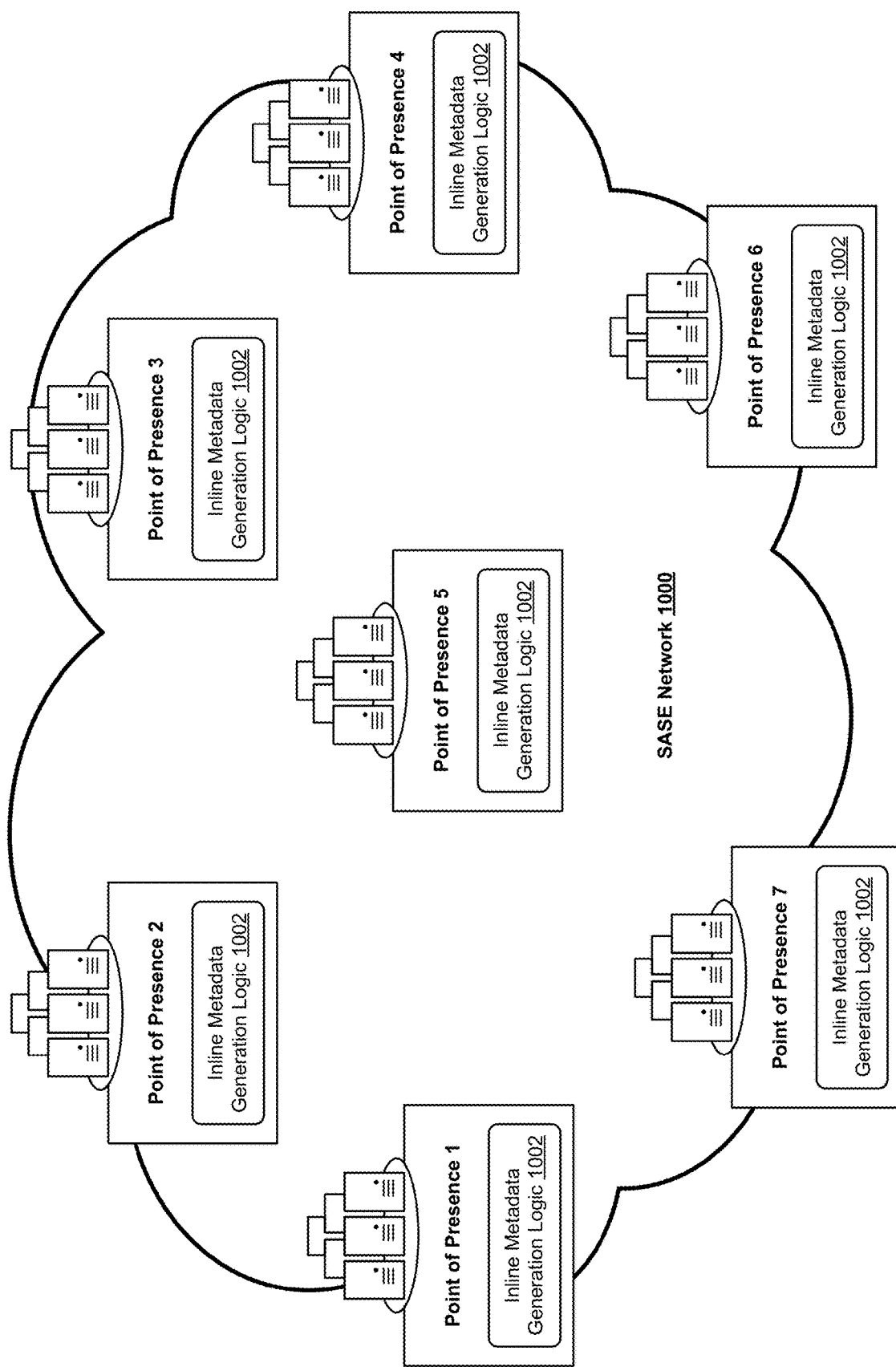
FIG. 10 shows an example secure access service edge (SASE) network with a plurality of geographically distributed points of presence.

FIG. 10 shows an example secure access service edge (SASE) network 1000 with a plurality of geographically distributed points of presence 1-7. In some implementations, each of the points of presence in FIG. 10 can be considered a data center that includes the multiple instances 104A-N of the network security system 104 and other necessary infrastructure. In other implementations, each of the points of presence in FIG. 10 can be considered a respective instance of the network security system 104. Also, as shown in FIG. 10, each of the points of presence 1-7 can be configured with an inline metadata generation logic 1002.

Figure 11:
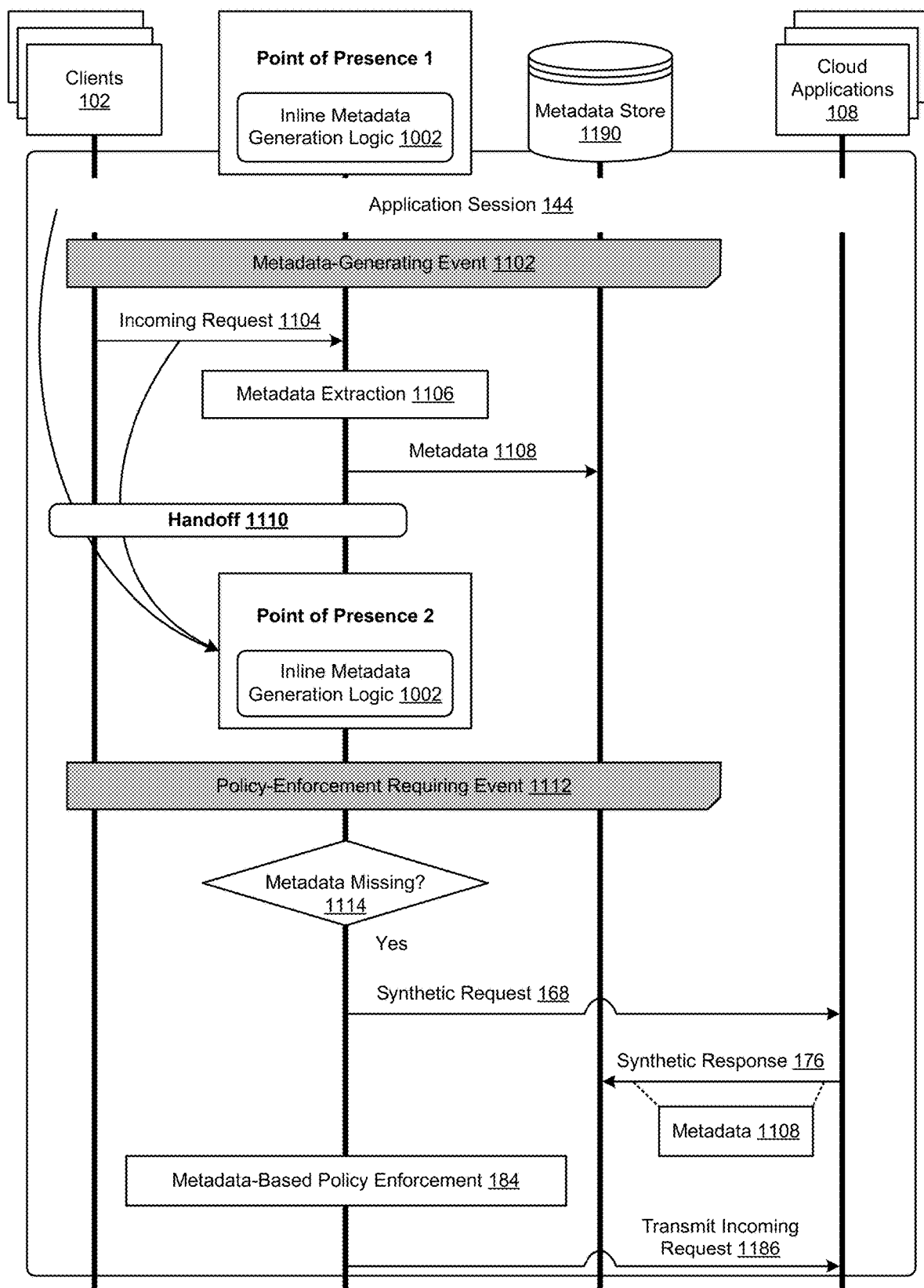
FIG. 11 shows one implementation of use of synthetic requests in a proxy handoff situation.

As discussed above, the metadata mappings need to be periodically synchronized between the points of presence 1-7, posing a technical burden of redundant data distribution. FIG. 11 shows one implementation of the disclosed synthetic request injection overcoming this technical burden. In particular, FIG. 11 shows one implementation of use of the synthetic requests in a proxy handoff situation.

In FIG. 11, during the application session 144, a first point of presence 1 intercepts a metadata-generating event 1102 during the application session 144. The metadata-generating event 1102 is triggered by an incoming request 1104. The first point of presence 1 performs metadata extraction 1106 on the incoming request 1104, extracts metadata 1108, and stores the extracted metadata 1108 in a metadata store 1190 local to the first point of presence 1 and not accessible to other points of presence in the SASE network 1000.

Later, a proxy handoff 1110 occurs that routes the application session 144 and the incoming request 1104 to a second point of presence 2 different from the first point of presence 1. Since the second point of presence 2 did not capture the incoming request 1104, it does not have access to the metadata 1108, i.e., the metadata 1108 is missing 1114 from the second point of presence 2. However, the second point of presence 2 now needs to execute a policy-enforcement requiring event 1112 that requires the metadata 1108. Meanwhile, the incoming request 1104 is kept held.

To independently retrieve the metadata 1108 from the cloud application, an inline metadata generation logic 1002 of the second point of presence 2 issues the synthetic request 168 to the cloud application. The second point of presence 2 then receives the synthetic response 176 that supplies the metadata 1108. The second point of presence 2 then uses the supplied metadata 1108 for the policy enforcement 184. Then, the second point of presence 2 releases the flow 1186 to transmit the incoming request 1104 to the cloud application. In other implementations, the incoming request 1104 is blocked and not transmitted to the cloud application.

Object Metadata

Figure 12:
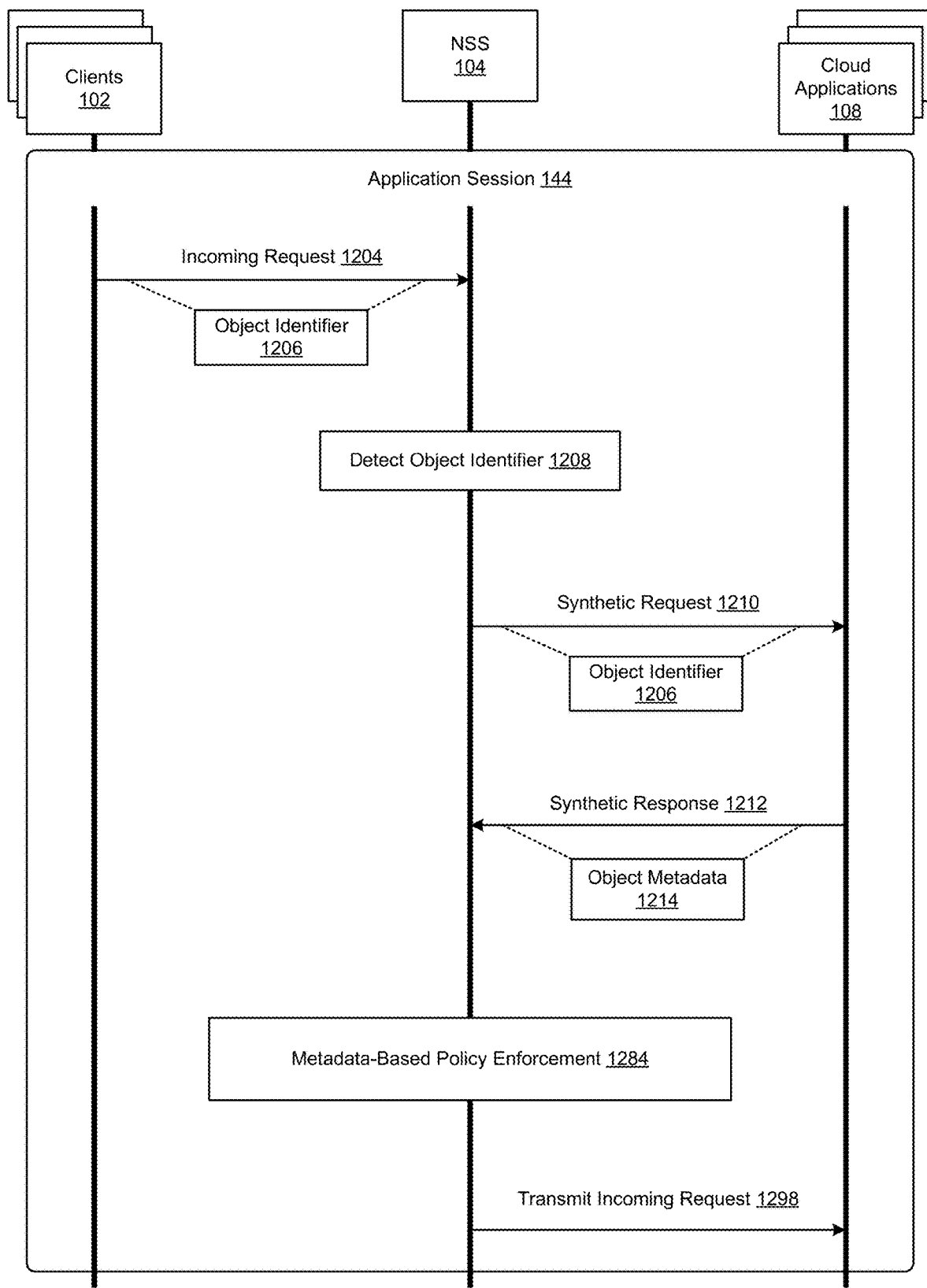
FIG. 12 shows one implementation of using synthetic requests to retrieve object metadata from cloud applications.

FIG. 12 shows one implementation of using synthetic requests to retrieve object metadata from cloud applications. In FIG. 12, an incoming request 1204 is intercepted by the network security system 104. The incoming request 1204 includes an object identifier 1206 of a target object resident at the cloud application. The network security system 104 detects 1208 the object identifier 1206 from the incoming request 1204 (e.g., from the HTTP request header). The network security system 104 then configures a synthetic request with the object identifier 1206 and issues the synthetic request to the cloud application. The synthetic request is configured to retrieve object metadata 1214 about the target object from the cloud application using the object identifier 1206. Examples of the object metadata 1214 include object name, object size, object type, and object sensitivity.

Then, a synthetic response 1212 is received by the network security system 104. The synthetic response 1212 supplies the object metadata 1214 to the network security system 104. Then, the network security system 104 uses the supplied object metadata 1214 for policy enforcement 1284, for example, on the held incoming request 1204. In some implementations, the network security system 104 releases the flow 1298 to transmit the incoming request 1204 to the cloud application. In other implementations, the incoming request 1204 is blocked and not transmitted to the cloud application.

Figure 13:
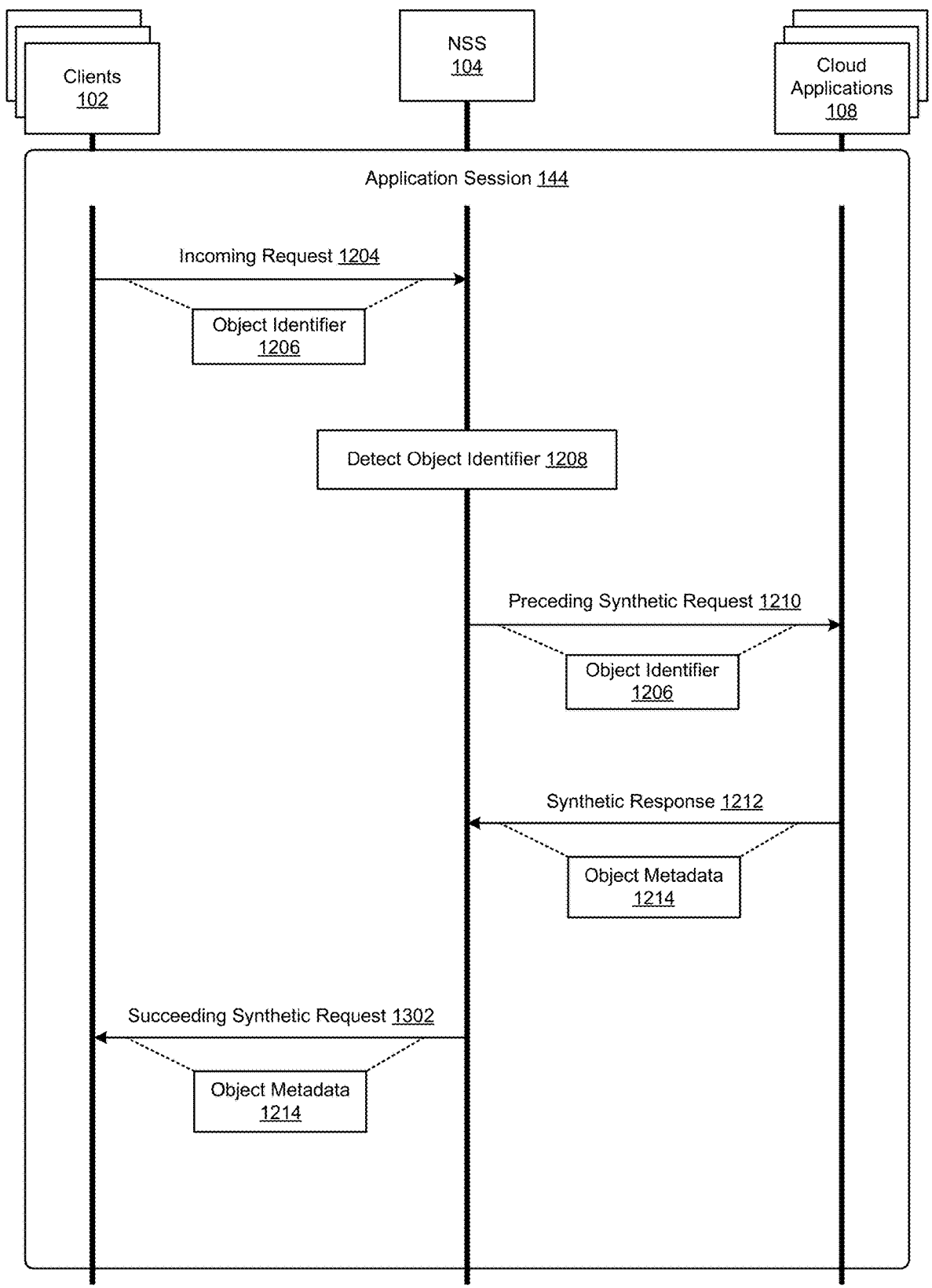
FIG. 13 shows one implementation of a succeeding synthetic request being issued to a client to convey object metadata, generated by a preceding synthetic request.

FIG. 13 shows one implementation of a succeeding synthetic request being issued to a client to convey object metadata, generated by a preceding synthetic request. In FIG. 13, the object metadata 1214, generated by the preceding synthetic request 1210, is sent by the network security system 104 to the client using a succeeding synthetic request 1302. One example of the object metadata 1214 conveyed to the client by the succeeding synthetic request 1302 includes notification about completion of a transaction like an upload or a download. The notification serves as a confirmation, for example, via a GUI that the requested transaction was successful.

Figure 14:
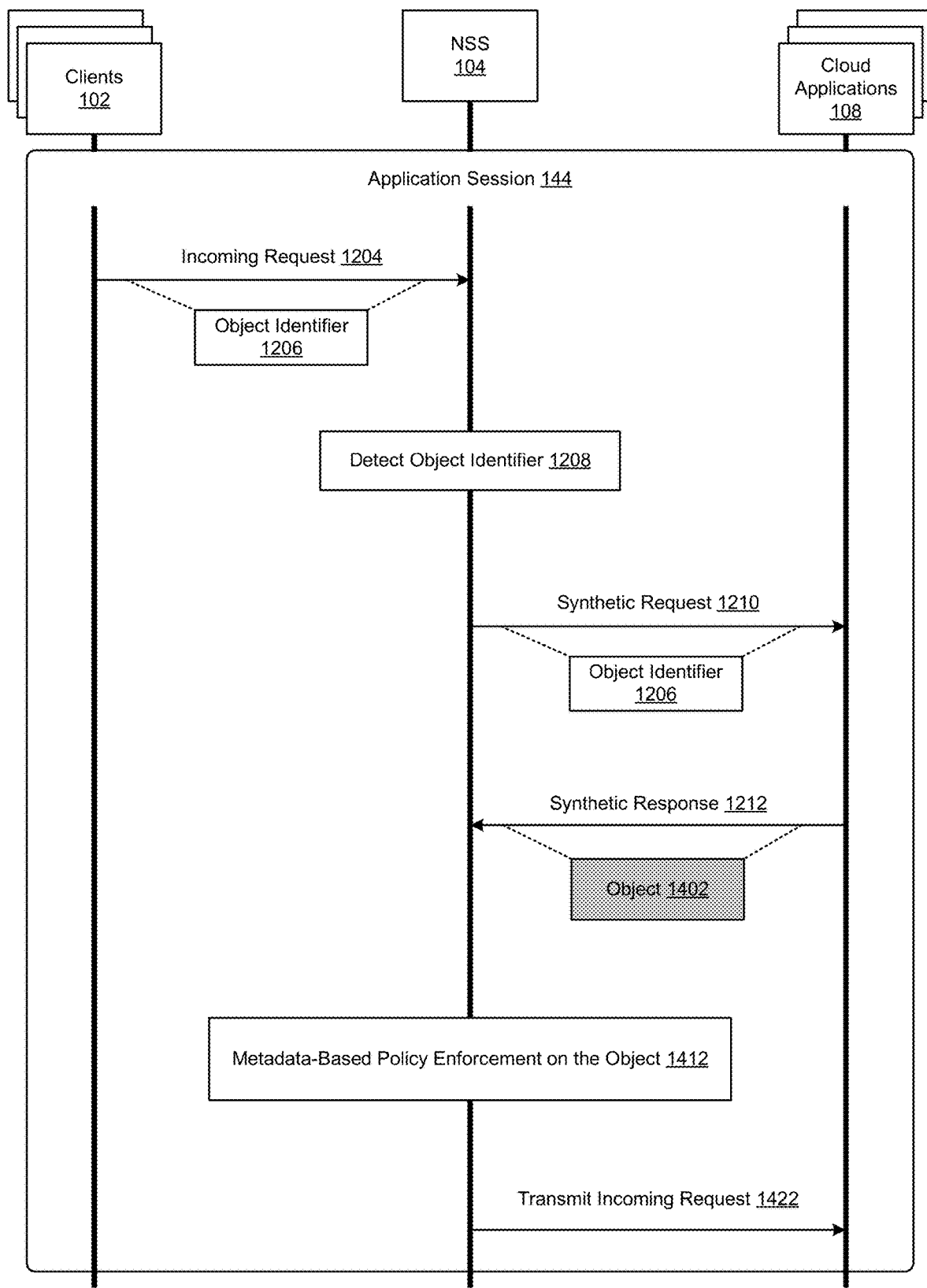
FIG. 14 shows one implementation of using synthetic requests to retrieve objects from cloud applications.

FIG. 14 shows one implementation of using the synthetic requests to retrieve objects from the cloud applications 108. In such an implementation, the synthetic response 1212 supplies the target object 1402 to the network security system 104 from the cloud application. Also, the policy enforcement 1412 is then on the object 1402 itself, for example, running DLP checks on the object 1402 for sensitivity determination, in addition to or instead of being on the held incoming request 1204. In some implementations, based on the results of the policy enforcement 1412, the network security system 104 releases the flow 1422 to transmit the incoming request 1204 to the cloud application. In other implementations, the incoming request 1204 is blocked and not transmitted to the cloud application.

Expired Metadata

Figure 15:
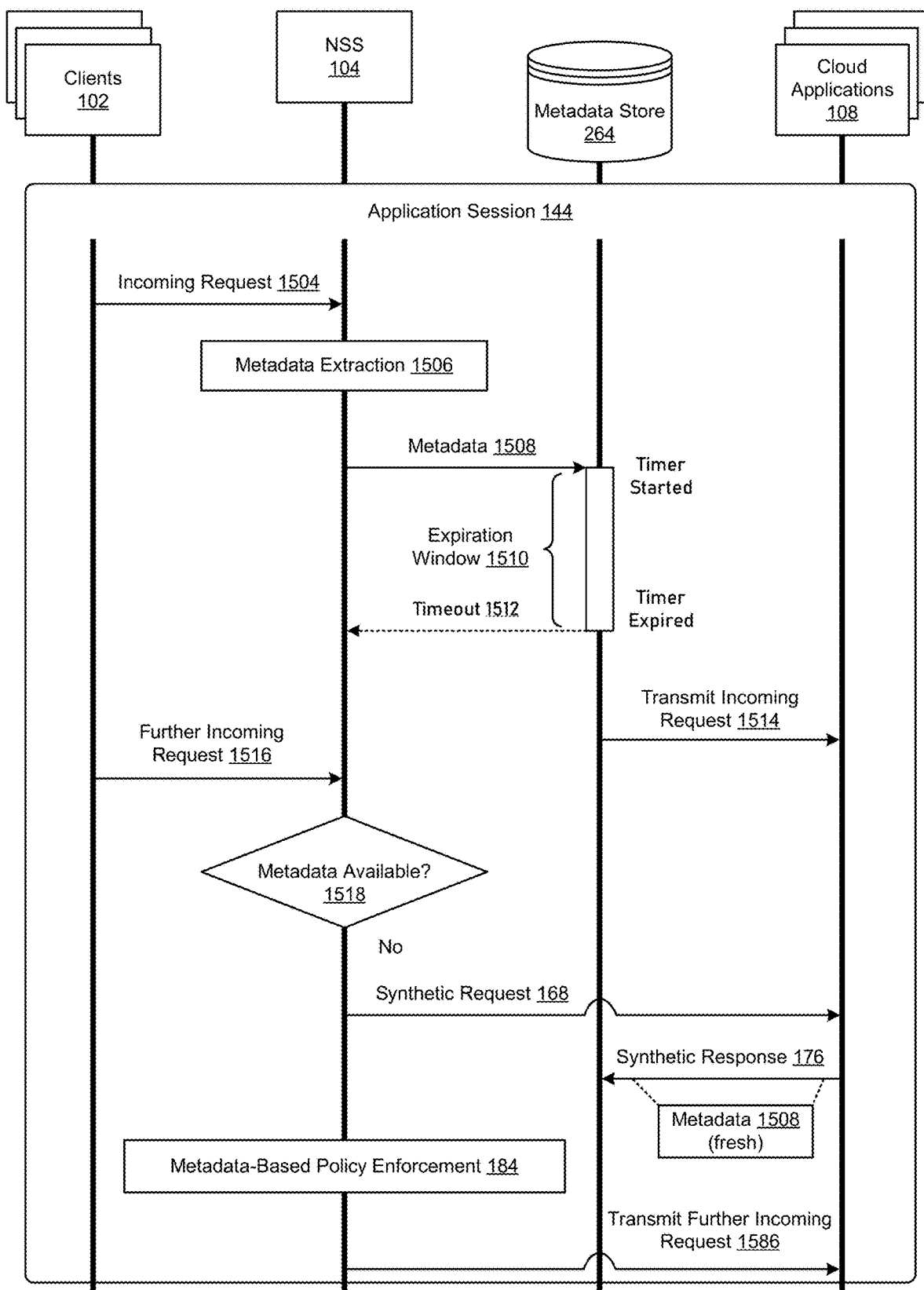
FIG. 15 shows one implementation of using synthetic requests to retrieve a fresh version of expired metadata.

FIG. 15 shows one implementation of using synthetic requests to retrieve a fresh version of expired metadata. In FIG. 15, during the application session 144, an incoming request 1504 is intercepted by the network security system 104. The network security system 104 performs metadata extraction 1506 on the incoming request 1504, extracts metadata 1508, and stores the extracted metadata 1508 in the metadata store 264 for an expiration window 1510. The expiration window 1510 terminates with a timeout event 1512 after a certain time period (e.g., after fifteen minutes or after two days). After the expiration window 1510, the metadata 1508 becomes stale (e.g., is removed from the metadata store 264) and is therefore unavailable to the network security system 104. The original incoming request 1504 that provided the metadata 1508 can be transmitted 1514 to the cloud application.

When a further incoming request 1516 that lacks the metadata 1508 required for policy enforcement is intercepted by the network security system 104, the network security system 104 determines 1518 that the required metadata 1508 is neither provided by the further incoming request 1516 nor present in the metadata store 264 anymore. To independently get access to a fresh version of the metadata 1508, the network security system 104 injects the synthetic request 168, receives a fresh metadata-supplying synthetic response 176, uses the supplied fresh metadata 1508 for policy enforcement 184, and releases the held further incoming request 1516 for transmission 1586 to the cloud application, in some implementations. In other implementations, the further incoming request 1516 is blocked and not transmitted to the cloud application.

Security Posture Modification

Figure 16:
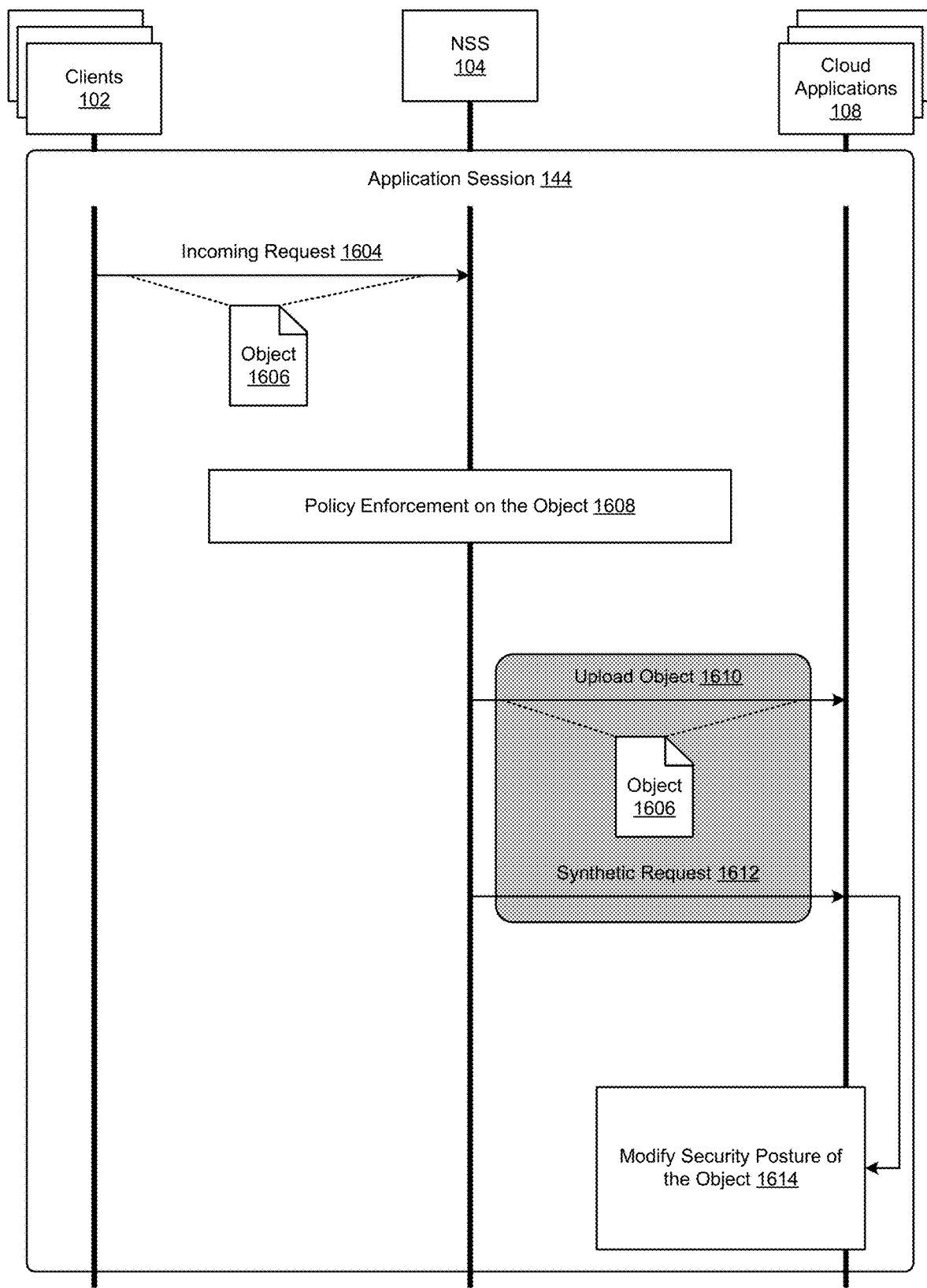
FIG. 16 shows one implementation of using synthetic requests to modify security postures of objects residing in cloud applications.

FIG. 16 shows one implementation of using synthetic requests to modify security postures of objects residing in the cloud applications 108. In FIG. 16, during the application session 144, an incoming request 1604 is intercepted by the network security system 104. The incoming request 1604 attempts to upload an object 1606 on the cloud application. After subjecting the object 1606 to policy enforcement 1608, in one implementation, the object 1606 is uploaded 1610 to the cloud application.

A supplemental synthetic request 1612 is issued by the network security system 104 to modify 1614 a security posture of the uploaded object 1606. Examples of modifying the security posture of the uploaded object 1606 include changing security configurations of the uploaded object 1606 on the cloud application, for example, changing the share settings of the uploaded object 1606 on the cloud application from "sharing allowed" to "sharing not allowed," or from "sharing allowed externally" to "sharing allowed only internally." Examples of modifying the security posture of the uploaded object 1606 include moving the uploaded object 1606 from one location to another location in the cloud application, or from the cloud application to another cloud application. Examples of modifying the security posture of the uploaded object 1606 include changing a sensitivity status of the uploaded object 1606 on the cloud application from "not sensitive" to "sensitive." In other implementations, the synthetic requests can be used to modify any information or metadata about the uploaded object 1606, or a previously-residing object on the cloud application.

Login Event Disambiguation

Figure 17:
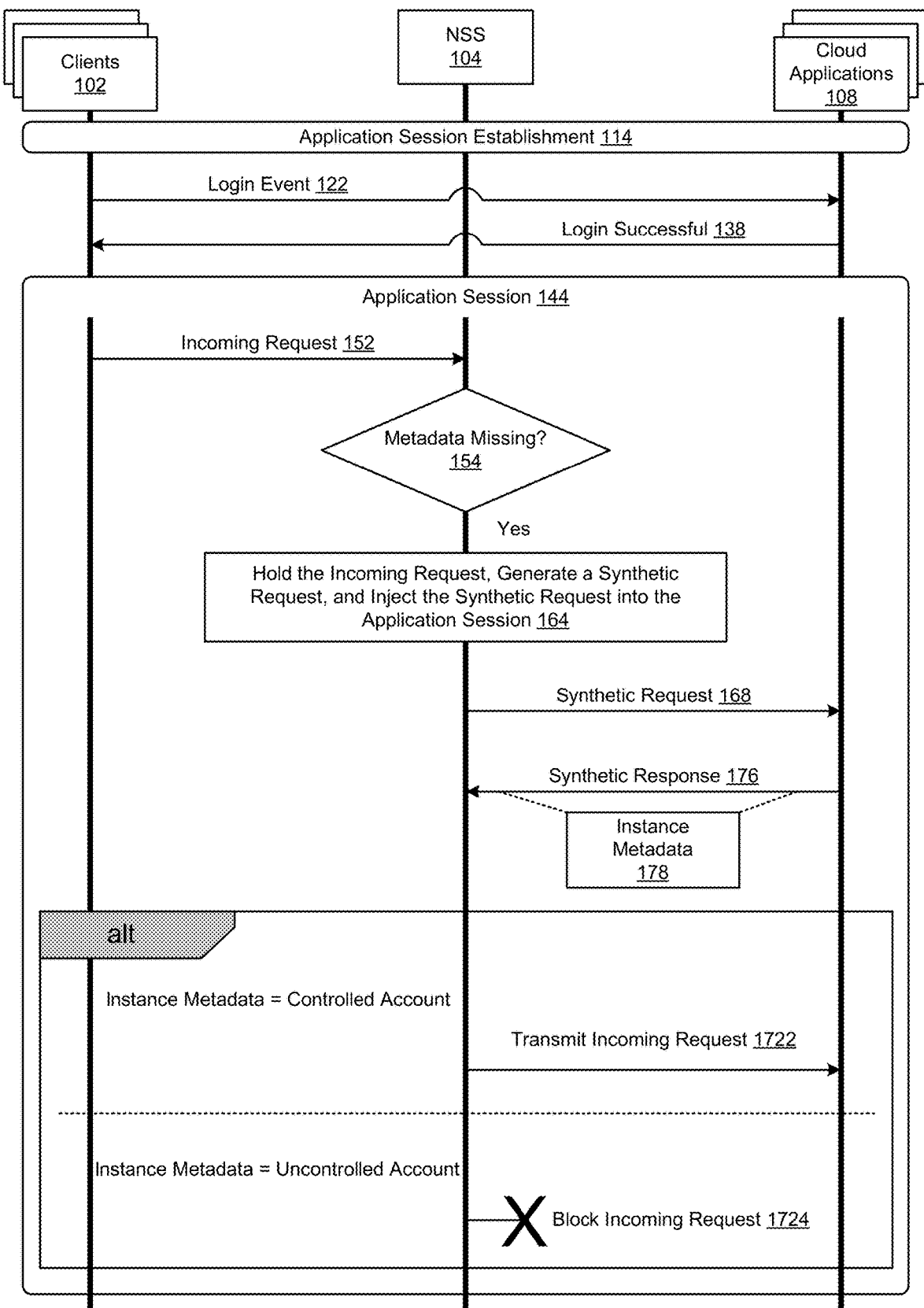
FIG. 17 shows one implementation of using synthetic requests to disambiguate a login event that bypassed a network security system.

FIG. 17 shows one implementation of using synthetic requests to disambiguate a login event that bypassed the network security system 104. In FIG. 17, the instance metadata 178, generated by the synthetic request 168 and supplied by the synthetic response 176, is used by the network security system 104 to determine whether the original login event 122, which bypassed by the network security system 104, and/or the incoming request 152, which was intercepted by the network security system 104, emanated from a controlled account or an uncontrolled account.

If the instance metadata 178 specifies that the original login event 122 and/or the incoming request 152 emanated from a controlled account like a corporate email, the incoming request 152 is transmitted 1722 to the cloud application. Alternatively, if the instance metadata 178 specifies that the original login event 122 and/or the incoming request 152 emanated from an uncontrolled account like a personal email, the incoming request 152 is blocked 1724 and not transmitted to the cloud application.

Parallel Synthetic Requests

Figure 18:
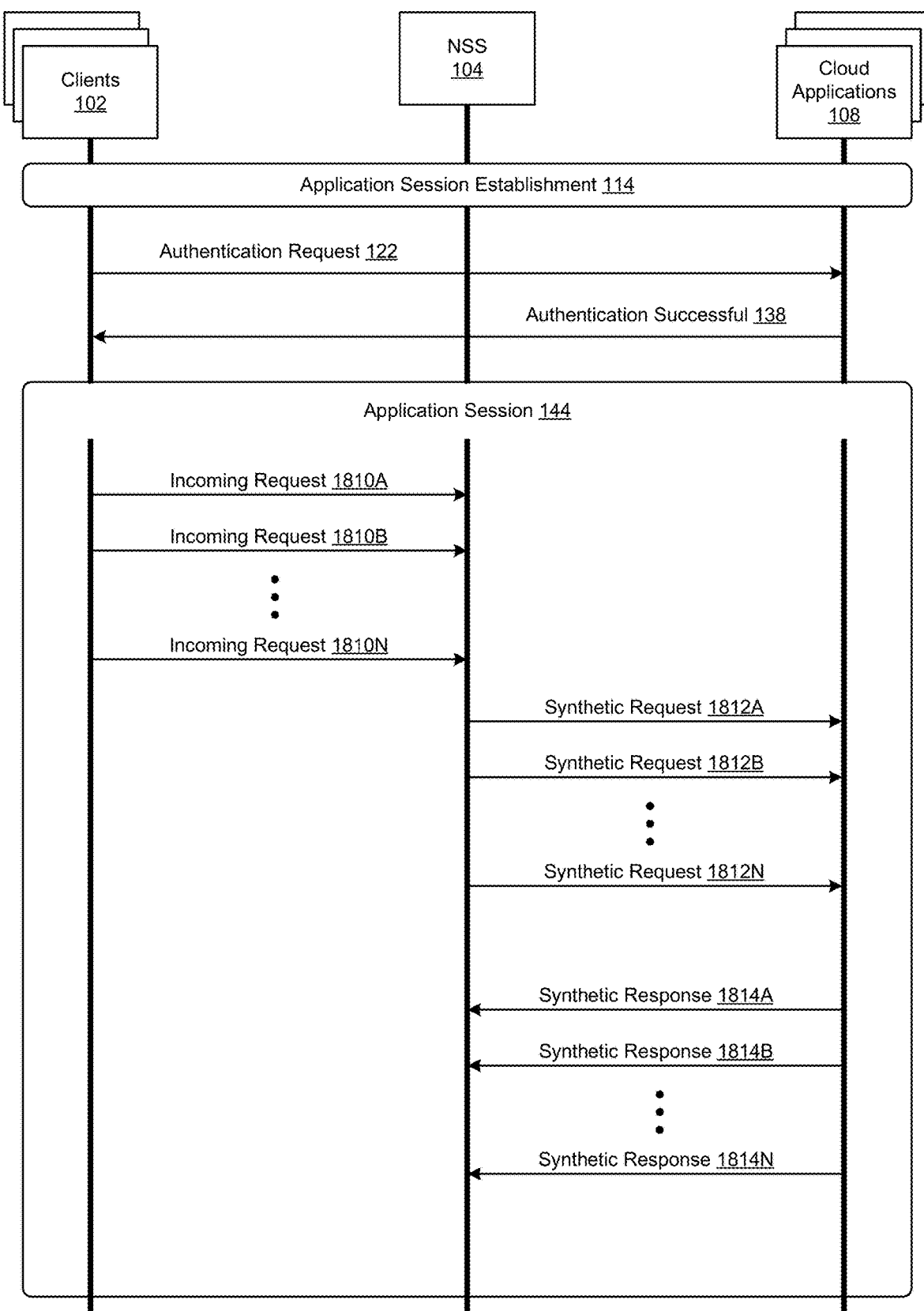
FIG. 18 shows one implementation of issuing multiple synthetic requests during an application session.

FIG. 18 shows one implementation of issuing multiple synthetic requests during an application session. In FIG. 18, during the application session 144, multiple incoming requests 1810A-N can be held and unheld by the network security system 104 in parallel or in sequence in response to the network security system 104 issuing multiple corresponding synthetic requests 1812A-N in parallel or in sequence, and/or the network security system 104 receiving multiple corresponding synthetic responses 1814A-N in parallel or in sequence.

Synthetic Requests for Future Incoming Requests

Figure 19:
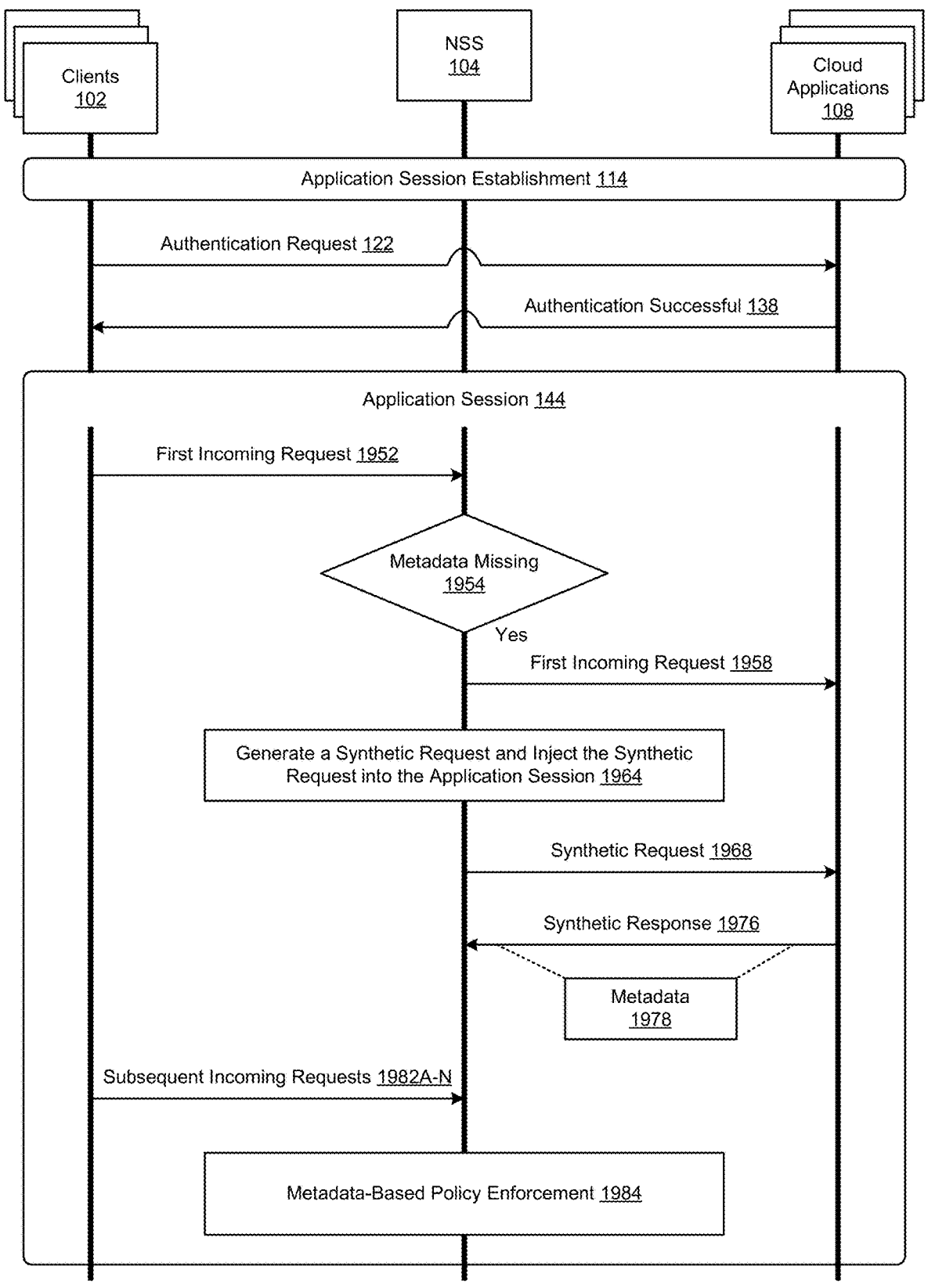
FIG. 19 shows one implementation of issuing a synthetic request to synthetically harvest/generate/garner metadata for policy enforcement on yet-to-be received future incoming requests.

FIG. 19 shows one implementation of issuing a synthetic request to synthetically harvest/generate/gamer metadata for policy enforcement on yet-to-be received future incoming requests. In FIG. 19, a first incoming request 1952 is intercepted by the network security system 104. The network security system 104 determines 1954 that the first incoming request 1952 fails to supply the metadata required for policy enforcement. Despite this, the network security system 104 does not hold the first incoming request 1952 and sends 1958 it to the cloud application.

To make the metadata available for future incoming requests, the network security system 104 generates a synthetic request 1968 and injects 1964 it into the application session 144 to transmit the synthetic request 1968 to the cloud application. In response, the network security system 104 receives a synthetic response 1976 that supplies the required metadata 1978.

From there onwards, when the network security system 104 receives subsequent incoming requests 1982A-N, the network security system 104 uses the synthetically harvested/generated/garnered metadata 1978 to perform policy enforcement 1984 on the subsequent incoming requests 1982A-N.

Computer System

Figure 20:
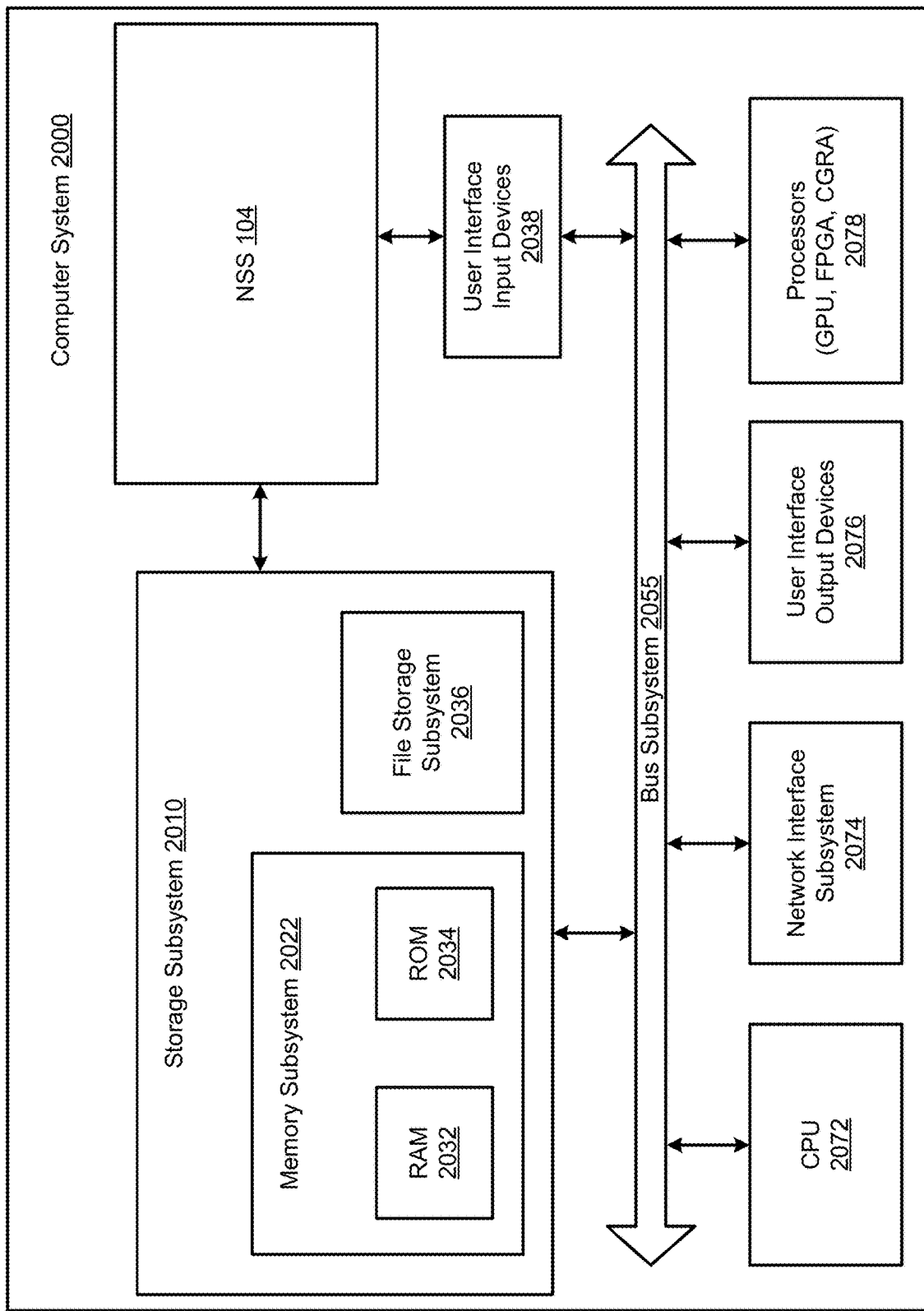
FIG. 20 shows an example computer system that can be used to implement the technology disclosed.

FIG. 20 shows an example computer system 2000 that can be used to implement the technology disclosed. Computer system 2000 includes at least one central processing unit (CPU) 2072 that communicates with a number of peripheral devices via bus subsystem 2055. These peripheral devices can include a storage subsystem 2010 including, for example, memory devices and a file storage subsystem 2036, user interface input devices 2038, user interface output devices 2076, and a network interface subsystem 2074. The input and output devices allow user interaction with computer system 2000. Network interface subsystem 2074 provides an interface to outside networks, including an interface to corresponding interface devices in other computer systems.

In one implementation, the network security system 104 is communicably linked to the storage subsystem 2010 and the user interface input devices 2038.

User interface input devices 2038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2000.

User interface output devices 2076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2000 to the user or to another machine or computer system.

Storage subsystem 2010 stores programming and data constructs that provide the functionality of some or all of the modules and methods described herein. These software modules are generally executed by processors 2078.

Processors 2078 can be graphics processing units (GPUs), field-programmable gate arrays (FPGAs), application-specific integrated circuits (ASICs), and/or coarse-grained reconfigurable architectures (CGRAs). Processors 2078 can be hosted by a deep learning cloud platform such as Google Cloud Platform™, Xilinx™, and Cirrascale™. Examples of processors 2078 include Google's Tensor Processing Unit (TPU)™, rackmount solutions like GX4 Rackmount Series™, GX20 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 2022 used in the storage subsystem 2010 can include a number of memories including a main random access memory (RAM) 2032 for storage of instructions and data during program execution and a read only memory (ROM) 2034 in which fixed instructions are stored. A file storage subsystem 2036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2036 in the storage subsystem 2010, or in other machines accessible by the processor.

Bus subsystem 2055 provides a mechanism for letting the various components and subsystems of computer system 2000 communicate with each other as intended. Although bus subsystem 2055 is shown schematically as a single bus, alternative implementations of the bus subsystem can use multiple busses.

Computer system 2000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2000 depicted in FIG. 20 is intended only as a specific example for purposes of illustrating the preferred implementations of the present invention. Many other configurations of computer system 2000 are possible having more or less components than the computer system depicted in FIG. 20.

Particular Implementations

The technology disclosed configures network security systems with the ability to trigger synthetic requests during application sessions of cloud applications. The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The implementations described in this section can be combined as features. In the interest of conciseness, the combinations of features are not individually enumerated and are not repeated with each base set of features. The reader will understand how features identified in the implementations described in this section can readily be combined with sets of base features identified as implementations in other sections of this application. These implementations are not meant to be mutually exclusive, exhaustive, or restrictive; and the technology disclosed is not limited to these implementations but rather encompasses all possible combinations, modifications, and variations within the scope of the claimed technology and its equivalents.

In various implementations of the technology disclosed, an object may be a file, a folder, a node, a resource, an AWS bucket, a GCP bucket, a blob bucket, and similar equivalents.

1) Synthetic Request Injection to Generate Metadata for Cloud Policy Enforcement In one implementation, the technology disclosed describes a system. The system comprises a network security system interposed between clients and cloud applications. The network security system is configured to receive from a client an incoming request to access a cloud application in an application session, i.e., a target cloud application targeted by the incoming request.

The network security system is further configured to analyze the incoming request and detect absence of at least some metadata required to enforce a security policy on the incoming request.

The network security system is further configured to hold the incoming request, generate a synthetic request, and inject the synthetic request into the application session to transmit the synthetic request to the cloud application. The synthetic request is configured to retrieve otherwise absent metadata from the cloud application.

The network security system is further configured to receive a response to the synthetic request from the cloud application. The response supplies the otherwise absent metadata.

The network security system is further configured to use the otherwise absent metadata to enforce the security policy on the incoming request.

In one implementation of the system, the synthetic request is generated by the network security system and not found in the incoming request from the client.

In one implementation of the system, the otherwise absent metadata supplied by the response identifies a login instance used by the incoming request to access the cloud application as being a controlled account or an uncontrolled account.

In one implementation of the system, the network security system is further configured to fulfill the incoming request if the login instance is the controlled account. The controlled account is a corporate account.

In another implementation of the system, the network security system is further configured to block the incoming request if the login instance is the uncontrolled account. The uncontrolled account is a private account.

In one implementation of the system, the incoming request attempts to upload an object to the cloud application. In some implementations of the system, the synthetic request is further configured to retrieve, from the cloud application, the otherwise absent metadata that identifies whether the object is sensitive or not. In some implementations of the system, the network security system is further configured to block upload of the object to the cloud application if the object is sensitive. In other implementations of the system, the network security system is further configured to upload the object to the cloud application if the object is not sensitive.

In one implementation of the system, the synthetic request is further configured to retrieve, from the cloud application, the otherwise absent metadata that identifies user information of a user who caused the client to issue the incoming request. The user information is from-user information.

In one implementation of the system, the network security system is further configured to receive a response to the synthetic request from the cloud application. The response supplies a user profile page that includes the user information.

In one implementation of the system, the synthetic request is further configured to retrieve the otherwise absent metadata from a metadata store independent of the cloud application. In some implementations of the system, the network security system is further configured to receive a response to the synthetic request from the metadata store. The response supplies the otherwise absent metadata.

In one implementation of the system, the network security system is further configured to extract an authorization token from the incoming request, and to configure the synthetic request with the authorization token to cause the synthetic request to access the cloud application.

In one implementation of the system, the network security system is further configured to use an application-specific parser (connector) specific to the cloud application to inspect the incoming request and detect the otherwise absent metadata. In some implementations of the system, the application-specific parser specifies match conditions that are specific to request and response syntaxes defined for a particular application programming interface (API) of the cloud application. In some implementations of the system, the match conditions are configured to specify which fields and variables in requests directed to a user API are configured to contain the metadata, and to extract the otherwise absent metadata from responses generated by the particular API.

In one implementation of the system, the network security system is further configured to use an application-specific template of the application-specific parser to construct the synthetic request. In some implementations of the system, the application-specific template specifies parameters to include in the synthetic request. The parameters are specific to the request and response syntaxes. The parameters are configured to cause the cloud application to generate responses that contain the otherwise absent metadata.

In one implementation of the system, the parameters include a unified resource locator (URL). In another implementation of the system, the parameters include a set of header fields. In yet another implementation of the system, header fields in the set of header fields include fields from the incoming request. In yet further implementation of the system, the parameters include a response body.

In another implementation, the technology disclosed describes a computer-implemented method. The computer-implemented method includes a network security system receiving from a client an incoming request to access a cloud application in an application session. The network security system is interposed between clients and cloud applications. The computer-implemented method further includes the network security system analyzing the incoming request and detecting absence of at least some metadata required to enforce a security policy on the incoming request.

The computer-implemented method further includes the network security system holding the incoming request, generating a synthetic request, and injecting the synthetic request into the application session and transmitting the synthetic request to the cloud application. The synthetic request is configured to retrieve otherwise absent metadata from the cloud application.

The computer-implemented method further includes the network security system receiving a response to the synthetic request from the cloud application. The response supplies the otherwise absent metadata.

The computer-implemented method further includes the network security system using the otherwise absent metadata to enforce the security policy on the incoming request.

In one implementation of the computer-implemented method, the synthetic request is generated by the network security system and not found in the incoming request from the client.

In one implementation of the computer-implemented method, the otherwise absent metadata supplied by the response identifies a login instance used by the incoming request to access the cloud application as being a controlled account or an uncontrolled account.

In one implementation, the computer-implemented method further includes the network security system fulfilling the incoming request if the login instance is the controlled account. The controlled account is a corporate account.

In another implementation, the computer-implemented method further includes the network security system blocking the incoming request if the login instance is the uncontrolled account. The uncontrolled account is a private account.

In one implementation of the computer-implemented method, the incoming request attempts to upload an object to the cloud application. In some implementations of the computer-implemented method, the synthetic request is further configured to retrieve, from the cloud application, the otherwise absent metadata that identifies whether the object is sensitive or not. In some implementations of the computer-implemented method, the computer-implemented method further includes the network security system blocking upload of the object to the cloud application if the object is sensitive. In other implementations of the computer-implemented method, the computer-implemented method further includes the network security system uploading the object to the cloud application if the object is not sensitive.

In one implementation of the computer-implemented method, the synthetic request is further configured to retrieve, from the cloud application, the otherwise absent metadata that identifies user information of a user who caused the client to issue the incoming request. The user information is from-user information.

In one implementation, the computer-implemented method further includes the network security system receiving a response to the synthetic request from the cloud application. The response supplies a user profile page that includes the user information.

In one implementation of the computer-implemented method, the synthetic request is further configured to retrieve the otherwise absent metadata from a metadata store independent of the cloud application. In some implementations, the computer-implemented method further includes the network security system receiving a response to the synthetic request from the metadata store. The response supplies the otherwise absent metadata.

In one implementation, the computer-implemented method further includes the network security system extracting an authorization token from the incoming request and configuring the synthetic request with the authorization token to cause the synthetic request to access the cloud application.

In one implementation, the computer-implemented method further includes the network security system using an application-specific parser (connector) specific to the cloud application to inspect the incoming request and detecting the otherwise absent metadata. In some implementations of the computer-implemented method, the application-specific parser specifies match conditions that are specific to request and response syntaxes defined for a particular application programming interface (API) of the cloud application. In some implementations of the computer-implemented method, the match conditions are configured to specify which fields and variables in requests directed to a user API are configured to contain the metadata, and to extract the otherwise absent metadata from responses generated by the particular API.

In one implementation, the computer-implemented method further includes the network security system using an application-specific template of the application-specific parser to construct the synthetic request. In some implementations of the computer-implemented method, the application-specific template specifies parameters to include in the synthetic request. The parameters are specific to the request and response syntaxes. The parameters are configured to cause the cloud application to generate responses that contain the otherwise absent metadata.

In one implementation of the computer-implemented method, the parameters include a unified resource locator (URL). In another implementation of the computer-implemented method, the parameters include a set of header fields. In yet another implementation of the computer-implemented method, header fields in the set of header fields include fields from the incoming request. In yet further implementation of the computer-implemented method, the parameters include a response body.

Other implementations of the computer-implemented method disclosed herein can include a non-transitory computer readable storage medium storing instructions executable by a processor to perform the computer-implemented method described above. Yet other implementations of the computer-implemented method disclosed herein can include a system including memory and one or more processors operable to execute instructions, stored in the memory, to perform the computer-implemented method described above.

In yet another implementation, a non-transitory computer readable storage medium impressed with computer program instructions to enforce policies is described. The instructions, when executed on a processor, implement a method comprising a network security system receiving from a client an incoming request to access a cloud application in an application session. The network security system is interposed between clients and cloud applications. The method further comprises the network security system analyzing the incoming request and detecting absence of at least some metadata required to enforce a security policy on the incoming request.

The method further comprises the network security system holding the incoming request, generating a synthetic request, and injecting the synthetic request into the application session and transmitting the synthetic request to the cloud application. The synthetic request is configured to retrieve otherwise absent metadata from the cloud application.

The method further comprises the network security system receiving a response to the synthetic request from the cloud application. The response supplies the otherwise absent metadata.

The method further comprises the network security system using the otherwise absent metadata to enforce the security policy on the incoming request.

In one implementation of the non-transitory computer readable storage medium, the synthetic request is generated by the network security system and not found in the incoming request from the client.

In one implementation of the non-transitory computer readable storage medium, the otherwise absent metadata supplied by the response identifies a login instance used by the incoming request to access the cloud application as being a controlled account or an uncontrolled account.

In one implementation, the non-transitory computer readable storage medium further comprises the network security system fulfilling the incoming request if the login instance is the controlled account. The controlled account is a corporate account.

In another implementation, the non-transitory computer readable storage medium further comprises the network security system blocking the incoming request if the login instance is the uncontrolled account. The uncontrolled account is a private account.

In one implementation of the non-transitory computer readable storage medium, the incoming request attempts to upload an object to the cloud application. In some implementations of the non-transitory computer readable storage medium, the synthetic request is further configured to retrieve, from the cloud application, the otherwise absent metadata that identifies whether the object is sensitive or not. In some implementations of the non-transitory computer readable storage medium, the non-transitory computer readable storage medium further comprises the network security system blocking upload of the object to the cloud application if the object is sensitive. In other implementations of the non-transitory computer readable storage medium, the non-transitory computer readable storage medium further comprises the network security system uploading the object to the cloud application if the object is not sensitive.

In one implementation of the non-transitory computer readable storage medium, the synthetic request is further configured to retrieve, from the cloud application, the otherwise absent metadata that identifies user information of a user who caused the client to issue the incoming request. The user information is from-user information.

In one implementation, the non-transitory computer readable storage medium further comprises the network security system receiving a response to the synthetic request from the cloud application. The response supplies a user profile page that includes the user information.

In one implementation of the non-transitory computer readable storage medium, the synthetic request is further configured to retrieve the otherwise absent metadata from a metadata store independent of the cloud application. In some implementations, the non-transitory computer readable storage medium further comprises the network security system receiving a response to the synthetic request from the metadata store. The response supplies the otherwise absent metadata.

In one implementation, the non-transitory computer readable storage medium further comprises the network security system extracting an authorization token from the incoming request and configuring the synthetic request with the authorization token to cause the synthetic request to access the cloud application.

In one implementation, the non-transitory computer readable storage medium further comprises the network security system using an application-specific parser (connector) specific to the cloud application to inspect the incoming request and detecting the otherwise absent metadata. In some implementations of the non-transitory computer readable storage medium, the application-specific parser specifies match conditions that are specific to request and response syntaxes defined for a particular application programming interface (API) of the cloud application. In some implementations of the non-transitory computer readable storage medium, the match conditions are configured to specify which fields and variables in requests directed to a user API are configured to contain the metadata, and to extract the otherwise absent metadata from responses generated by the particular API.

In one implementation, the non-transitory computer readable storage medium further comprises the network security system using an application-specific template of the application-specific parser to construct the synthetic request. In some implementations of the non-transitory computer readable storage medium, the application-specific template specifies parameters to include in the synthetic request. The parameters are specific to the request and response syntaxes. The parameters are configured to cause the cloud application to generate responses that contain the otherwise absent metadata.

In one implementation of the non-transitory computer readable storage medium, the parameters include a unified resource locator (URL). In another implementation of the non-transitory computer readable storage medium, the parameters include a set of header fields. In yet another implementation of the non-transitory computer readable storage medium, header fields in the set of header fields include fields from the incoming request. In yet further implementation of the non-transitory computer readable storage medium, the parameters include a response body.

2) Synthetic Request Injection to Generate Metadata at Points of Presence for Cloud Policy Enforcement In one implementation, the technology disclosed describes a system. The system comprises an edge network of a plurality of points of presence of a network security system. Points of presence in the plurality of points of presence are configured to intermediate traffic between clients and cloud applications and to use metadata to apply policies on the intermediated traffic. There are redundancies in metadata synchronization between the points of presence due to metadata migration to a second point of presence from a first point of presence handing off intermediation to the second point of presence within an application session.

Each of the points of presence is configured with inline metadata generation logic. The inline metadata generation logic is configured to issue synthetic requests to provide the metadata to the second point of presence without requiring the metadata migration to the second point of presence.

In one implementation of the system, a client directs towards a cloud application a sequence of incoming requests within the application session. The cloud application is a target cloud application targeted by the incoming request. In some implementations of the system, incoming requests in the sequence of incoming requests characterize at least one metadata-generating event (e.g., login event) that precedes at least one policy enforcement-requiring event (e.g., activities like upload, share, edit, delete, download).

In one implementation of the system, the first point of presence captured, from the metadata-generating event, metadata required to enforce one or more data protection policies (e.g., data loss protection (DLP) policies, threat detection policies, and malware detection policies) on the policy enforcement-requiring event. In some implementations of the system, the first point of presence materialized the metadata in a local metadata store (e.g., an in-memory data structure store (e.g., a Redis database)) that is confined only to the first point of presence in the edge network. In other implementations of the system, the first point of presence materialized the metadata in a distributed metadata store (e.g., an in-memory data structure store (e.g., a Redis database)) that is shared by the points of presence in the edge network.

In one implementation of the system, the first point of presence handed off the intermediation to the second point of presence after the metadata-generating event but before the policy enforcement-requiring event, and therefore the metadata-generating event bypassed the second point of presence, and therefore the metadata is locally unavailable to the second point of presence and requires the metadata migration from the local metadata store or the distributed metadata store.

In one implementation of the system, the second point of presence intermediates the policy enforcement-requiring event and detects absence of the metadata when enforcing the data protection policies on the policy enforcement-requiring event. The absence of the metadata is determined when a local metadata store (e.g., an in-memory data structure store (e.g., a Redis database)) that is confined only to the second point of presence in the edge network returns an empty value.

In one implementation of the system, the inline metadata generation logic is further configured to issue a synthetic request to retrieve the metadata in response to the detection of the absence of the metadata, and to provide the retrieved metadata to the second point of presence to enforce the data protection policies on the policy enforcement-requiring event, thereby obviating the metadata migration from the local metadata store of the first point of presence or the distributed metadata store.

In one implementation of the system, the inline metadata generation logic is further configured to issue the synthetic request to the cloud application, and to receive a response to the synthetic request from the cloud application. The response supplies the metadata.

In one implementation of the system, the inline metadata generation logic is further configured to issue the synthetic request to a metadata store independent of the cloud application, and to receive a response to the synthetic request from the metadata store. The response supplies the metadata. In some implementations of the system, the inline metadata generation logic is further configured to store the supplied metadata in the local metadata store of the second point of presence.

In one implementation of the system, the synthetic request is issued within the application session and independently of the incoming requests.

In one implementation of the system, the metadata-generating event is a login event. The metadata generated by the login event includes instance metadata. The instance metadata identifies a login instance used to access the cloud application as being a controlled account or an uncontrolled account. In some implementations of the system, the policy enforcement-requiring event is an upload activity that attempts to upload an object to the cloud application.

In some implementations of the system, the second point of presence, based on the instance metadata, allows the upload activity if the login instance is the controlled account. The controlled account is a corporate account. In other implementations of the system, the second point of presence, based on the instance metadata, blocks the upload activity if the login instance is the uncontrolled account. The uncontrolled account is a private account.

In one implementation of the system, the metadata generated by the login event includes user metadata. The user metadata identifies user information of a user who caused the client to access the cloud application.

In one implementation of the system, the second point of presence, based on the user metadata, allows the upload activity if the user information indicates that the user is an authorized user. In another implementation of the system, the second point of presence, based on the user metadata, blocks the upload activity if the user information indicates that the user is an unauthorized user.

In one implementation of the system, the points of presence are data centers that are geographically distributed across the edge network.

In another implementation, the technology disclosed describes a computer-implemented method. The computer-implemented method includes an edge network intermediating traffic between clients and cloud applications and applying policies on the intermediated traffic based on metadata. The edge network comprises a plurality of points of presence of a network security system. Points of presence in the plurality of points of presence are configured to intermediate traffic between clients and cloud applications and to use metadata to apply policies on the intermediated traffic. There are redundancies in metadata synchronization between the points of presence due to metadata migration to a second point of presence from a first point of presence handing off intermediation to the second point of presence within an application session.

The computer-implemented method further includes inline metadata generation logic running in each of the points of presence and issuing synthetic requests to provide the metadata to the second point of presence without requiring the metadata migration to the second point of presence.

In one implementation of the computer-implemented method, a client directs towards a cloud application a sequence of incoming requests within the application session. The cloud application is a target cloud application targeted by the incoming request. In some implementations of the computer-implemented method, incoming requests in the sequence of incoming requests characterize at least one metadata-generating event (e.g., login event) that precedes at least one policy enforcement-requiring event (e.g., activities like upload, share, edit, delete, download).

In one implementation of the computer-implemented method, the first point of presence captured, from the metadata-generating event, metadata required to enforce one or more data protection policies (e.g., data loss protection (DLP) policies, threat detection policies, and malware detection policies) on the policy enforcement-requiring event. In some implementations of the computer-implemented method, the first point of presence materialized the metadata in a local metadata store (e.g., an in-memory data structure store (e.g., a Redis database)) that is confined only to the first point of presence in the edge network. In other implementations of the computer-implemented method, the first point of presence materialized the metadata in a distributed metadata store (e.g., an in-memory data structure store (e.g., a Redis database)) that is shared by the points of presence in the edge network.

In one implementation of the computer-implemented method, the first point of presence handed off the intermediation to the second point of presence after the metadata-generating event but before the policy enforcement-requiring event, and therefore the metadata-generating event bypassed the second point of presence, and therefore the metadata is locally unavailable to the second point of presence and requires the metadata migration from the local metadata store or the distributed metadata store.

In one implementation of the computer-implemented method, the second point of presence intermediates the policy enforcement-requiring event and detects absence of the metadata when enforcing the data protection policies on the policy enforcement-requiring event. The absence of the metadata is determined when a local metadata store (e.g., an in-memory data structure store (e.g., a Redis database)) that is confined only to the second point of presence in the edge network returns an empty value.

In one implementation, the computer-implemented method further includes the inline metadata generation logic issuing a synthetic request to retrieve the metadata in response to the detection of the absence of the metadata, and providing the retrieved metadata to the second point of presence to enforce the data protection policies on the policy enforcement-requiring event, thereby obviating the metadata migration from the local metadata store of the first point of presence or the distributed metadata store.

In one implementation, the computer-implemented method further includes the inline metadata generation logic issuing the synthetic request to the cloud application and receiving a response to the synthetic request from the cloud application. The response supplies the metadata.

In one implementation, the computer-implemented method further includes the inline metadata generation logic issuing the synthetic request to a metadata store independent of the cloud application and receiving a response to the synthetic request from the metadata store. The response supplies the metadata. In some implementations, the computer-implemented method further includes the inline metadata generation logic storing the supplied metadata in the local metadata store of the second point of presence.

In one implementation of the computer-implemented method, the synthetic request is issued within the application session and independently of the incoming requests.

In one implementation of the computer-implemented method, the metadata-generating event is a login event. The metadata generated by the login event includes instance metadata. The instance metadata identifies a login instance used to access the cloud application as being a controlled account or an uncontrolled account. In some implementations of the computer-implemented method, the policy enforcement-requiring event is an upload activity that attempts to upload an object to the cloud application.

In some implementations of the computer-implemented method, the second point of presence, based on the instance metadata, allows the upload activity if the login instance is the controlled account. The controlled account is a corporate account. In other implementations of the computer-implemented method, the second point of presence, based on the instance metadata, blocks the upload activity if the login instance is the uncontrolled account. The uncontrolled account is a private account.

In one implementation of the computer-implemented method, the metadata generated by the login event includes user metadata. The user metadata identifies user information of a user who caused the client to access the cloud application.

In one implementation of the computer-implemented method, the second point of presence, based on the user metadata, allows the upload activity if the user information indicates that the user is an authorized user. In another implementation of the computer-implemented method, the second point of presence, based on the user metadata, blocks the upload activity if the user information indicates that the user is an unauthorized user.

In one implementation of the computer-implemented method, the points of presence are data centers that are geographically distributed across the edge network.

Other implementations of the computer-implemented method disclosed herein can include a non-transitory computer readable storage medium storing instructions executable by a processor to perform the computer-implemented method described above. Yet other implementations of the computer-implemented method disclosed herein can include a system including memory and one or more processors operable to execute instructions, stored in the memory, to perform the computer-implemented method described above.

In yet another implementation, a non-transitory computer readable storage medium impressed with computer program instructions to enforce policies is described. The instructions, when executed on a processor, implement a method comprising an edge network intermediating traffic between clients and cloud applications and applying policies on the intermediated traffic based on metadata. The edge network comprises a plurality of points of presence of a network security system. Points of presence in the plurality of points of presence are configured to intermediate traffic between clients and cloud applications and to use metadata to apply policies on the intermediated traffic. There are redundancies in metadata synchronization between the points of presence due to metadata migration to a second point of presence from a first point of presence handing off intermediation to the second point of presence within an application session.

The method further comprises inline metadata generation logic running in each of the points of presence and issuing synthetic requests to provide the metadata to the second point of presence without requiring the metadata migration to the second point of presence.

In one implementation of the non-transitory computer readable storage medium, a client directs towards a cloud application a sequence of incoming requests within the application session. The cloud application is a target cloud application targeted by the incoming request. In some implementations of the non-transitory computer readable storage medium, incoming requests in the sequence of incoming requests characterize at least one metadata-generating event (e.g., login event) that precedes at least one policy enforcement-requiring event (e.g., activities like upload, share, edit, delete, download).

In one implementation of the non-transitory computer readable storage medium, the first point of presence captured, from the metadata-generating event, metadata required to enforce one or more data protection policies (e.g., data loss protection (DLP) policies, threat detection policies, and malware detection policies) on the policy enforcement-requiring event. In some implementations of the non-transitory computer readable storage medium, the first point of presence materialized the metadata in a local metadata store (e.g., an in-memory data structure store (e.g., a Redis database)) that is confined only to the first point of presence in the edge network. In other implementations of the non-transitory computer readable storage medium, the first point of presence materialized the metadata in a distributed metadata store (e.g., an in-memory data structure store (e.g., a Redis database)) that is shared by the points of presence in the edge network.

In one implementation of the non-transitory computer readable storage medium, the first point of presence handed off the intermediation to the second point of presence after the metadata-generating event but before the policy enforcement-requiring event, and therefore the metadata-generating event bypassed the second point of presence, and therefore the metadata is locally unavailable to the second point of presence and requires the metadata migration from the local metadata store or the distributed metadata store.

In one implementation of the non-transitory computer readable storage medium, the second point of presence intermediates the policy enforcement-requiring event and detects absence of the metadata when enforcing the data protection policies on the policy enforcement-requiring event. The absence of the metadata is determined when a local metadata store (e.g., an in-memory data structure store (e.g., a Redis database)) that is confined only to the second point of presence in the edge network returns an empty value.

In one implementation, the non-transitory computer readable storage medium further comprises the inline metadata generation logic issuing a synthetic request to retrieve the metadata in response to the detection of the absence of the metadata, and providing the retrieved metadata to the second point of presence to enforce the data protection policies on the policy enforcement-requiring event, thereby obviating the metadata migration from the local metadata store of the first point of presence or the distributed metadata store.

In one implementation, the non-transitory computer readable storage medium further comprises the inline metadata generation logic issuing the synthetic request to the cloud application and receiving a response to the synthetic request from the cloud application. The response supplies the metadata.

In one implementation, the non-transitory computer readable storage medium further comprises the inline metadata generation logic issuing the synthetic request to a metadata store independent of the cloud application and receiving a response to the synthetic request from the metadata store. The response supplies the metadata. In some implementations, the non-transitory computer readable storage medium further comprises the inline metadata generation logic storing the supplied metadata in the local metadata store of the second point of presence.

In one implementation of the non-transitory computer readable storage medium, the synthetic request is issued within the application session and independently of the incoming requests.

In one implementation of the non-transitory computer readable storage medium, the metadata-generating event is a login event. The metadata generated by the login event includes instance metadata. The instance metadata identifies a login instance used to access the cloud application as being a controlled account or an uncontrolled account. In some implementations of the non-transitory computer readable storage medium, the policy enforcement-requiring event is an upload activity that attempts to upload an object to the cloud application.

In some implementations of the non-transitory computer readable storage medium, the second point of presence, based on the instance metadata, allows the upload activity if the login instance is the controlled account. The controlled account is a corporate account. In other implementations of the non-transitory computer readable storage medium, the second point of presence, based on the instance metadata, blocks the upload activity if the login instance is the uncontrolled account. The uncontrolled account is a private account.

In one implementation of the non-transitory computer readable storage medium, the metadata generated by the login event includes user metadata. The user metadata identifies user information of a user who caused the client to access the cloud application.

In one implementation of the non-transitory computer readable storage medium, the second point of presence, based on the user metadata, allows the upload activity if the user information indicates that the user is an authorized user. In another implementation of the non-transitory computer readable storage medium, the second point of presence, based on the user metadata, blocks the upload activity if the user information indicates that the user is an unauthorized user.

In one implementation of the non-transitory computer readable storage medium, the points of presence are data centers that are geographically distributed across the edge network.

3) Data Flow Logic for Synthetic Request Injection for Cloud Policy Enforcement

In one implementation, the technology disclosed describes a system. The system comprises a plurality of network security systems. Network security systems in the plurality of network security systems are configured to intermediate traffic between clients and cloud applications. The system comprises data flow logic. The data flow logic is configured to inject an incoming request directed to a cloud application in a processing path of a particular network security system in the network security systems.

The particular network security system is configured to use an application-specific parser specific to the cloud application to inspect certain fields and variables in the incoming request for metadata, determine that the metadata is missing, and use an application-specific template of the application-specific parser to construct a synthetic request.

The data flow logic is further configured to inject the synthetic request in the processing path of the particular network security system to transmit the synthetic request to the cloud application.

The data flow logic is further configured to inject a response to the synthetic request from the cloud application in the processing path of the particular network security system.

The particular network security system is further configured to use the application-specific parser to extract the missing metadata from the response.

In one implementation of the system, the application-specific parser specifies match conditions that are specific to request and response syntaxes defined for a particular application programming interface (API) of the cloud application. In some implementations of the system, the match conditions are configured to specify which fields and variables in requests directed to a user API are configured to contain the metadata, and to extract the missing metadata from responses generated by the particular API.

In one implementation of the system, the application-specific template specifies parameters to include in the synthetic request. The parameters are specific to the request and response syntaxes. In some implementations of the system, the parameters are configured to cause the cloud application to generate responses that contain the missing metadata. In one implementation of the system, the parameters include a unified resource locator (URL). In another implementation of the system, the parameters include a set of header fields. In some implementations of the system, header fields in the set of header fields include fields from the incoming request. In yet another implementation of the system, the parameters include a response body.

In one implementation of the system, the particular network security system is further configured to use the application-specific parser to determine an activity being performed by the incoming request.

In one implementation of the system, the application-specific parser has respective application-specific templates for respective activities. The application-specific template is used to generate the synthetic request for the determined activity. In some implementations of the system, the application-specific parser has an application-specific templates for a plurality of activities determined by the application-specific parser. The application-specific template is used to generate the synthetic request for determined activities in the plurality of activities.

In one implementation of the system, the application-specific template includes a first construction logic to generate the synthetic request for a browser instance of the cloud application.

In one implementation of the system, the application-specific template includes a second construction logic to generate the synthetic request for a native instance of the cloud application running locally on a client. In some implementations of the system, the particular network security system is further configured to use the second construction logic to send a synthetic response to the native instance to retrieve a master token of a user identity spanning the cloud application, send a first synthetic request to the cloud application to retrieve a people token specific to the native instance of the cloud application, and send a second synthetic request to the cloud application to retrieve the missing metadata.

In one implementation of the system, the particular network security system is further configured to store the extracted missing metadata. In some implementations of the system, the particular network security system is further configured to hold the incoming request in response to determining that the metadata is missing. In other implementations of the system, the particular network security system is further configured to release the incoming request and use the extracted missing metadata to subject the incoming request to policy enforcement.

In one implementation of the system, the incoming request is completed in dependence upon the policy enforcement and transmitted to the cloud application. In some implementations of the system, the completed incoming request causes an activity to be executed on an object. In one implementation of the system, the activity is uploading the object to the cloud application. In one implementation of the system, the activity is downloading the object from the cloud application. In one implementation of the system, the activity is editing the object on the cloud application. In one implementation of the system, the activity is deleting the object from the cloud application. In one implementation of the system, the activity is creating the object on the cloud application. In one implementation of the system, the activity is sharing the object on the cloud application (e.g., via a link). In one implementation of the system, the activity is moving the object within the cloud application. In one implementation of the system, the activity is moving the object outside the cloud application.

In one implementation of the system, the incoming request is blocked in dependence upon the policy enforcement.

In one implementation of the system, the particular network security system is an inline metadata generation side car service shared by multiple network security systems in the plurality of network security systems and configured to retrieve the metadata using the synthetic request.

In one implementation of the system, the particular network security system is further configured to inspect the incoming request and identify the cloud application and invoke the application-specific parser based on the identified cloud application.

In one implementation of the system, the data flow logic is further configured to inject the incoming request in the processing path of the particular network security system in a first application session. In some implementations of the system, the data flow logic is further configured to inject the synthetic request in the processing path of the particular network security system in the first application session. In some implementations of the system, the particular network security system is further configured to configure the synthetic request with one or more application session identifiers that are used by the data flow logic to inject the synthetic request in the processing path of the particular network security system in the first application session.

In one implementation of the system, the application session identifiers include at least one of user agent information, username, authenticated user, tenant identifier (ID), location internet protocol (IP) address.

In one implementation of the system, the particular network security system is further configured to strip off the application session identifiers from the synthetic request prior to transmission to the cloud application.

In one implementation of the system, the particular network security system is further configured to use the application session identifiers to inject the supplied metadata in the first application session to subject the incoming request or a further incoming request to policy enforcement within the first application session.

In one implementation of the system, the data flow logic is further configured to inject the synthetic request in the processing path of the particular network security system using a client URL (cURL) module and synthetic listener mode of the particular network security system. In some implementations of the system, the cURL protocol generates a cURL synthetic request for the synthetic request and sends the cURL synthetic request to the synthetic listener mode. In some implementations of the system, the synthetic listener mode marks the cURL synthetic request as an internal request and subjects the cURL synthetic request to processing by the application-specific parser, sends the cURL synthetic request to the cloud application, receives the response to the cURL synthetic request from the cloud application, and uses the application-specific parser to extract the missing metadata from the response.

In one implementation of the system, the synthetic listener mode stores the extracted missing metadata in a local metadata store of the particular network security system. In another implementation of the system, the synthetic listener mode stores the extracted missing metadata in a distributed metadata store shared by the network security systems. In yet another implementation of the system, the synthetic listener mode generates a cURL response, which is used to release the incoming request.

In one implementation of the system, the cURL request is generated by a cURL utility thread implementing the cURL protocol, and the cURL response is received by the cURL utility thread.

In one implementation of the system, the internal request bypasses policy enforcement and event generation by the particular network security system.

In one implementation of the system, the network security systems are configured to run as containerized services. In some implementations of the system, the particular network security system is configured to run as a container hypervisor generating synthetic requests for a plurality of the containerized services.

In another implementation, the technology disclosed describes a computer-implemented method. The computer-implemented method includes network security systems in a plurality of network security systems intermediating traffic between clients and cloud applications.

The computer-implemented method further includes data flow logic injecting an incoming request directed to a cloud application in a processing path of a particular network security system in the network security systems.

The computer-implemented method further includes the particular network security system using an application-specific parser specific to the cloud application to inspect certain fields and variables in the incoming request for metadata, determining that the metadata is missing, and using an application-specific template of the application-specific parser to construct a synthetic request.

The computer-implemented method further includes the data flow logic injecting the synthetic request in the processing path of the particular network security system and transmitting the synthetic request to the cloud application.

The computer-implemented method further includes the data flow logic injecting a response to the synthetic request from the cloud application in the processing path of the particular network security system.

The computer-implemented method further includes the particular network security system using the application-specific parser to extract the missing metadata from the response.

In one implementation of the computer-implemented method, the application-specific parser specifies match conditions that are specific to request and response syntaxes defined for a particular application programming interface (API) of the cloud application. In some implementations of the computer-implemented method, the match conditions are configured to specify which fields and variables in requests directed to a user API are configured to contain the metadata, and to extract the missing metadata from responses generated by the particular API.

In one implementation of the computer-implemented method, the application-specific template specifies parameters to include in the synthetic request. The parameters are specific to the request and response syntaxes. In some implementations of the computer-implemented method, the parameters are configured to cause the cloud application to generate responses that contain the missing metadata. In one implementation of the computer-implemented method, the parameters include a unified resource locator (URL). In another implementation of the computer-implemented method, the parameters include a set of header fields. In some implementations of the computer-implemented method, header fields in the set of header fields include fields from the incoming request. In yet another implementation of the computer-implemented method, the parameters include a response body.

In one implementation, the computer-implemented method further includes the particular network security system using the application-specific parser to determine an activity being performed by the incoming request.

In one implementation of the computer-implemented method, the application-specific parser has respective application-specific templates for respective activities. The application-specific template is used to generate the synthetic request for the determined activity. In some implementations of the computer-implemented method, the application-specific parser has an application-specific templates for a plurality of activities determined by the application-specific parser. The application-specific template is used to generate the synthetic request for determined activities in the plurality of activities.

In one implementation of the computer-implemented method, the application-specific template includes a first construction logic to generate the synthetic request for a browser instance of the cloud application.

In one implementation of the computer-implemented method, the application-specific template includes a second construction logic to generate the synthetic request for a native instance of the cloud application running locally on a client. In some implementations, the computer-implemented method further includes the particular network security system using the second construction logic to send a synthetic response to the native instance to retrieve a master token of a user identity spanning the cloud application, sending a first synthetic request to the cloud application to retrieve a people token specific to the native instance of the cloud application, and sending a second synthetic request to the cloud application to retrieve the missing metadata.

In one implementation, the computer-implemented method further includes the particular network security system storing the extracted missing metadata. In some implementations, the computer-implemented method further includes the particular network security system holding the incoming request in response to determining that the metadata is missing. In other implementations, the computer-implemented method further includes the particular network security system releasing the incoming request and using the extracted missing metadata to subject the incoming request to policy enforcement.

In one implementation of the computer-implemented method, the incoming request is completed in dependence upon the policy enforcement and transmitted to the cloud application. In some implementations of the computer-implemented method, the completed incoming request causes an activity to be executed on an object. In one implementation of the computer-implemented method, the activity is uploading the object to the cloud application. In one implementation of the computer-implemented method, the activity is downloading the object from the cloud application. In one implementation of the computer-implemented method, the activity is editing the object on the cloud application. In one implementation of the computer-implemented method, the activity is deleting the object from the cloud application. In one implementation of the computer-implemented method, the activity is creating the object on the cloud application. In one implementation of the computer-implemented method, the activity is sharing the object on the cloud application (e.g., via a link). In one implementation of the computer-implemented method, the activity is moving the object within the cloud application. In one implementation of the computer-implemented method, the activity is moving the object outside the cloud application.

In one implementation of the computer-implemented method, the incoming request is blocked in dependence upon the policy enforcement.

In one implementation of the computer-implemented method, the particular network security system is an inline metadata generation side car service shared by multiple network security systems in the plurality of network security systems and configured to retrieve the metadata using the synthetic request.

In one implementation, the computer-implemented method further includes the particular network security system inspecting the incoming request and identifying the cloud application and invoking the application-specific parser based on the identified cloud application.

In one implementation, the computer-implemented method further includes the data flow logic injecting the incoming request in the processing path of the particular network security system in a first application session. In some implementations, the computer-implemented method further includes the data flow logic injecting the synthetic request in the processing path of the particular network security system in the first application session. In some implementations, the computer-implemented method further includes the particular network security system configuring the synthetic request with one or more application session identifiers that are used by the data flow logic to inject the synthetic request in the processing path of the particular network security system in the first application session.

In one implementation of the computer-implemented method, the application session identifiers include at least one of user agent information, username, authenticated user, tenant identifier (ID), location internet protocol (IP) address.

In one implementation, the computer-implemented method further includes the particular network security system stripping off the application session identifiers from the synthetic request prior to transmission to the cloud application.

In one implementation, the computer-implemented method further includes the particular network security system using the application session identifiers to inject the supplied metadata in the first application session to subject the incoming request or a further incoming request to policy enforcement within the first application session.

In one implementation, the computer-implemented method further includes the data flow logic injecting the synthetic request in the processing path of the particular network security system using a client URL (cURL) module and synthetic listener mode of the particular network security system. In some implementations of the computer-implemented method, the cURL protocol generates a cURL synthetic request for the synthetic request and sends the cURL synthetic request to the synthetic listener mode. In some implementations, the computer-implemented method further includes the synthetic listener mode marking the cURL synthetic request as an internal request and subjecting the cURL synthetic request to processing by the application-specific parser, sending the cURL synthetic request to the cloud application, receiving the response to the cURL synthetic request from the cloud application, and using the application-specific parser to extract the missing metadata from the response.

In one implementation, the computer-implemented method further includes the synthetic listener mode storing the extracted missing metadata in a local metadata store of the particular network security system. In another implementation, the computer-implemented method further includes the synthetic listener mode storing the extracted missing metadata in a distributed metadata store shared by the network security systems. In yet another implementation, the computer-implemented method further includes the synthetic listener mode generating a cURL response, which is used to release the incoming request.

In one implementation, the computer-implemented method further includes generating the cURL request using a cURL utility thread implementing the cURL protocol, and the cURL response is received by the cURL utility thread.

In one implementation, the computer-implemented method further includes the internal request bypassing policy enforcement and event generation by the particular network security system.

In one implementation, the computer-implemented method further includes the network security systems running as containerized services. In some implementations, the computer-implemented method further includes the particular network security system running as a container hypervisor generating synthetic requests for a plurality of the containerized services.

Other implementations of the computer-implemented method disclosed herein can include a non-transitory computer readable storage medium storing instructions executable by a processor to perform the computer-implemented method described above. Yet other implementations of the computer-implemented method disclosed herein can include a system including memory and one or more processors operable to execute instructions, stored in the memory, to perform the computer-implemented method described above.

In yet another implementation, a non-transitory computer readable storage medium impressed with computer program instructions to enforce policies is described. The instructions, when executed on a processor, implement a method comprising network security systems in a plurality of network security systems intermediating traffic between clients and cloud applications.

The non-transitory computer readable storage medium further comprises data flow logic injecting an incoming request directed to a cloud application in a processing path of a particular network security system in the network security systems.

The non-transitory computer readable storage medium further comprises the particular network security system using an application-specific parser specific to the cloud application to inspect certain fields and variables in the incoming request for metadata, determining that the metadata is missing, and using an application-specific template of the application-specific parser to construct a synthetic request.

The non-transitory computer readable storage medium further comprises the data flow logic injecting the synthetic request in the processing path of the particular network security system and transmitting the synthetic request to the cloud application.

The non-transitory computer readable storage medium further comprises the data flow logic injecting a response to the synthetic request from the cloud application in the processing path of the particular network security system.

The non-transitory computer readable storage medium further comprises the particular network security system using the application-specific parser to extract the missing metadata from the response.

In one implementation of the non-transitory computer readable storage medium, the application-specific parser specifies match conditions that are specific to request and response syntaxes defined for a particular application programming interface (API) of the cloud application. In some implementations of the non-transitory computer readable storage medium, the match conditions are configured to specify which fields and variables in requests directed to a user API are configured to contain the metadata, and to extract the missing metadata from responses generated by the particular API.

In one implementation of the non-transitory computer readable storage medium, the application-specific template specifies parameters to include in the synthetic request. The parameters are specific to the request and response syntaxes. In some implementations of the non-transitory computer readable storage medium, the parameters are configured to cause the cloud application to generate responses that contain the missing metadata. In one implementation of the non-transitory computer readable storage medium, the parameters include a unified resource locator (URL). In another implementation of the non-transitory computer readable storage medium, the parameters include a set of header fields. In some implementations of the non-transitory computer readable storage medium, header fields in the set of header fields include fields from the incoming request. In yet another implementation of the non-transitory computer readable storage medium, the parameters include a response body.

In one implementation, the non-transitory computer readable storage medium further comprises the particular network security system using the application-specific parser to determine an activity being performed by the incoming request.

In one implementation of the non-transitory computer readable storage medium, the application-specific parser has respective application-specific templates for respective activities. The application-specific template is used to generate the synthetic request for the determined activity. In some implementations of the non-transitory computer readable storage medium, the application-specific parser has an application-specific templates for a plurality of activities determined by the application-specific parser. The application-specific template is used to generate the synthetic request for determined activities in the plurality of activities.

In one implementation of the non-transitory computer readable storage medium, the application-specific template includes a first construction logic to generate the synthetic request for a browser instance of the cloud application.

In one implementation of the non-transitory computer readable storage medium, the application-specific template includes a second construction logic to generate the synthetic request for a native instance of the cloud application running locally on a client. In some implementations, the non-transitory computer readable storage medium further comprises the particular network security system using the second construction logic to send a synthetic response to the native instance to retrieve a master token of a user identity spanning the cloud application, sending a first synthetic request to the cloud application to retrieve a people token specific to the native instance of the cloud application, and sending a second synthetic request to the cloud application to retrieve the missing metadata.

In one implementation, the non-transitory computer readable storage medium further comprises the particular network security system storing the extracted missing metadata. In some implementations, the non-transitory computer readable storage medium further comprises the particular network security system holding the incoming request in response to determining that the metadata is missing. In other implementations, the non-transitory computer readable storage medium further comprises the particular network security system releasing the incoming request and using the extracted missing metadata to subject the incoming request to policy enforcement.

In one implementation of the non-transitory computer readable storage medium, the incoming request is completed in dependence upon the policy enforcement and transmitted to the cloud application. In some implementations of the non-transitory computer readable storage medium, the completed incoming request causes an activity to be executed on an object. In one implementation of the non-transitory computer readable storage medium, the activity is uploading the object to the cloud application. In one implementation of the non-transitory computer readable storage medium, the activity is downloading the object from the cloud application. In one implementation of the non-transitory computer readable storage medium, the activity is editing the object on the cloud application. In one implementation of the non-transitory computer readable storage medium, the activity is deleting the object from the cloud application. In one implementation of the non-transitory computer readable storage medium, the activity is creating the object on the cloud application. In one implementation of the non-transitory computer readable storage medium, the activity is sharing the object on the cloud application (e.g., via a link). In one implementation of the non-transitory computer readable storage medium, the activity is moving the object within the cloud application. In one implementation of the non-transitory computer readable storage medium, the activity is moving the object outside the cloud application.

In one implementation of the non-transitory computer readable storage medium, the incoming request is blocked in dependence upon the policy enforcement.

In one implementation of the non-transitory computer readable storage medium, the particular network security system is an inline metadata generation side car service shared by multiple network security systems in the plurality of network security systems and configured to retrieve the metadata using the synthetic request.

In one implementation, the non-transitory computer readable storage medium further comprises the particular network security system inspecting the incoming request and identifying the cloud application and invoking the application-specific parser based on the identified cloud application.

In one implementation, the non-transitory computer readable storage medium further comprises the data flow logic injecting the incoming request in the processing path of the particular network security system in a first application session. In some implementations, the non-transitory computer readable storage medium further comprises the data flow logic injecting the synthetic request in the processing path of the particular network security system in the first application session. In some implementations, the non-transitory computer readable storage medium further comprises the particular network security system configuring the synthetic request with one or more application session identifiers that are used by the data flow logic to inject the synthetic request in the processing path of the particular network security system in the first application session.

In one implementation of the non-transitory computer readable storage medium, the application session identifiers include at least one of user agent information, username, authenticated user, tenant identifier (ID), location internet protocol (IP) address.

In one implementation, the non-transitory computer readable storage medium further comprises the particular network security system stripping off the application session identifiers from the synthetic request prior to transmission to the cloud application.

In one implementation, the non-transitory computer readable storage medium further comprises the particular network security system using the application session identifiers to inject the supplied metadata in the first application session to subject the incoming request or a further incoming request to policy enforcement within the first application session.

In one implementation, the non-transitory computer readable storage medium further comprises the data flow logic injecting the synthetic request in the processing path of the particular network security system using a client URL (cURL) module and synthetic listener mode of the particular network security system. In some implementations of the non-transitory computer readable storage medium, the cURL protocol generates a cURL synthetic request for the synthetic request and sends the cURL synthetic request to the synthetic listener mode. In some implementations, the non-transitory computer readable storage medium further comprises the synthetic listener mode marking the cURL synthetic request as an internal request and subjecting the cURL synthetic request to processing by the application-specific parser, sending the cURL synthetic request to the cloud application, receiving the response to the cURL synthetic request from the cloud application, and using the application-specific parser to extract the missing metadata from the response.

In one implementation, the non-transitory computer readable storage medium further comprises the synthetic listener mode storing the extracted missing metadata in a local metadata store of the particular network security system. In another implementation, the non-transitory computer readable storage medium further comprises the synthetic listener mode storing the extracted missing metadata in a distributed metadata store shared by the network security systems. In yet another implementation, the non-transitory computer readable storage medium further comprises the synthetic listener mode generating a cURL response, which is used to release the incoming request.

In one implementation, the non-transitory computer readable storage medium further comprises generating the cURL request using a cURL utility thread implementing the cURL protocol, and the cURL response is received by the cURL utility thread.

In one implementation, the non-transitory computer readable storage medium further comprises the internal request bypassing policy enforcement and event generation by the particular network security system.

In one implementation, the non-transitory computer readable storage medium further comprises the network security systems running as containerized services. In some implementations, the non-transitory computer readable storage medium further comprises the particular network security system running as a container hypervisor generating synthetic requests for a plurality of the containerized services.

4) Synthetic Request Injection to Retrieve Object Metadata for Cloud Policy Enforcement In one implementation, the technology disclosed describes a system. The system comprises a network security system interposed between clients and cloud applications. The network security system is configured to receive, during an application session, an incoming request from a client. The incoming request is directed towards a cloud application, i.e., a target cloud application targeted by the incoming request, and includes an object identifier of an object. The network security system is further configured to analyze the incoming request and detect the object identifier.

The network security system is further configured to configure a synthetic request with the object identifier and inject the synthetic request into the application session to transmit the synthetic request to the cloud application. The synthetic request is configured to retrieve object metadata about the object using the object identifier.

The network security system is further configured to receive a response to the synthetic request from the cloud application. The response supplies the object metadata.

In one implementation of the system, the object metadata is object name. In one implementation of the system, the object metadata is object size. In one implementation of the system, the object metadata is object type. In one implementation of the system, the object metadata is object sensitivity.

In some implementations of the system, the network security system is further configured to use the object metadata to enforce at least one security policy on the incoming request and/or a further incoming request that follows the incoming request.

In some implementations of the system, the incoming request and/or the further incoming request attempts to execute an activity involving the object. In one implementation of the system, the activity is uploading the object to the cloud application. In one implementation of the system, the activity is downloading the object from the cloud application. In one implementation of the system, the activity is editing the object on the cloud application. In one implementation of the system, the activity is deleting the object from the cloud application. In one implementation of the system, the activity is creating the object on the cloud application. In one implementation of the system, the activity is sharing the object on the cloud application (e.g., via a link). In one implementation of the system, the activity is moving the object within the cloud application. In one implementation of the system, the activity is moving the object outside the cloud application.

In some implementations of the system, the network security system is further configured to hold the incoming request, and thereby hold execution of the activity on the object. transmit the synthetic request to the cloud application and receive the response to the synthetic request from the cloud application. The response supplies the object metadata. The network security system is further configured to determine that the activity qualifies as executable on the object based on an evaluation of the supplied object metadata against the security policy, and execute the activity on the object.

In some implementations of the system, the network security system is further configured to execute the activity on the object, transmit the synthetic request to the cloud application, and receive the response to the synthetic request from the cloud application. The response supplies the object metadata. The network security system is further configured to return the supplied object metadata to the client for display as supplemental confirmation of the execution of the activity on the object.

In some implementations of the system, the synthetic request is further configured to use the object identifier to retrieve the object from the cloud application. The response supplies the object. In one implementation of the system, the network security system is further configured to enforce the security policy on the object.

In some implementations of the system, the network security system is further configured to analyze the retrieved object to generate the object metadata (e.g., using data loss prevention (DLP) analysis (e.g., text analysis). The generated object metadata is sensitivity metadata that specifies whether the retrieved object is sensitive or not.

In some implementations of the system, the network security system is further configured to use the generated object metadata to enforce the security policy on the retrieved object.

In some implementations of the system, the network security system is further configured to transmit the retrieved object to the client.

In some implementations of the system, the network security system is further configured to extract an authentication token from the incoming request, and to configure the synthetic request with the authentication token to access the cloud application.

In another implementation, the technology disclosed describes a computer-implemented method. The computer-implemented method includes a network security system receiving, during an application session, an incoming request from a client. The network security system is interposed between clients and cloud applications. The incoming request is directed towards a cloud application, i.e., a target cloud application targeted by the incoming request, and includes an object identifier of an object. The computer-implemented method further includes the network security system analyzing the incoming request and detecting the object identifier.

The computer-implemented method further includes the network security system configuring a synthetic request with the object identifier and injecting the synthetic request into the application session and transmitting the synthetic request to the cloud application. The synthetic request is configured to retrieve object metadata about the object using the object identifier.

The computer-implemented method further includes the network security system receiving a response to the synthetic request from the cloud application. The response supplies the object metadata.

In one implementation of the computer-implemented method, the object metadata is object name. In one implementation of the computer-implemented method, the object metadata is object size. In one implementation of the computer-implemented method, the object metadata is object type. In one implementation of the computer-implemented method, the object metadata is object sensitivity.

In some implementations, the computer-implemented method further includes the network security system using the object metadata to enforce at least one security policy on the incoming request and/or a further incoming request that follows the incoming request.

In some implementations of the computer-implemented method, the incoming request and/or the further incoming request attempts to execute an activity involving the object. In one implementation of the computer-implemented method, the activity is uploading the object to the cloud application. In one implementation of the computer-implemented method, the activity is downloading the object from the cloud application. In one implementation of the computer-implemented method, the activity is editing the object on the cloud application. In one implementation of the computer-implemented method, the activity is deleting the object from the cloud application. In one implementation of the computer-implemented method, the activity is creating the object on the cloud application. In one implementation of the computer-implemented method, the activity is sharing the object on the cloud application (e.g., via a link). In one implementation of the computer-implemented method, the activity is moving the object within the cloud application. In one implementation of the computer-implemented method, the activity is moving the object outside the cloud application.

Other implementations of the computer-implemented method disclosed herein can include a non-transitory computer readable storage medium storing instructions executable by a processor to perform the computer-implemented method described above. Yet other implementations of the computer-implemented method disclosed herein can include a system including memory and one or more processors operable to execute instructions, stored in the memory, to perform the computer-implemented method described above.

In yet another implementation, a non-transitory computer readable storage medium impressed with computer program instructions to enforce policies is described. The instructions, when executed on a processor, implement a method comprising a network security system receiving, during an application session, an incoming request from a client. The network security system is interposed between clients and cloud applications. The incoming request is directed towards a cloud application, i.e., a target cloud application targeted by the incoming request, and includes an object identifier of an object. The method further comprises the network security system analyzing the incoming request and detecting the object identifier.

The method further comprises the network security system configuring a synthetic request with the object identifier and injecting the synthetic request into the application session and transmitting the synthetic request to the cloud application. The synthetic request is configured to retrieve object metadata about the object using the object identifier.

The method further comprises the network security system receiving a response to the synthetic request from the cloud application. The response supplies the object metadata.

In one implementation of the non-transitory computer readable storage medium, the object metadata is object name. In one implementation of the non-transitory computer readable storage medium, the object metadata is object size. In one implementation of the non-transitory computer readable storage medium, the object metadata is object type. In one implementation of the non-transitory computer readable storage medium, the object metadata is object sensitivity.

In some implementations, the non-transitory computer readable storage medium further includes the network security system using the object metadata to enforce at least one security policy on the incoming request and/or a further incoming request that follows the incoming request.

In some implementations of the non-transitory computer readable storage medium, the incoming request and/or the further incoming request attempts to execute an activity involving the object. In one implementation of the non-transitory computer readable storage medium, the activity is uploading the object to the cloud application. In one implementation of the non-transitory computer readable storage medium, the activity is downloading the object from the cloud application. In one implementation of the non-transitory computer readable storage medium, the activity is editing the object on the cloud application. In one implementation of the non-transitory computer readable storage medium, the activity is deleting the object from the cloud application. In one implementation of the non-transitory computer readable storage medium, the activity is creating the object on the cloud application. In one implementation of the non-transitory computer readable storage medium, the activity is sharing the object on the cloud application (e.g., via a link). In one implementation of the non-transitory computer readable storage medium, the activity is moving the object within the cloud application. In one implementation of the non-transitory computer readable storage medium, the activity is moving the object outside the cloud application.

5) Synthetic Request Injection to Retrieve Expired Metadata for Cloud Policy Enforcement In one implementation, the technology disclosed describes a system. The system comprises a network security system interposed between clients and cloud applications. The network security system is configured to process an incoming request from a client and generate metadata. The network security system is further configured to transmit the incoming request to a cloud application, i.e., a target cloud application targeted by the incoming request. The network security system is further configured to configure the metadata to expire after an expiration window.

The network security system is further configured to receive, after the expiration window, a further incoming request from the client. The further incoming request is directed towards the cloud application and subject to policy enforcement that requires the expired metadata. The network security system is further configured to hold the further incoming request and transmit a synthetic request to the cloud application. The synthetic request is configured to retrieve the expired metadata from the cloud application.

The network security system is further configured to receive a response to the synthetic request from the cloud application. The response supplies the expired metadata. The network security system is further configured to use the supplied expired metadata to subject the further incoming request to the policy enforcement.

In one implementation of the system, the network security system is further configured to store the metadata for a period of time defined by the expiration window.

In one implementation of the system, the incoming request, the further incoming request, and the synthetic request are generated during a same application session.

In one implementation of the system, the incoming request is generated during a first application session. The further incoming request and the synthetic request are generated during a second application session that follows the first application session.

In one implementation of the system, the network security system is further configured to extract an authentication token from the incoming request, and to configure the synthetic request with the authentication token to access the cloud application.

In one implementation of the system, the expired metadata supplied by the response identifies a login instance used by the incoming request to access the cloud application as being a controlled account or an uncontrolled account.

In one implementation of the system, the expired metadata supplied by the response identifies object metadata.

In another implementation, the technology disclosed describes a computer-implemented method. The computer-implemented method includes a network security system processing an incoming request from a client and generating metadata. The network security system is interposed between clients and cloud applications. The computer-implemented method further includes the network security system transmitting the incoming request to a cloud application, i.e., a target cloud application targeted by the incoming request. The computer-implemented method further includes the network security system configuring the metadata to expire after an expiration window.

The computer-implemented method further includes the policy enforcement receiving, after the expiration window, a further incoming request from the client. The further incoming request is directed towards the cloud application and subject to policy enforcement that requires the expired metadata. The computer-implemented method further includes the policy enforcement holding the further incoming request and transmitting a synthetic request to the cloud application. The synthetic request is configured to retrieve the expired metadata from the cloud application.

The computer-implemented method further includes the policy enforcement receiving a response to the synthetic request from the cloud application. The response supplies the expired metadata. The computer-implemented method further includes the policy enforcement using the supplied expired metadata to subject the further incoming request to the policy enforcement.

In one implementation, the computer-implemented method further includes the network security system storing the metadata for a period of time defined by the expiration window.

In one implementation of the computer-implemented method, the incoming request, the further incoming request, and the synthetic request are generated during a same application session.

In one implementation of the computer-implemented method, the incoming request is generated during a first application session. The further incoming request and the synthetic request are generated during a second application session that follows the first application session.

In one implementation, the computer-implemented method further includes the network security system extracting an authentication token from the incoming request and configuring the synthetic request with the authentication token to access the cloud application.

In one implementation of the computer-implemented method, the expired metadata supplied by the response identifies a login instance used by the incoming request to access the cloud application as being a controlled account or an uncontrolled account.

In one implementation of the computer-implemented method, the expired metadata supplied by the response identifies object metadata.

Other implementations of the computer-implemented method disclosed herein can include a non-transitory computer readable storage medium storing instructions executable by a processor to perform the computer-implemented method described above. Yet other implementations of the computer-implemented method disclosed herein can include a system including memory and one or more processors operable to execute instructions, stored in the memory, to perform the computer-implemented method described above.

In yet another implementation, a non-transitory computer readable storage medium impressed with computer program instructions to enforce policies is described. The instructions, when executed on a processor, implement a method comprising a network security system processing an incoming request from a client and generating metadata. The network security system is interposed between clients and cloud applications. The method further comprises the network security system transmitting the incoming request to a cloud application, i.e., a target cloud application targeted by the incoming request. The method further comprises the network security system configuring the metadata to expire after an expiration window.

The method further comprises the policy enforcement receiving, after the expiration window, a further incoming request from the client. The further incoming request is directed towards the cloud application and subject to policy enforcement that requires the expired metadata. The method further comprises the policy enforcement holding the further incoming request and transmitting a synthetic request to the cloud application. The synthetic request is configured to retrieve the expired metadata from the cloud application.

The method further comprises the policy enforcement receiving a response to the synthetic request from the cloud application. The response supplies the expired metadata. The method further comprises the policy enforcement using the supplied expired metadata to subject the further incoming request to the policy enforcement.

In one implementation of the non-transitory computer readable storage medium, the method further comprises the network security system storing the metadata for a period of time defined by the expiration window.

In one implementation of the non-transitory computer readable storage medium, the incoming request, the further incoming request, and the synthetic request are generated during a same application session.

In one implementation of the non-transitory computer readable storage medium, the incoming request is generated during a first application session. The further incoming request and the synthetic request are generated during a second application session that follows the first application session.

In one implementation of the non-transitory computer readable storage medium, the method further comprises the network security system extracting an authentication token from the incoming request and configuring the synthetic request with the authentication token to access the cloud application.

In one implementation of the non-transitory computer readable storage medium, the expired metadata supplied by the response identifies a login instance used by the incoming request to access the cloud application as being a controlled account or an uncontrolled account.

In one implementation of the non-transitory computer readable storage medium, the expired metadata supplied by the response identifies object metadata.

6) Synthetic Request Injection to Improve Object Security Posture for Cloud Policy Enforcement In one implementation, the technology disclosed describes a system. The system comprises a network security system interposed between clients and cloud applications. The network security system is configured to receive from a client an incoming request to upload an object to a cloud application over an application session. The object is subject to policy enforcement by the network security system. The network security system is further configured to generate a synthetic request, upload the object to the cloud application, and inject the synthetic request into the application session to transmit the synthetic request to the cloud application. The synthetic request is configured to modify a security posture of the uploaded object in dependence upon the policy enforcement.

In one implementation of the system, the security posture includes sharing configurations of the uploaded object. The synthetic request is further configured to modify the sharing configurations to prevent sharing of the uploaded object in dependence upon the policy enforcement.

In one implementation of the system, the security posture includes sensitivity configurations of the uploaded object. The synthetic request is further configured to modify the sensitivity configurations to set sensitivity status of the uploaded object as sensitive.

In one implementation, the system is further configured to receive from the client an incoming request to edit the object on the cloud application over the application session, and generate the synthetic request, edit the object on the cloud application, and inject the synthetic request into the application session to transmit the synthetic request to the cloud application. The synthetic request is configured to modify the security posture of the edited object in dependence upon the policy enforcement.

In one implementation, the system is further configured to receive from the client an incoming request to download the object from the cloud application over the application session, and generate the synthetic request, download the object from the cloud application, and inject the synthetic request into the application session to transmit the synthetic request to the cloud application. The synthetic request is configured to modify the security posture of the downloaded object in dependence upon the policy enforcement.

In one implementation, the system is further configured to receive from the client an incoming request to create the object on the cloud application over the application session, and generate the synthetic request, create the object on the cloud application, and inject the synthetic request into the application session to transmit the synthetic request to the cloud application. The synthetic request is configured to modify the security posture of the created object in dependence upon the policy enforcement.

In one implementation, the system is further configured to receive from the client an incoming request to share the object on the cloud application over the application session, and generate the synthetic request, share the object on the cloud application, and inject the synthetic request into the application session to transmit the synthetic request to the cloud application. The synthetic request is configured to modify the security posture of the shared object in dependence upon the policy enforcement.

In one implementation, the system is further configured to receive from the client an incoming request to move the object inside or outside the cloud application over the application session, and generate the synthetic request, move the object inside or outside the cloud application, and inject the synthetic request into the application session to transmit the synthetic request to the cloud application. The synthetic request is configured to modify the security posture of the moved object in dependence upon the policy enforcement.

In another implementation, the technology disclosed describes a computer-implemented method. The computer-implemented method includes receiving from a client an incoming request to upload an object to a cloud application over an application session. The object is subject to policy enforcement by a network security system interposed between clients and cloud applications. The computer-implemented method further includes generating a synthetic request, uploading the object to the cloud application, and injecting the synthetic request into the application session and transmitting the synthetic request to the cloud application. The synthetic request is configured to modify a security posture of the uploaded object in dependence upon the policy enforcement.

In one implementation of the computer-implemented method, the security posture includes sharing configurations of the uploaded object. The synthetic request is further configured to modify the sharing configurations to prevent sharing of the uploaded object in dependence upon the policy enforcement.

In one implementation of the computer-implemented method, the security posture includes sensitivity configurations of the uploaded object. The synthetic request is further configured to modify the sensitivity configurations to set sensitivity status of the uploaded object as sensitive.

In one implementation, the computer-implemented method further includes receiving from the client an incoming request to edit the object on the cloud application over the application session, and generating the synthetic request, editing the object on the cloud application, and injecting the synthetic request into the application session and transmitting the synthetic request to the cloud application. The synthetic request is configured to modify the security posture of the edited object in dependence upon the policy enforcement.

In one implementation, the computer-implemented method further includes receiving from the client an incoming request to download the object from the cloud application over the application session, and generating the synthetic request, downloading the object from the cloud application, and injecting the synthetic request into the application session and transmitting the synthetic request to the cloud application. The synthetic request is configured to modify the security posture of the downloaded object in dependence upon the policy enforcement.

In one implementation, the computer-implemented method further includes receiving from the client an incoming request to create the object on the cloud application over the application session, and generating the synthetic request, creating the object on the cloud application, and injecting the synthetic request into the application session and transmitting the synthetic request to the cloud application. The synthetic request is configured to modify the security posture of the created object in dependence upon the policy enforcement.

In one implementation, the computer-implemented method further includes receiving from the client an incoming request to share the object on the cloud application over the application session, and generating the synthetic request, sharing the object on the cloud application, and injecting the synthetic request into the application session and transmitting the synthetic request to the cloud application. The synthetic request is configured to modify the security posture of the shared object in dependence upon the policy enforcement.

In one implementation, the computer-implemented method further includes receiving from the client an incoming request to move the object inside or outside the cloud application over the application session, and generating the synthetic request, moving the object inside or outside the cloud application, and injecting the synthetic request into the application session and transmitting the synthetic request to the cloud application. The synthetic request is configured to modify the security posture of the moved object in dependence upon the policy enforcement.

Other implementations of the computer-implemented method disclosed herein can include a non-transitory computer readable storage medium storing instructions executable by a processor to perform the computer-implemented method described above. Yet other implementations of the computer-implemented method disclosed herein can include a system including memory and one or more processors operable to execute instructions, stored in the memory, to perform the computer-implemented method described above.

In yet another implementation, a non-transitory computer readable storage medium impressed with computer program instructions to enforce policies is described. The instructions, when executed on a processor, implement a method comprising receiving from a client an incoming request to upload an object to a cloud application over an application session. The object is subject to policy enforcement by a network security system interposed between clients and cloud applications. The method further comprises generating a synthetic request, uploading the object to the cloud application, and injecting the synthetic request into the application session and transmitting the synthetic request to the cloud application. The synthetic request is configured to modify a security posture of the uploaded object in dependence upon the policy enforcement.

In one implementation of the non-transitory computer readable storage medium, the security posture includes sharing configurations of the uploaded object. The synthetic request is further configured to modify the sharing configurations to prevent sharing of the uploaded object in dependence upon the policy enforcement.

In one implementation of the non-transitory computer readable storage medium, the security posture includes sensitivity configurations of the uploaded object. The synthetic request is further configured to modify the sensitivity configurations to set sensitivity status of the uploaded object as sensitive.

In one implementation, the instructions implement the method further comprising receiving from the client an incoming request to edit the object on the cloud application over the application session, and generating the synthetic request, editing the object on the cloud application, and injecting the synthetic request into the application session and transmitting the synthetic request to the cloud application. The synthetic request is configured to modify the security posture of the edited object in dependence upon the policy enforcement.

In one implementation, the instructions implement the method further comprising receiving from the client an incoming request to download the object from the cloud application over the application session, and generating the synthetic request, downloading the object from the cloud application, and injecting the synthetic request into the application session and transmitting the synthetic request to the cloud application. The synthetic request is configured to modify the security posture of the downloaded object in dependence upon the policy enforcement.

In one implementation, the instructions implement the method further comprising receiving from the client an incoming request to create the object on the cloud application over the application session, and generating the synthetic request, creating the object on the cloud application, and injecting the synthetic request into the application session and transmitting the synthetic request to the cloud application. The synthetic request is configured to modify the security posture of the created object in dependence upon the policy enforcement.

In one implementation, the instructions implement the method further comprising receiving from the client an incoming request to share the object on the cloud application over the application session, and generating the synthetic request, sharing the object on the cloud application, and injecting the synthetic request into the application session and transmitting the synthetic request to the cloud application. The synthetic request is configured to modify the security posture of the shared object in dependence upon the policy enforcement.

In one implementation, the instructions implement the method further comprising receiving from the client an incoming request to move the object inside or outside the cloud application over the application session, and generating the synthetic request, moving the object inside or outside the cloud application, and injecting the synthetic request into the application session and transmitting the synthetic request to the cloud application. The synthetic request is configured to modify the security posture of the moved object in dependence upon the policy enforcement.

7) Synthetic Request Injection to Disambiguate Bypassed Login Events for Cloud Policy Enforcement In one implementation, the technology disclosed describes a computer-implemented method. The computer-implemented method includes disambiguating a bypassed login event that caused a client to access a cloud application but bypassed a network security system configured to intermediate traffic between the client and the cloud application.

The network security system receives from the client an incoming request to access a resource on the cloud application over an application session. The bypassed login event preceded the incoming request.

The network security system analyzes the incoming request and detects absence of instance metadata required to determine whether the bypassed login event emanated from a controlled account or an uncontrolled account. The network security system holds the incoming request, generates a synthetic request, and injects the synthetic request into the application session and transmits the synthetic request to the cloud application. The synthetic request is configured to retrieve the instance metadata from the cloud application.

The network security system receives a response to the synthetic request from the cloud application. The response supplies the instance metadata. The network security system uses the instance metadata to determine whether the bypassed login event emanated from the controlled account or the uncontrolled account.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations in other sections of this application.

In one implementation of the computer-implemented method, the incoming request is fulfilled if the bypassed login event emanated from the controlled account. The controlled account is a corporate account.

In another implementation of the computer-implemented method, the incoming request is blocked if the bypassed login event emanated from the uncontrolled account. The uncontrolled account is a private account.

In one implementation of the computer-implemented method, the cloud application is a native application running locally on a client and configured to provide access without a login page. The bypassed login event bypassed the network security system due to lack of the login page.

In one implementation of the computer-implemented method, the cloud application is an unsanctioned application for which the network security system lacks an application-specific parser. The bypassed login event bypassed the network security system due to failure of the network security system to inspect fields and variables in the incoming request for the instance metadata.

In some implementations of the computer-implemented method, the instance metadata is used to subject the incoming request to policy enforcement.

In some implementations of the computer-implemented method, an authentication token is extracted from the incoming request. The synthetic request is configured with the authentication token.

Other implementations of the computer-implemented method disclosed herein can include a non-transitory computer readable storage medium storing instructions executable by a processor to perform the computer-implemented method described above. Yet other implementations of the computer-implemented method disclosed herein can include a system including memory and one or more processors operable to execute instructions, stored in the memory, to perform the computer-implemented method described above.

In another implementation, the technology disclosed describes a system. The system comprises an inline proxy configured with synthetic request injection logic to intercept incoming requests and generate synthetic requests independent of the incoming requests within a same application session.

In yet another implementation, a non-transitory computer readable storage medium impressed with computer program instructions to enforce policies is described. The instructions, when executed on a processor, implement a method comprising disambiguating a bypassed login event that caused a client to access a cloud application but bypassed a network security system configured to intermediate traffic between the client and the cloud application.

The network security system receives from the client an incoming request to access a resource on the cloud application over an application session. The bypassed login event preceded the incoming request.

The network security system analyzes the incoming request and detects absence of instance metadata required to determine whether the bypassed login event emanated from a controlled account or an uncontrolled account. The network security system holds the incoming request, generates a synthetic request, and injects the synthetic request into the application session and transmits the synthetic request to the cloud application. The synthetic request is configured to retrieve the instance metadata from the cloud application.

The network security system receives a response to the synthetic request from the cloud application. The response supplies the instance metadata. The network security system uses the instance metadata to determine whether the bypassed login event emanated from the controlled account or the uncontrolled account.

In one implementation of the non-transitory computer readable storage medium, the incoming request is fulfilled if the bypassed login event emanated from the controlled account. The controlled account is a corporate account.

In another implementation of the non-transitory computer readable storage medium, the incoming request is blocked if the bypassed login event emanated from the uncontrolled account. The uncontrolled account is a private account.

In one implementation of the non-transitory computer readable storage medium, the cloud application is a native application running locally on a client and configured to provide access without a login page. The bypassed login event bypassed the network security system due to lack of the login page.

In one implementation of the non-transitory computer readable storage medium, the cloud application is an unsanctioned application for which the network security system lacks an application-specific parser. The bypassed login event bypassed the network security system due to failure of the network security system to inspect fields and variables in the incoming request for the instance metadata.

In some implementations of the non-transitory computer readable storage medium, the instance metadata is used to subject the incoming request to policy enforcement.

In some implementations of the non-transitory computer readable storage medium, an authentication token is extracted from the incoming request. The synthetic request is configured with the authentication token.

In yet another implementation, a system including one or more processors coupled to memory loaded with computer instructions to enforce policies is described. The instructions, when executed on the processors, implement actions comprising disambiguating a bypassed login event that caused a client to access a cloud application but bypassed a network security system configured to intermediate traffic between the client and the cloud application.

The network security system receives from the client an incoming request to access a resource on the cloud application over an application session. The bypassed login event preceded the incoming request.

The network security system analyzes the incoming request and detects absence of instance metadata required to determine whether the bypassed login event emanated from a controlled account or an uncontrolled account. The network security system holds the incoming request, generates a synthetic request, and injects the synthetic request into the application session and transmits the synthetic request to the cloud application. The synthetic request is configured to retrieve the instance metadata from the cloud application.

The network security system receives a response to the synthetic request from the cloud application. The response supplies the instance metadata. The network security system uses the instance metadata to determine whether the bypassed login event emanated from the controlled account or the uncontrolled account.

In one implementation of the system, the incoming request is fulfilled if the bypassed login event emanated from the controlled account. The controlled account is a corporate account.

In another implementation of the system, the incoming request is blocked if the bypassed login event emanated from the uncontrolled account. The uncontrolled account is a private account.

In one implementation of the system, the cloud application is a native application running locally on a client and configured to provide access without a login page. The bypassed login event bypassed the network security system due to lack of the login page.

In one implementation of the system, the cloud application is an unsanctioned application for which the network security system lacks an application-specific parser. The bypassed login event bypassed the network security system due to failure of the network security system to inspect fields and variables in the incoming request for the instance metadata.

In some implementations of the system, the instance metadata is used to subject the incoming request to policy enforcement.

In some implementations of the system, an authentication token is extracted from the incoming request. The synthetic request is configured with the authentication token.

8) Synthetic Request Injection for Cloud Policy Enforcement

In one implementation, the technology disclosed describes a system. The system comprises a network security system interposed between clients and cloud applications. The network security system is configured to receive one or more incoming requests from a client during an application session, inject one or more synthetic requests into the application session independently of the incoming requests to transmit the synthetic requests to the cloud application, and receive one or more responses to the synthetic requests from the cloud application.

In one implementation, the network security system is further configured to hold at least one of the incoming requests until the network security system receives at least one of the responses.

In one implementation, the network security system is further configured to transmit at least one of the incoming requests to the cloud application before the network security system transmits at least one of the synthetic requests to the cloud application.

In one implementation, the network security system is further configured to transmit, in parallel, at least one of the incoming requests and at least one of the synthetic requests to the cloud application.

In one implementation, the network security system is further configured to use data supplied by at least one of the responses for policy enforcement on objects intercepted by the network security system.

In one implementation, the network security system is further configured to use the data to change security configurations of objects on the cloud application.

In one implementation, the network security system is further configured to inject the synthetic requests into the application session in response to detecting absence of some metadata.

In some implementations, the synthetic requests are configured to retrieve the metadata from the cloud application.

In some implementations, the synthetic requests are configured to retrieve the metadata from a metadata store independent of the cloud application.

In one implementation, the network security system is further configured to transmit, in parallel, multiples ones of the synthetic requests to the cloud application for multiple ones of the incoming requests. The multiple ones of the incoming requests correspond to respective activities being performed on the cloud application.

In another implementation, the technology disclosed describes a system. The system comprises a network security system interposed between clients and cloud applications. The network security system is configured to receive a first incoming request from a client during an application session, transmit the first incoming request to a cloud application, and inject a synthetic request into the application session to transmit the synthetic request to the cloud application. The synthetic request is configured to retrieve metadata not supplied by the first incoming request. The network security system is further configured to receive a response to the synthetic request from the cloud application. The response supplies the metadata. The network security system is further configured to receive a further incoming request from the client during the application session, and use the supplied metadata to subject the further incoming request to policy enforcement.

In yet another implementation, the technology disclosed describes a computer-implemented method. The computer-implemented method includes a network security system, interposed between clients and cloud applications, receiving one or more incoming requests from a client during an application session, the network security system injecting one or more synthetic requests into the application session independently of the incoming requests and transmitting the synthetic requests to the cloud application, and the network security system receiving one or more responses to the synthetic requests from the cloud application.

In one implementation, the computer-implemented method further includes holding at least one of the incoming requests until the network security system receives at least one of the responses.

In one implementation, the computer-implemented method further includes transmitting at least one of the incoming requests to the cloud application before the network security system transmits at least one of the synthetic requests to the cloud application.

In one implementation, the computer-implemented method further includes transmitting, in parallel, at least one of the incoming requests and at least one of the synthetic requests to the cloud application.

In one implementation, the computer-implemented method further includes using data supplied by at least one of the responses for policy enforcement on objects intercepted by the network security system.

In one implementation, the computer-implemented method further using the data to change security configurations of objects on the cloud application.

In one implementation, the computer-implemented method further injecting the synthetic requests into the application session in response to detecting absence of some metadata.

In some implementations, the synthetic requests are configured to retrieve the metadata from the cloud application.

In some implementations, the synthetic requests are configured to retrieve the metadata from a metadata store independent of the cloud application.

In one implementation, the computer-implemented method further transmitting, in parallel, multiples ones of the synthetic requests to the cloud application for multiple ones of the incoming requests. The multiple ones of the incoming requests correspond to respective activities being performed on the cloud application.

In yet another implementation, the technology disclosed describes a computer-implemented method. The computer-implemented method includes a network security system, interposed between clients and cloud applications, receiving a first incoming request from a client during an application session and transmitting the first incoming request to a cloud application, and the network security system injecting a synthetic request into the application session and transmitting the synthetic request to the cloud application. The synthetic request is configured to retrieve metadata not supplied by the first incoming request. The computer-implemented method further includes the network security system receiving a response to the synthetic request from the cloud application. The response supplies the metadata. The computer-implemented method further includes the network security system receiving a further incoming request from the client during the application session, and using the supplied metadata to subject the further incoming request to policy enforcement.

Other implementations of the computer-implemented methods disclosed herein can include a non-transitory computer readable storage medium storing instructions executable by a processor to perform any of the computer-implemented methods described above. Yet other implementations of the computer-implemented methods disclosed herein can include a system including memory and one or more processors operable to execute instructions, stored in the memory, to perform any of the computer-implemented methods described above.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system, comprising:
a network security system interposed between clients and cloud applications, the network security system configured to:
generate a synthetic request, and inject the synthetic request into an application session to transmit the synthetic request to a cloud application, wherein the synthetic request is configured to retrieve, from the cloud application, metadata-of-interest comprising metadata that identifies user information associated with an incoming request; and
receive a response to the synthetic request from the cloud application, wherein the response comprises the metadata-of-interest comprising the user information for accessing the cloud application.

2. The system of claim 1, wherein the metadata-of-interest identifies a login instance used to access the cloud application.

3. The system of claim 2, wherein the metadata-of-interest identifies the login instance as being a controlled account or an uncontrolled account.

4. The system of claim 3, wherein the network security system is further configured to fulfill an incoming request if the login instance is the controlled account, wherein the controlled account is a corporate account.

5. The system of claim 4, wherein the network security system is further configured to block the incoming request if the login instance is the uncontrolled account, wherein the uncontrolled account is a private account.

6. The system of claim 4, wherein the incoming request attempts to upload an object to the cloud application.

7. The system of claim 6, wherein the synthetic request is further configured to retrieve, from the cloud application, the metadata-of-interest that identifies whether the object is sensitive or not.

8. The system of claim 7, wherein the network security system is further configured to block upload of the object to the cloud application if the object is sensitive.

9. The system of claim 7, wherein the network security system is further configured to upload the object to the cloud application if the object is not sensitive.

10. The system of claim 1, wherein the user information comprises an instance identifier associated with the incoming request.

11. The system of claim 1, wherein the response supplies a user profile page that includes the user information.

12. The system of claim 1, wherein the synthetic request is further configured to retrieve the metadata-of-interest from a metadata store independent of the cloud application.

13. The system of claim 12, wherein the network security system is further configured to receive a response to the synthetic request from the metadata store, wherein the response supplies the metadata-of-interest.

14. The system of claim 4, wherein the network security system is further configured to extract an authorization token from the incoming request, and to configure the synthetic request with the authorization token to cause the synthetic request to access the cloud application.

15. The system of claim 14, wherein the network security system is further configured to use an application-specific parser specific to the cloud application to inspect the incoming request and detect the metadata-of-interest.

16. The system of claim 15, wherein the application-specific parser specifies match conditions that are specific to request and response syntaxes defined for a particular application programming interface (API) of the cloud application.

17. The system of claim 16, wherein the match conditions are configured to specify which fields and variables in requests directed to a user API are configured to contain the metadata, and to extract the metadata-of-interest from responses generated by the particular API.

18. The system of claim 15, wherein the network security system is further configured to use an application-specific template of the application-specific parser to construct the synthetic request.

19. The system of claim 18, wherein the application-specific template specifies parameters to include in the synthetic request, wherein the parameters are specific to the request and response syntaxes, and wherein the parameters are configured to cause the cloud application to generate responses that contain the metadata-of-interest.

20. The system of claim 19, wherein the parameters include a unified resource locator (URL).

21. The system of claim 19, wherein the parameters include a set of header fields.

22. The system of claim 21, wherein header fields in the set of header fields include fields from the incoming request.

23. The system of claim 19, wherein the parameters include a response body.

24. A computer-implemented method, including:
generating a synthetic request, and injecting the synthetic request into an application session to transmit the synthetic request to a cloud application from a network security system, wherein the synthetic request is configured to retrieve, from the cloud application, metadata-of-interest comprising metadata that identifies user information associated with an incoming request; and
receiving a response to the synthetic request at the network security system from the cloud application, wherein the response comprises the metadata-of-interest comprising the user information for accessing the cloud application.

25. A non-transitory computer readable storage medium impressed with computer program instructions, the instructions, when executed on a processor, implement a method comprising:
generating a synthetic request, and injecting the synthetic request into an application session to transmit the synthetic request to a cloud application from a network security system, wherein the synthetic request is configured to retrieve, from the cloud application, metadata-of-interest comprising metadata that identifies user information associated with an incoming request; and
receiving a response to the synthetic request at the network security system from the cloud application, wherein the response comprises the metadata-of-interest comprising the user information for accessing the cloud application.

* * * * *